United States Patent [19]

McGraw, Sr. et al.

[11] Patent Number: 5,577,042

[45] Date of Patent: Nov. 19, 1996

[54] BROADCAST AND PRESENTATION SYSTEM AND METHOD

[75] Inventors: Michael B. McGraw, Sr., Ft. Thomas, Ky.; Phillip A. Coombs, Cincinnati, Ohio

[73] Assignee: McGraw Broadcast, Cincinnati, Ohio

[21] Appl. No.: 183,689

[22] Filed: Jan. 18, 1994

[51] Int. Cl.$^6$ ........................................... H04J 3/16
[52] U.S. Cl. .................. 370/85.7; 370/95.1; 370/118; 370/110.1; 379/243; 340/825.03
[58] Field of Search .................. 370/582, 60, 84, 370/94.3, 112, 58.1, 58.3, 62, 85.1, 14, 16, 85.7, 109, 95.1, 118, 110.1; 379/219, 201, 220, 221, 242, 243; 375/240; 348/384; 340/825.03

[56] References Cited

U.S. PATENT DOCUMENTS

| | | | |
|---|---|---|---|
| 4,587,651 | 5/1986 | Nelson et al. | 370/88 |
| 4,720,850 | 1/1988 | Oberlander et al. | 379/90 |
| 4,731,782 | 3/1988 | Shimizu et al. | 370/60 |
| 4,763,317 | 8/1988 | Lehman et al. | 370/58 |
| 4,769,833 | 9/1988 | Farleigh et al. | 379/105 |
| 4,872,157 | 10/1989 | Hemmady et al. | 370/60 |
| 4,876,681 | 10/1989 | Hagiwara et al. | 370/60 |
| 4,890,283 | 12/1989 | Tsinberg et al. | 370/84 |
| 4,993,014 | 2/1991 | Gordon | 370/16 |
| 5,014,267 | 5/1991 | Tompkins et al. | 370/62 |
| 5,130,982 | 7/1992 | Ash et al. | 370/85.7 |
| 5,237,571 | 8/1993 | Cotton et al. | 370/110.1 |
| 5,247,516 | 9/1993 | Bernstein et al. | 370/82 |
| 5,258,979 | 11/1993 | Oomuro et al. | 370/95.1 |
| 5,263,025 | 11/1993 | Torii et al. | 370/95.1 |
| 5,353,283 | 10/1994 | Tsuchiya | 370/60 |
| 5,420,859 | 5/1995 | Takase et al. | 370/95.1 |

*Primary Examiner*—Benedict V. Safourek
*Assistant Examiner*—Ricky Q. Ngo
*Attorney, Agent, or Firm*—Dinsmore & Shohl

[57] ABSTRACT

A broadcast and presentation system for synthesis of diverse data transmission signals and multimedia application subsystems. The system includes a signal processing line for transmitting information signals in multiple formats, a plurality of application subsystems for receiving input information in a predetermined signal format, a switching matrix for receiving input signals from the signal processing line and outputting the signals to the application subsystems that are described in destination and identification information that is embedded in the signal. The system further includes converters if necessary for receiving signals in one format and outputting the signals in another format according to the identification information that is embedded in the signal. The switching matrix may be programmable and controlled by a processor. A method of transmitting information signals includes embedding an information signal with destination and identification information; routing the information signal to a selected destination in accordance with the embedded destination information; and directing the signal to an application subsystem for processing the information signal at the selected destination in accordance with the embedded signal identification information. A method of receiving information signals includes receiving an information signal that has identification information embedded in the signal and routing the information signal to a selected application subsystem that is specified in the embedded identification information.

1 Claim, 20 Drawing Sheets

BROADCAST AND PRESENTATION SYSTEM AND METHOD

TECHNICAL FIELD

The present invention relates to the field of telecommunications, and more particularly, to a system and method for providing transmission of signals having multiple formats such as voice, video, audio, and bulk-data over an existing telephony line to one or multiple locations using variable and managed bandwidth.

BACKGROUND OF THE INVENTION

Existing telephony services provide dedicated lines which permit certain types of signals to transfer from one location to another. Dedicated lines are designed to carry only certain types of signals i.e. video, data, voice or audio. Although the implementation of telephony systems in the U.S. varies greatly in terms of services and equipment available, telephony standard Digital Standard 3 (DS-3) provides a transmission capacity of 45 megabytes per second simultaneously in two directions and has sufficient bandwidth for carrying signals having multiple formats such as video, data, audio, and voice. However, DS-3 lines generally are dedicated lines for a particular type of format which means that in order to send video and audio signals, two different dedicated lines are used: a line for carrying video and a line for carrying audio. A line is dedicated for each type of signal format, because telecommunications systems are not capable of distinguishing between the different signal formats and routing them to the appropriate receiving device at the receiving end.

Dedicated telephone services are a disadvantage to today's businesses, because of the high costs and inconvenience of requiring wiring for each type of service. In addition, dedicated telephone services are expensive due to the telephone system's use of DS-3 lines for a single dedicated service. A business must pay for its use of the entire dedicated line even though only a small portion of the line's bandwidth may actually be used by the business.

In partial response to these disadvantages, a point-to-point wideband switching network for the transmission of voice, audio, video and data signals was developed. However, there are several limitations associated with this wideband switching network. Subscribers of the wideband switching network must call their local telephone exchange and their publicly switched digital network service provider to request routing of the information that they want to transmit. This is an inconvenience and requires preplanning. This system operates on fixed bandwidth at the DS-3 level, meaning that all transmissions occur at the DS-3 level and the user is charged for DS-3 bandwidth even if the bandwidth is not entirely used. In addition, this wideband switching network only provides NTSC style video service at the DS-3 level. There is still a need for multi-point service to multiple locations rather than from one specific location to one specific destination.

SUMMARY OF THE INVENTION

Accordingly, it is a primary object of the present invention to provide a telecommunications system that is multifunctional rather than operating on dedicated services.

It is another object of the invention to provide variable managed bandwidth.

It is a further object of the invention to provide multipoint service.

It is yet another object of the invention to provide a system that can migrate to other telephony paths and support different levels of telephony digital services.

It is another primary object of the invention to provide direct on-line access of the service.

It is still a further object of the invention to provide HDTV and NTSC video service and video transfer by computer file format.

It is yet another object of the invention to provide a multi-faceted business system which can transfer information into different formats seamlessly.

It is yet a further object of the invention to provide a more effective and efficient means of transferring data regardless of source and to dedicate resources as required by a specific visually based application such as video mail, video on demand, pay-per-view, data transfer, and video desktop conferencing.

It is still another object of this invention to provide a novel method of transmitting and receiving signals regardless of signal format and at managed bandwidths.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention disclosed herein, an improved broadcast and transmission communication system for synthesis of diverse data transmission signals. A communication system includes an information signal source for providing information signals in at least one signal format such as video, audio, data or voice. Multiple signal processing lines for receiving and carrying information signals having multiple formats. A selection and transmission subsystem that is connected to a network subsystem for receiving information signals from the signal source and selectively routing the information signals to the appropriate processing line or lines as directed by information contained in the information signals. A converter having multiple inputs is positioned to receive the information signals in a particular format from the processing lines and converts the signals in another particular format. A switching mechanism for selecting between the inputs of the converter so that the converter processes the information signal input from the selected process line and outputs a converted signal in the desired format. A processor for controlling the switching mechanism and the converter's output format.

In another aspect of the invention, a method is provided for transmitting information signals that makes the format of the signal or signals being transmitted irrelevant. An information signal is embedded with destination information and signal identification information. The signal is routed to a selected destination in accordance with the embedded destination information and directed to an application subsystem for processing the signal according to the embedded signal identification information. It may be necessary for the signal to be translated into a transmittable form prior to routing the signal to the selected destination. Translation of the signal may include compression or bit rate reduction of the signal for transmission purposes. Electrical signals are converted to optical signals prior to being routed to the selected destination. In order to embed the destination and identification information in the signals, the destination and identification information is translated into electrical data form and attached onto the signal.

In accordance with a further aspect of the invention, an information transmission system for interconnecting multimedia application subsystems is provided. The information transmission system includes a signal processing line for transmitting information signals in multiple, different predetermined signal formats. A plurality of application subsystems which are adapted for receiving input information in a predetermined signal format. A switching matrix having an input for receiving input signals from the signal processing line and several different output ports which are each connected to at least one of the application subsystems. The switching matrix selectively directs input signals of different signal formats to at least one application subsystem by directing the input signal to the different output ports according to the information embedded in the signal. The switching matrix is adapted to receive input signals in compressed or reduced bit rate form, and a translation subsystem converts the signal to an original form. The application subsystems include a production subsystem for processing audio and video signals; a presentation subsystem for combining audio and video data in computer controlled productions; a satellite subsystem to include microwave transmission for providing alternative transmission and reception for the system; a network subsystem for providing operational control of the system; and a private exchange subsystem for providing a stand-alone digital telephone system. The switching matrix may direct the signals to a number of the application subsystems simultaneously. The network subsystem may store information in its transmitted format, convert the stored information into an application specific form as required, and direct an information signal that is representative of the converted information to another of the application subsystems. Furthermore, the switching matrix may be programmable and operated by a controller for selecting the output port to which input signals of a predetermined format are directed in the switching matrix.

BRIEF DESCRIPTION OF THE DRAWINGS

The accompanying drawings, incorporated in and forming a part of the specification, illustrate several aspects of the present invention, and together with the description, serve to explain the principles of the invention. In the drawings.

Reference will now be made in detail to the present preferred embodiments of the invention, examples of which are illustrated in the accompanying drawings.

DETAILED DESCRIPTION OF THE PREFERRED EMBODIMENT

Figure 1:
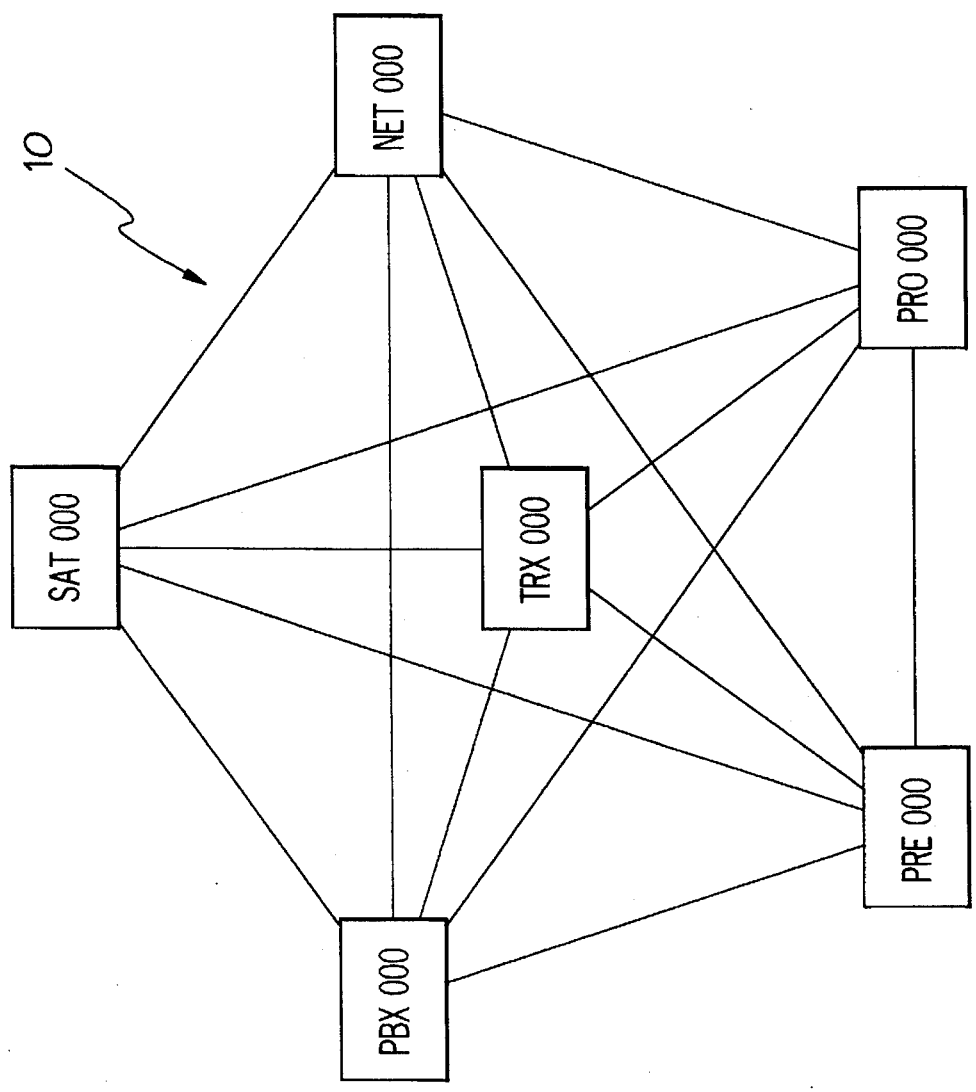
FIG. 1 is a schematic diagram of a broadcast and presentation system incorporating a number of interrelated subsystems.

Reference is now made to FIG. 1, showing an improved broadcast and presentation system (10) incorporating the networked synthesis of six subsystems of the present invention. The invention employs the novel approach of networking a transmission subsystem (TRX 000), private exchange subsystem (PBX 000), computer network subsystem (NET 000) (or sometimes referred to as FDDI network subsystem (NET 000) where FDDI is fiber distributed data interface), satellite subsystem (SAT 000), audio/visual presentation subsystem (PRE 000), and audio/visual production system (PRO 000) to provide a business communication network that efficiently routes signals regardless of the format of the signal. System (10) provides: audio, video, and data transmission, reception, and production capabilities; reception and transmission of audio and visual information in HDTV format, NTSC format and computer file formats; displays of information in many forms; translations of data from one format to another virtually instantaneously; and worldwide telephony and satellite access. In addition, system (10) provides full platform access by multiple users from any point in the networked system.

At the core of broadcast and presentation system (10) is transmission subsystem (TRX 000). Transmission subsystem (TRX 000) performs the primary reception, translation, and switching duties of system (10). Transmission subsystem (TRX 000) channels information flowing between the other subsystems (NET 000, PBX 000, PRE 000, PRO 000, SAT 000) using translation techniques such as data bit reduction (e.g. compression and decompression) which provides interoperability between all of the subsystems.

Private exchange subsystem (PBX 000) provides standard telephone services for broadcast and presentation system (10). Private exchange subsystem (PBX 000) also provides video conferencing capabilities and internal switching for additional video services.

High-speed data and image transfer for system (10) is accomplished by computer network subsystem (NET 000). Network subsystem (NET 000) is designed to exchange large blocks of data quickly through the different subsystems and is the main source of user control for system (10).

Satellite subsystem (SAT 000) supplies both digital and analog up-link and down-link capabilities to system (10) and is controlled via network subsystem (NET 000). Coordination of satellite subsystem (SAT 000) on any personal computer workstation attached to system (10) is provided through satellite subsystem's (SAT 000) connections with the other subsystems. In addition, satellite subsystem (SAT 000) provides remote access to system (10).

Audio/video presentation subsystem (PRE 000) acts as a switching unit which accepts different audio and video inputs from the other subsystems. Presentation subsystem (PRE 000) outputs information according to the user's specifications. Production subsystem (PRO 000) is a high-level production facility residing within system (10). Production subsystem (PRO 000) provides a wide selection of cameras, video switching equipment, special effects equipment, editing equipment, monitors, signal-control devices, computer animation equipment, and video recording and playback devices. In addition, on-line as well as off-line editing, and stand-alone production services are provided by production subsystem (PRO 000).

Due to the interoperability of the six subsystems, broadcast and presentation system (10) provides controlled switching and manipulation concurrently for any combination of audio, video, electronic data and voice-based information.

TRANSMISSION SUBSYSTEM

Central to broadcast and presentation system (10) is a transmission subsystem (TRX 000). Transmission subsystem (TRX 000) is responsible for routing incoming signals to the other components in system (10). Preferably, system (10) is based on a fiber-optic network, although transmission subsystem (TRX 000) may be constructed on a traditional copper network. Fiber-optic networks provide greater security, require less maintenance, and can be miniaturized so that they take up less space than traditional copper networks. In addition, fiber-optic networks can carry larger signals so that system (10) can receive complex computer and video data.

Figure 2:
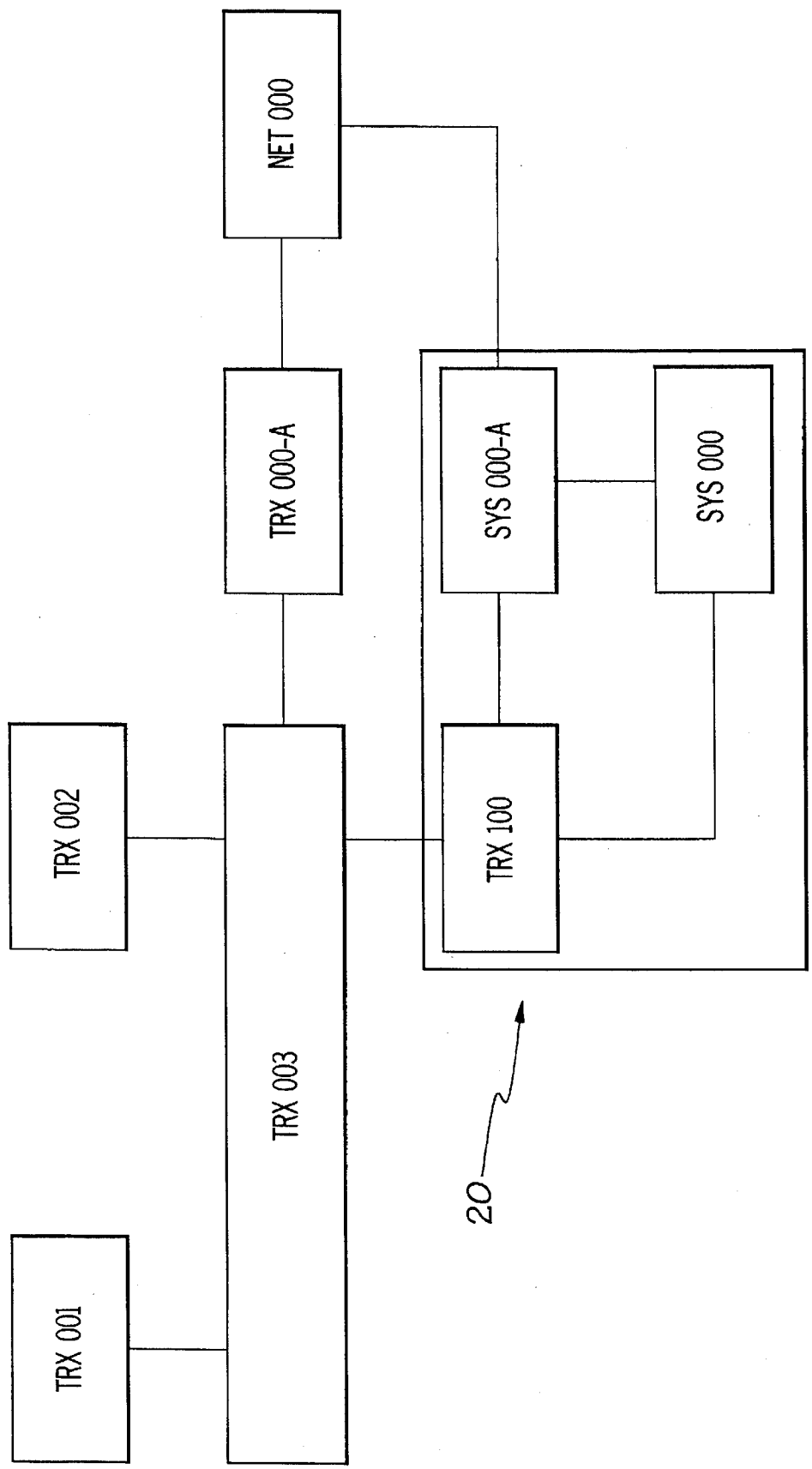
FIG. 2 is a schematic diagram illustrating the control relationship in the transmission subsystem which provides routing of signals.

FIG. 2 illustrates how signals are transmitted and received by system (10). For outgoing signals, meaning signals that are leaving system (10), a signal originates from an application system (SYS 000). Application systems (SYS 000) will be discussed specifically below, however, generally, application system (SYS 000) may be within any of the subsystems except for transmission subsystem (TRX 000). Application system (SYS 000) may be a telephone, a fax machine, a computer workstation, a video tape recorder, or any suitable device regardless of signal format utilized by the device. If application system (SYS 000) is a device that requires translation of the signal (i.e. into a digital signal or bit rate reduction) for transmission, it is connected to a translation device (TRX 100) which is a component of transmission subsystem (TRX 000). Specific translation devices (TRX 100) will be discussed in detail below. Also connected to application system (SYS 000) (and to translation device (TRX 100) if a translation device is needed) is an application systems controller (SYS 000-A) which is a component of the same subsystem as application system (SYS 000) and is connected to network subsystem (NET 000).

When preparing to transmit signals, application system (SYS 000) and applications system controller (SYS 000-A) are activated. Applications system controller (SYS 000-A) makes a request to a switching matrix (TRX 003) within transmission subsystem (TRX 000) to transmit to a certain destination. The request is encoded and sent through translation device (TRX 100). The request includes a destination address ("header") and information regarding the identification or type of signal being sent ("descriptor".) Operating software for the transmission subsystem allows switching matrix (TRX 003) to recognize and address DS-3 lines, DS-1lines, and DS-0 lines. Specifically, within the DS-3 lines, addressing is complete to the DS-0 line level; thus, the software enables the switching matrix to route and process signals based on the information contained on the DS-0 line within the DS-3 line. Within each DS-3 line, a DS-0 line is designated to carry information regarding the destination, route, and description of the DS-3 line and any respective DS-1 line contained within that DS-3 line. This is a functional description of the use of a signal header and descriptor. The identification information is based on which application system (SYS 000) is being used. If the circuit path requested by applications system controller (SYS 000-A) is available, switching matrix (TRX 003) activates it. However, if the requested circuit path is not available, switching matrix (TRX 003) accesses its own controller (TRX 000-A) and looks for alternative paths which will complete the circuit. If alternative paths are available, they are identified to switching matrix (TRX 003) and inserted in the signal in front of the original destination information; thus, pushing the original header and descriptor down in the queue. Switching matrix (TRX 003) processes the modified request and switching matrix controller (TRX 000-A) reports the change to the applications system controller (SYS 000-A) via network subsystem (NET 000). Once the circuit is completed, the receiving circuit signals switching matrix controller (TRX 000-A) and transmission begins. After transmission occurs, applications system controller (SYS 000-A) signals switching matrix (TRX 003) through translation device (TRX 100) to discontinue the connection. Switching matrix (TRX 003) acknowledges the discontinuation of service and notes that the particular application system (SYS 000) is available for incoming requests.

When receiving transmissions from another broadcast and presentation system (10) at a remote location, switching matrix (TRX 003) verifies the availability of translation device (TRX 100), or if a translation device is not necessary, application device (SYS 000), and makes the connection between translation device (TRX 100) (or application system (SYS 000) if a translation device is not required) and the remote location. Translation device (TRX 100) signals back to the remote location that it is ready to receive the signal and transmission of the signal commences. The signal enters system (10) through either a Publicly Switched Digital Network ("PSDN") (TRX 001) or an Independently Switched Digital Network ("ISDN") (TRX 002). PSDN (TRX 001) employs a programmable switch that directs the transmission of incoming signals to particular subsystem and/or component thereof based on the destination information that is embedded in each signal. Similarly, incoming signals are routed by ISDN (TRX 002) which is in communication with transmission subsystems from each broadcast and presentation system (10) throughout the world so that all systems (10) may interact with each other. PSDN (TRX 001) is connected to switching matrix (TRX 003) by high level optical fiber links. Although the optical fiber links in this embodiment are digital standard 3 ("DS-3") on the telephony standard, it is to be understood that one skilled in the art may select any suitable links for transmitting information. There are at least two DS-3 links between PSDN (TRX 001) and switching matrix (TRX 003) for transmitting signals. In addition, independently switched digital network ("ISDN") (TRX 002) has at least two DS-3 connections to switching matrix (TRX 003) for connecting system (10) to other systems around the world. PSDN (TRX 001) and ISDN (TRX 002) are programmed to automatically route an incoming signal to switching matrix (TRX 003) which reads the identification information embedded in the signal and routes the signal to the appropriate translation device (TRX 10X) represents any translating devices within the transmission subsystem such as TRX 101–105 and TRX 005 and 006. Translation device (TRX 100) sends the descriptor to application systems controller (SYS 000-A) and the signal is processed by application system (SYS 000). Application system (SYS 000) is either slaved to accept the signal automatically or activated by applications system controller (SYS 000-A) to accept the signal. Translation device (TRX 100), application system (SYS 000), and applications system controller (SYS 000-A) together form a system group (20). There can be as many system groups (20) in one system (10) as can be handled by switching matrix (TRX 003).

A suitable switching matrix (TRX 003) is an Alcatel 1630 SX Narrowband Digital Cross Connect System that splits signals from digital standard-3 ("DS-3") to digital standard-1 ("DS-1") with addressing to digital standard-0 ("DS-0"), combines signals from DS-1 to DS-3, and routes the signals according to their identification information. Although this description discusses using system (10) with the digital standard telephony hierarchy, it may be used with any type of telephony standard (e.g. Optical Carrier, etc.). Switching matrix (TRX 003) also can redirect a signal after it is split or combined by embedding addressing information into the signal.

Figure 2A:
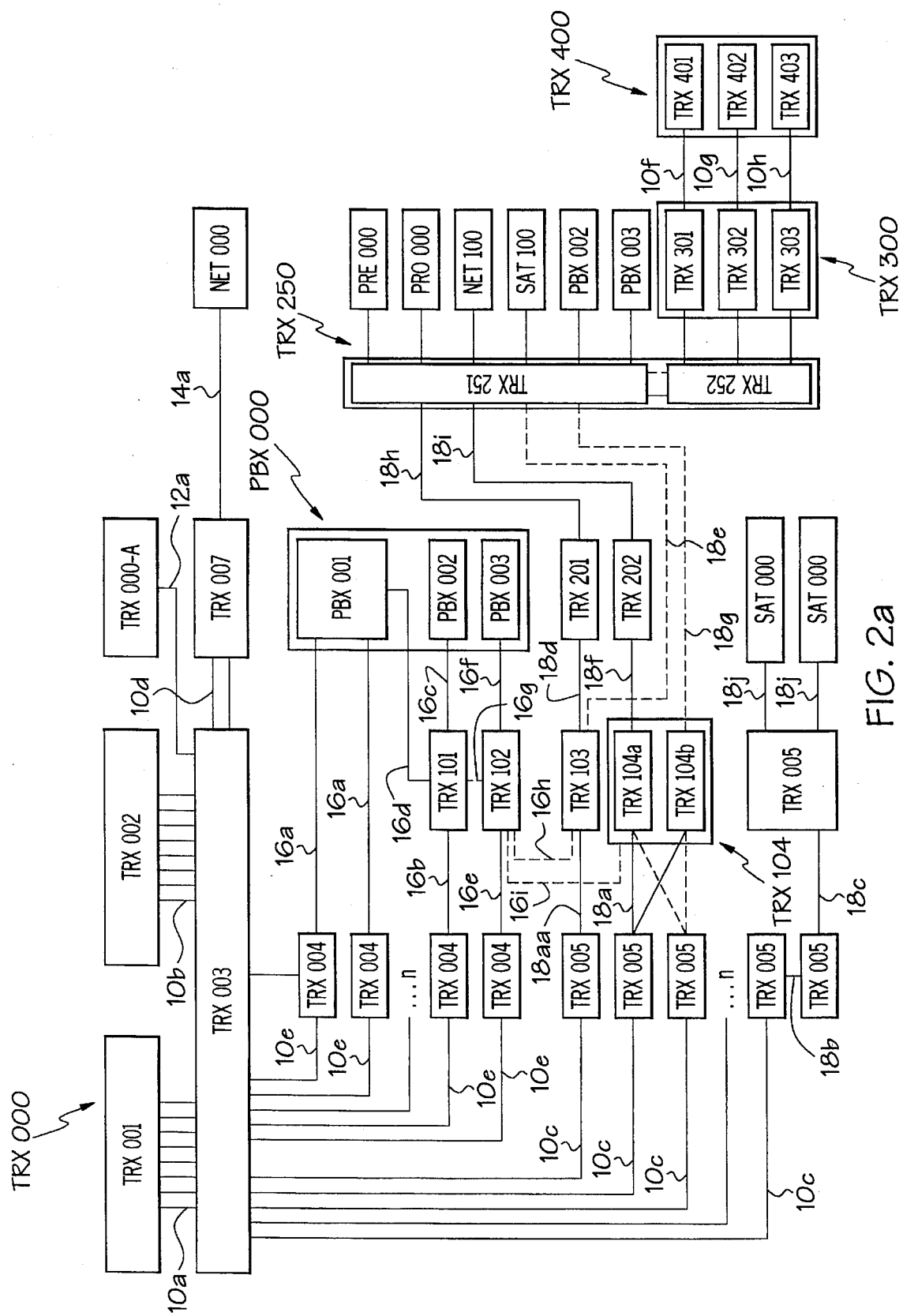
FIG. 2a shows in detail the transmission subsystem interconnections of the present invention.

Referring now to FIG. 2a, both PSDN (TRX 001) and ISDN (TRX 002) are connected (10a, 10b) to switching matrix (TRX 003) by 8 DS-3 connections using single-mode ST connectors. Dual-strand, single-mode fiber is used to allow a maximum of six send and receive connections. The ST connectors provide virtually unlimited bandwidth capacity, reliable and consistent fiber-to-port connection, and are recognized as an industry standard. Alternatively, a biconic single-mode connector may be used; however, this connector is not preferred because it is difficult to align with the port on switching matrix (TRX 003) and the optical signal is subject to drift over time.

Controller (TRX 000-A) provides remote programming and operation of switching matrix (TRX 003). Controller (TRX 000-A) is connected (12a) to switching matrix (TRX 003) by a 25-pin serial RS-232 connector. Suitable controllers (TRX 000-A) include a high end computer with high visualization such as either an ISA or an EISA bus machine with a minimum of 4 MB RAM, a 80 MB Hard Drive, and a 386SX33 Processor, or a 486DX33 ISA Bus with VESA Local Video, 2 MB VRAM, 120 MB Hard Drive, and 8 MB RAM. However, use of the 486DX33 EISA Bus requires that an appropriate FDDI network card be installed.

As shown in FIG. 2a, from switching matrix (TRX 003), a signal can be routed to several different locations within broadcast and presentation system (10). A signal can be returned to either PSDN (TRX 001) or ISDN (TRX 002) using the ST connectors' (10a, 10b) send capability. From switching matrix (TRX 003), signals can be routed to an optical multiplexer/demultiplexer for DS-3/OC-1 to FDDI (TRX 007) for demuxing signals to two 45 MBit channels for transmission to network subsystem (NET 000). Optical multiplexer/demultiplexer for DS-3/OC-1 (TRX 007) is connected (10d) to switching matrix (TRX 003) by single mode fiber optic cable with ST connectors. Preferably, a dual-strand multi-mode optical fiber using a multi-mode ST connector (14a) is used to connect optical multiplexer/demultiplexer (TRX 007) to FDDI (NET 000). A suitable, but not preferred alternative would be to use RJ-45 connectors operating on shielded, twisted 4-pair copper cable to a network configured to the traditional copper SDDI standard. The fiber-based network is preferred due to its virtual immunity to electronics eavesdropping and its greater transmission distances. However, signals that are sent to other parts of system (10) must first be interfaced from fiber-optic to copper by optical to electrical interfaces for DS-1 lines (TRX 004) and for DS-3 lines (TRX 005). The preferred connections (10e) from switching matrix (TRX 003) to optical to electrical interface (TRX 004) are single-mode ST connectors. Connections (10e) are copper based connections from DS-1 to DS-1 with each connection having send and receive capabilities and transfer rates from 1.5 megabytes per second to 51 megabytes per second.

As illustrated in FIG. 2, a variable number (n) of optical to electrical interfaces (TRX 004, TRX 005) may be employed. Switching matrix (TRX 003) has 32 possible DS-3 connections with eight connections designated for PSDN (TRX 001) and eight connections designated for ISDN (TRX 002), two connections designated for optical multiplexer/demultiplexer for DS-3/OC-1 to FDDI (TRX 007), and a minimum of four DS-3 connections must be designated for optical to electrical interfaces for DS-3 (TRX 005). The remaining DS-3 connections available for optical to electrical interfaces (TRX 004, TRX 005) are variable; however, a maximum of ten DS-3 connections may be designated for optical to electrical interfaces for DS-3 (TRX 005). The optimal configuration is a minimum of 56 DS-1 ports available with a maximum configuration of 112 ports, because each DS-3 line can be separated into 28 DS-1 connections. Switching matrix (TRX 003) capacity supports a total of 32 DS-3 lines or the equivalent bandwidth of DS-1 lines such that the configuration of DS-3 and DS-1 lines to the different components is widely variable.

From optical to electrical interface for DS-1 (TRX 004), a signal can be routed to a private exchange digital phone system (PBX 001). Private exchange digital phone system is an application system (SYS 000) (on FIG. 2) that does not require a translation device (TRX 100). Connections (16a) employ a 25-pair, class 4 shielded cable. This cabling connection reduces radio frequency interference and allows direct connection between the DS-1 interface and private exchange system (PBX 000). Private exchange digital phone system (PBX 001) receives two of these connections, which allow digital phone access for transmission and reception to 48 digital telephone lines at 64 kilobits.

A signal can be routed from optical to electrical interface for DS-1 (TRX 004) to a channel bank (TRX 101) which splits the DS-1 line into 25 DS-0 lines; however, one DS-0 line is reserved for overhead. Channel bank (TRX 101) functions as the liaison between transmission subsystem (TRX 000) and private exchange system (PBX 000). Channel Bank (TRX 101) serves as a switcher that can route multiple-voice channels, multiple-fractional DS-1, or singular DS-1 to appropriate components. Thus, channel bank (TRX 101) can route signals to either DS-1 switcher router (TRX 102) or audio/visual codec for fractional DS-1 (PBX 002) for various levels of DS-1 or fractional DS-1 video. Channel bank (TRX 101) is connected (16g) to DS-1 switcher router (TRX 102) by a 25-pair, class 4 shielded cable. Electrical interface for DS-1 (TRX 004) is connected (16b) to channel bank (TRX 101) by 25 pair class 4 shielding d-pin connector. From channel bank (TRX 101), signals can be sent to an audio/visual codec for fractional DS-1 (PBX 002) by a 25 pair class 4 shielding d-pin connector (16c) or to private exchange digital phone system (PBX 001) also by the same type of connection (16d). Also, a signal can be routed from optical to electrical interface for DS-1 (TRX 004) to a DS-1 switcher router (TRX 102) which senses an incoming signal and remotely directs the signal to channel bank (TRX 101) to break the signal for video or to an audio/visual codec for DS-1 video (PBX 003). Both of these connections, optical to electrical interface for DS-1 to DS-1 switcher router (16e) and DS-1 switcher router to audio/visual codec for DS-1 video (16f), use a 25-pair class 4 shielding d-pin connector. Connections (16b, 16e) allow access from the DS-1 interface to fractional DS-1 and DS-0. DS-0 has a transfer rate of 56 or 64 kilobits per second. DS-1 switcher router (TRX 102) is connected (16f) to audio/visual codec for DS-1 (PBX 003) by a DS-1 to DS-1 connection using a 25-pair serial d-pin connector as the interface. The signal going through this connection is digital, either in encoded DS-1 video, data, or voice formats. DS-1 switcher router (TRX 102) is a DS-1 switcher that can route up to eight DS-1 lines, each line having both send and receive capabilities, in any combination connected from switcher router (TRX 102) to channel bank (TRX 101), audio/visual codec for DS-1 (PBX 003), NTSC codec (TRX 103), or HDTV codec (TRX 104).

Signals from optical to electrical interface for DS-3 (TRX 005) can be sent to DS-3 to RS-170/CCIR 601 video compression/decompression unit ("NTSC Codec") (TRX 103) in encoded video format using RS170A or CCIR601 and encoded in a DS-3 format. Connection (18aa) between these components has both send and receive capability, which is performed on two separate 75 ohm BNC connectors running on class 4 shielded coaxial cable at 22-gauge.

From optical to electrical interface for DS-3 (TRX 005), a signal can be routed to a video compression/decompression unit ("HDTV Codec") (DS-3 to SMPTE 240 M, HDTV Codec) (TRX 104) having two components: a HDTV decompression unit (TRX 104a) and a HDTV compression unit (TRX 104b). Connection (18a) contains two 75 ohm BNC connectors running on class 4 shielded coaxial cable at 22-gauge. Each connection has send and receive capability. The inherent advantage of this type of connection for the signal compression and decompression is that it allows data transfer of 45 megabits per second up to a distance of 125 meters. In addition, the shielding reduces radio frequency interference during high-speed data transfers. Optionally, two optical to electrical interfaces for DS-3 (TRX 005) may be connected to HDTV Codec (TRX 104) by DS-3/OC-1 linkages because the compression and decompression units can operate at either single DS-3 or dual DS-3 bandwidth.

A signal can be routed from optical to electrical interface for DS-3 (TRX 005) to a DS-3/OC-1 muldem for digital to analog conversion (TRX 006), where it can be converted from digital to analog format for standard satellite transmission by satellite subsystem (SAT 000) at a much cheaper rate than for digital format. The interface between these components (18b) is two 75 ohm BNC connectors running on class 4 shielded coaxial cable at 22-gauge. Each connection has a send and receive capability, and a signal can be transferred at 45 megabits per second up to a distance of 125 meters without radio frequency interference. Once a signal has been converted from digital to analog format, it can be sent from DS-3/OC-1 muldem for digital to analog conversion (TRX 006) to a remotely actuated switcher/router (TRX 105) for sending along multiple satellites (connection 18c). In addition, remotely actuated switcher/router (TRX 105) can switch and route incoming satellite signals to other satellites instantaneously. Interface (18c) utilizes two 75 ohm BNC connectors running on class 4 shielded coaxial cable at 22-gauge. Each connection has a send and a receive capability, and each analog signal can be transferred at 45 megabits per second up to a distance of 125 meters without radio frequency interference. Remotely actuated switcher/router (TRX 105) is connected (18j) to satellite subsystem (SAT 000) and provides an analog DS-3 (T-3) signal for transmission by satellite subsystem (SAT 000). Remotely actuated switcher/router (TRX 105) is a multi-channel switcher/router which may be remotely activated by one of satellite subsystems (SAT 000), transmission subsystem (TRX 000), or a remote access location (TRX 400) which is provided through network subsystem connections. The major advantage of remotely actuated switcher/router (TRX 105) is its ability to switch from one to eight analog signals simultaneously and in conjunction. Interface (18j) between remotely actuated switcher/router (TRX 105) and satellite subsystem (SAT 000) uses 75 ohm BNC connectors running on class 4 shielded coaxial cable at 22-gauge, with both send and receive capabilities.

Connection (16h) between DS-1 switcher router (TRX 102) to NTSC Codec (TRX 103) is a DS-1 to DS-1 connection using a 25-pair serial d-pin connector as the interface. The signal going through this connection is digital, either in encoded DS-1 video, data, or voice formats. Through connection (16h), a signal can be routed to the different components within private exchange system (PBX 000) due to the send capability of the DS-1 line from NTSC codec (TRX 103) to DS-1 switcher router (TRX 102).

From DS-1 switcher router (TRX 102) to HDTV codec (104) is a DS-1 to DS-1 connection using a 25-pair serial d-pin connector as the interface (16i). The signal going through connection (16i) is digital, either in encoded DS-1 video, data, or voice formats. This connection uses two DS-1 lines, one with a send capacity, the other with a receive capacity. The DS-1 send-capable line is connected (not shown) to HDTV compression unit (TRX 104b) and the DS-1 receive-capable line is connected (not shown) to HDTV decompression unit (TRX 104a) so that HDTV compression unit (TRX 104b) can send a signal in compressed format on a DS-1 line. Likewise, HDTV decompression unit (TRX 104a) is capable of receiving a signal in compressed format on a DS-1 line and decompressing the signal. The DS-1 signals to and from NTSC codec (TRX 103), HDTV decompression unit (TRX 104a) and HDTV compression unit (TRX 104b) are embedded in the DS-3 signal carried through optical to electrical interface DS-3/OC-1 (TRX 005) to switching matrix (TRX 003) which functions to automatically convert DS-1 signals sent from DS-1 switcher router (TRX 102) to part of a DS-3/OC-1 signal. The DS-3/OC-1 signal can be processed back to switching matrix (TRX 003).

Connection (18*d*) between NTSC codec (TRX 103) and video and audio distribution amplifier for NTSC signals (TRX 201) is the primary audio, video and data connection to all of the other subsystems within system (10). Interface (18*d*) is two 75 ohm BNC connectors running on class 4 shielded coaxial cable at 22-gauge for video (RS 170A), and four XLR to XLR on 3-wire shielded cabling for audio, and a 25-pin shielded serial cable for digital video (CCIR601). These connections only have a send capacity and only occur within NTSC codec (TRX 103) to video and audio distribution amplifier for NTSC signals (TRX 201) interface (18*d*). The receive capacity for NTSC Codec (TRX 103) is located in its interface (18*e*) with system interconnections (TRX 251). System interconnections components (TRX 251) sends signals that have been processed by the different subsystems or video and audio distribution amplifiers for HDTV signals (TRX 201) back to NTSC codec (TRX 103). Connections for interface (18*e*) from system interconnections (TRX 251) to NTSC codec (TRX 103) are 75 ohm BNC connectors running on class 4 shielded coaxial at 22 gauge with two cables, one for sending and one for receiving video signals; 4 XLR to XLR on high-grade 3-wire audio shielded cabling for audio; and 25 pin shielded serial cable for digital video feed. An alternative connection for audio could be XLR to RCA cabling. However, an inherent disadvantage of this cabling is that it does not provide balanced audio. Also, BNC connectors or 25-pin shielded cable can be used interchangeably for video and for digital video. However, since video and audio distribution amplifier for NTSC signals (TRX 201) contains one BNC port and one 25-pin port, whichever interface is used for video, the other interface must be used for digital video.

Connection (18*f*) from HDTV Decompression Unit (104*a*) to video and audio distribution amplifiers for HDTV signals (TRX 202) is the primary audio, video and data connection to all of the other subsystems within system (10) for high definition component video signals (SMPTE 240M). Interface (18*f*) has five 75 ohm BNC connectors running on class 4 shielded coaxial cable at 22-gauge for video (one each for red, green, blue, horizonal synchronization, and vertical synchronization), and four XLR to XLR on 3-wire shielded cabling tier audio. These connections only have a send capacity and only occur within the HDTV decompression unit (TRX 104*a*) to video and audio distribution amplifiers for HDTV signals (TRX 202) interface (18*f*). Receive capacity for HDTV codec (TRX 104) is located in HDTV compression unit (TRX 104*b*) interface (18*g*) with system interconnections (TRX 251) which sends signals processed from the different subsystems or video and audio distribution amplifiers for HDTV signals (TRX 202) (through its cross-over at system interconnections (TRX 251)) back to HDTV compression unit (TRX 104*b*). The connections for interface (18*g*) from system interconnections (TRX 251) to HDTV compression unit (TRX 104*b*) are five 75 ohm BNC connectors running on class 4 shielded coaxial cable at 22-gauge for video (one each for red, green, blue, horizontal synchronization, and vertical synchronization), and four XLR to XLR on 3-wire shielded cabling for audio. An alternative connection for audio could be XLR to RCA cabling. However, an inherent disadvantage of this cabling is that it does not allow for balanced audio. Likewise, component video signals may be composed of a minimum of three of the components (red, green, and blue with synchronization on green). A disadvantage is that signal degradation is highly likely. Finally, the HDTV codec (TRX 104) provides for multi-component format conforming to SMPTE 240M (analog high definition standard), and has a future upgrade possibility to SMPTE 260M (digital high definition standard).

Interface (18*h*) is between video and audio distribution amplifier for NTSC signals (TRX 201) and system interconnections (TRX 251). Interface (18*h*) comprises an eight-channel connection, where each channel is composed of one 75 ohm BNC connector running on class 4 shielded coaxial cable at 22-gauge (RS 170A), one 25-pin shielded serial cable for digital video (CCIR601), and four XLR to XLR connectors on 3-wire shielded cabling for audio. Each channel is connected to the different subsystems of system (10). Connection (18*h*) from video and audio distribution amplifier for NTSC signals (TRX 201) to system interconnections (TRX 251) is for sending only and there is no receive capacity on video and audio distribution amplifier for NTSC signals (TRX 201). An alternative connection for audio could be XLR to RCA cabling; however, a disadvantage of this cabling is that it does not allow for balanced audio.

Connection (18*i*) is from video and audio distribution amplifiers for HDTV signals (TRX 202) to system interconnections (TRX 251) and comprises an eight-channel connection, where each channel is composed of five 75 ohm BNC connectors running on class 4 shielded coaxial cable at 22-gauge (SMPTE 240M), and four XLR to XLR on 3-wire shielded cabling for audio. Each channel is connected to the different subsystems of system (10). Connection (18*i*) has send capacity only and video and audio distribution amplifiers for HDTV signals (TRX 202) does not have receive capacity. An alternative connection for audio could be XLR to RCA cabling; however, this cabling does not allow for balanced audio.

Video conferencing is provided by optical video interface devices ("OVIDs") (TRX 300) in conjunction with remote site interface systems (TRX 400). OVID for digital multi-channel transmission (TRX 301) allows transmission of four studio-quality video channels and four stereo audio channels. Each signal is multiplexed onto two fibers, one for transmission and one for reception. OVID for digital single-channel transmission (TRX 302) allows transmission and reception of one video channel and two stereo audio channels on two fibers, one for transmission and one for reception. OVID for analog transmission (TRX 303) is a single-channel OVID which allows transmission and reception of a single NTSC (RS170A) video channel and a single stereo audio channel on two fibers, one for transmission and one for reception. Connections between video, audio and data distribution system wiring bus (TRX 250) and each OVID (TRX 300) may vary depending on the input into OVIDs (TRX 300). Each OVID (TRX 300) communicates with a remote site interface system (TRX 400). Optical data is transmitted and received through single-mode, dual-strand optical fiber ST connectors between OVID for digital multi-channel transmission (TRX 301) and remote site interface system (TRX 401) (connection (10*f*)), between OVID for digital single-channel transmission (TRX 302) and remote site interface system (TRX 402) (connection (10*g*)), and between OVID for analog transmission (TRX 303) and remote site interface system (TRX 403) (connection (10*h*)). Remote site interface systems (TRX 400) are designed and equipped such that they are complements of their corresponding OVID (TRX 300). An alternative connector in place of the ST connector would be a biconic single mode connector. A limitation of this connector is that over time the optical signal is subject to drift. Furthermore, this connector is difficult to align to the ports on OVIDS (TRX 300) and remote site interface systems (TRX 400).

Figure 2B:
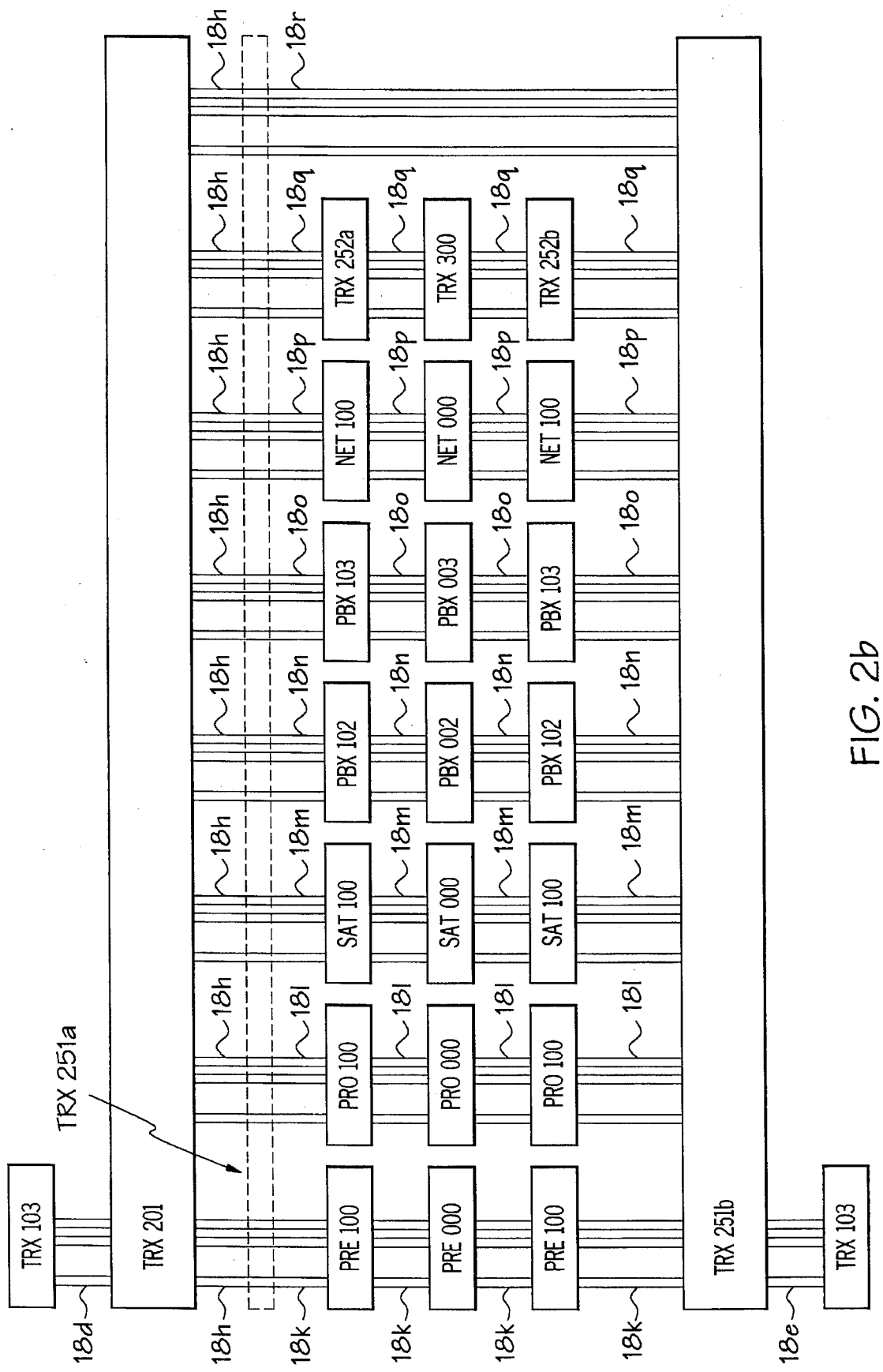
FIG. 2b shows in detail the NTSC interconnections for the transmission subsystem.

Now referring to FIGS. 2a and 2b, a NTSC-based signal or a CCIR601 digital video signal may be processed by any of the subsystems or routed for retransmission by NTSC Codec (TRX 103), HDTV Compression Unit (TRX 104b), Audio/Visual Codec for Fractional DS-1 (PBX 002), Audio/Visual Codec for DS-1 (PBX 003), network subsystem (NET 000), or satellite subsystem (SAT 000). Video and audio distribution amplifier for NTSC signals (TRX 201) serves as an NTSC distribution and presentation amplifier for signals. System interconnections (TRX 251) is the video, audio and data distribution cabling components between transmission system (TRX 000) and the other subsystems. For discussion purposes, system interconnections (TRX 251) is a wiring bus system comprising NTSC wiring bus (TRX 251a), NTSC wiring bus return feed (TRX 251b), component wiring bus (TRX 251c), and component wiring bus return feed (TRX 251d). NTSC wiring bus (TRX 251a) represents the wiring of NTSC video and audio from transmission subsystem (TRX 000) to the other subsystems, and NTSC wiring bus return feed (TRX 251b) represents the wiring from the other subsystems back to transmission subsystem (TRX 000). Component wiring bus (TRX 251c) represents the wiring of component video and audio from transmission subsystem (TRX 000) to the other subsystems, and component wiring bus return feed (TRX 251d) represents the wiring from the other subsystems to transmission subsystem (TRX 000). NTSC wiring bus (TRX 251a) is connected between transmission subsystem (TRX 000) and all other subsystems. NTSC wiring bus (251a) routes signals to the different subsystems in which a signal can be processed, retransmitted, or both. The signal (whether NTSC-based or CCIR601 digital video) is not limited to retransmission or processing as an NTSC-based signal or a high definition video signal, but may be converted into a different signal type by NTSC wiring bus return feed (TRX 251b) with RS-170A, CCIR 601, and (4) XLR inputs and eight complimentary sets of inputs. NTSC wiring bus return feed (TRX 251b) selects the type of return signal for transmission by NTSC codec (TRX 103). This ability to convert signals provides interoperability between multiple environments. For example, a digital video signal is coming into the NTSC CODEC (TRX 103), but another site needs it in a standard NTSC format. Once NTSC codec (TRX 103) receives the signal, the digital video signal may be sent to either presentation subsystem (PRE 000) or production subsystem (PRO 000) and converted to standard NTSC video. The signal is then resent to NTSC codec (TRX 103) and reformatted to DS-3 for transmission to the site. If the site is accessible by satellite only, NTSC codec (TRX 103) compresses the signal and transfers it to satellite subsystem (SAT 000) for transmission. Similarly, off-line recording for later transmission, live multi-site teleconferences, and on-line editing applications are a few of the many types of applications that can be performed in this manner. Off-line editing is an example of one of the applications that does not retransmit the signal. In order to provide live multi-site teleconferencing, multiple sites are linked using the feeds, high definition video, NTSC video, and off-line materials of one conferencing facility, and NTSC is used as the transmission signal to the different sites. Presentation subsystem (PRE 000) displays the different broadcasts simultaneously in display windows on a screen. Production subsystem (PRO 000) in coordination with presentation subsystem (PRE 000) and transmission subsystem (TRX 000) display the different feeds in the facility and selectively decide what to display at the other sites.

Connection (18d) between NTSC codec (TRX 103) to video and audio distribution amplifier for NTSC signals (TRX 201) was described in detail above and provides the sending capabilities of system interconnections (TRX 251). Connection (18e) from NTSC wiring bus return feed (TRX 251b) to NTSC codec (TRX 103) is the receive function of NTSC codec (TRX 103).

NTSC wiring bus (TRX 251a) comprises all connections running from video and audio distribution amplifier or NTSC signals (TRX 201) to the different subsystems' feeds and serves as a transmission medium from video and audio distribution amplifier for NTSC signals (TRX 201) to presentation subsystem (PRE 000), production subsystem (PRO 000), satellite subsystem (SAT 000), audio/visual codec for fractional DS-1 (PBX 002), audio/visual codec for DS-1 (PBX 003), network subsystem (NET 000), remote video, audio and data transmission equipment OVIDs (TRX 300), and NTSC wiring bus return feed (TRX 251b).

Video and audio distribution amplifier for NTSC signals (TRX 201) is connected (18k) to audio/visual cabling to and from presentation subsystem (PRE 100) by one 75 ohm BNC connector running on class 4 shielded coaxial cable at 22-gauge for video (RS 170A), one 25-pair shielded serial cable for digital video (CCIR601) and four XLR to XLR connectors on 3-wire shielded cabling for audio. Video and audio distribution amplifier for NTSC signals (TRX 201) is connected (18l) to all audio/visual feeds to and from production subsystem (PRO 100) by one 75 ohm BNC connector running on class 4 shielded coaxial cable at 22-gauge for video (RS170A), one 25-pin shielded serial cable for digital video (CCIR601), and four XLR to XLR connectors on 3-wire shielded cabling for audio. Likewise, video and audio distribution amplifier for NTSC signals (TRX 201) is connected (18m) to all audio and visual feeds to and from satellite subsystem (SAT 100) by one 75 ohm BNC connector running on class 4 shielded coaxial cable at 22-gauge for video (RS 170A), one 25-pin shielded serial cable for digital video (CCIR601), and four XLR to XLR connectors on 3-wire shielded cabling for audio.

Video and audio distribution amplifier for NTSC signals (TRX 201) is connected (18n) to audio/visual cabling to and from the fractional DS-1 codec (PBX 102) by one 75 ohm BNC connector running on class 4 shielded coaxial cable at 22-gauge for video (RS170A) and two XLR to XLR connectors on 3-wire shielded cabling for audio. Video and audio distribution amplifier for NTSC signals (TRX 201) is connected (18o) to audio/visual cabling to and from DS-1 codec (PBX 103) by one 75 ohm BNC connector running on class 4 shielded coaxial cable at 22-gauge for video (RS170A) and two XLR to XLR connectors on 3-wire shielded cabling for audio.

Video and audio distribution amplifier for NTSC signals (TRX 201) is connected (18p) to audio/visual cabling to and from the network subsystem feed (NET 100) by one 75 ohm BNC connector running on class 4 shielded coaxial cable at 22-gauge for video (RS170A), and tour XLR to XLR connectors on 3-wire shielded cabling for audio. Video and audio distribution amplifier for NTSC signals (TRX 201) is connected (18q) to video, audio and data distribution routes for remote locations (TRX 252a) by one 75 ohm BNC connector running on class 4 shielded coaxial cable at 22-gauge for video (RS170A) and four XLR to XLR connectors on 3-wire shielded cabling for audio.

Video and audio distribution amplifier for NTSC signals (TRX 201) is connected (18r) to NTSC wiring bus return feed (TRX 251*b*) by one 75 ohm BNC connector running on class 4 shielded coaxial cable at 22-gauge for video (RS170A), one 25-pin shielded serial cable for digital video (CCIR601), and four XLR to XLR connectors on 3-wire shielded cabling for audio. These connections are the cross-over connections from NTSC codec (TRX 103) via video and audio distribution amplifier for NTSC signals (TRX 201) to NTSC wiring bus return feed (TRX 251*b*) and returning to NTSC codec (TRX 103). This cabling system is composed of one 75 ohm BNC connector running on class 4 shielded coaxial cable at 22-gauge for video (RS170A), one 25-pin shielded serial cable for digital video (CCIR601), and four XLR to XLR connectors on 3-wire shielded cabling for audio.

An NTSC-based signal or a CCIR601 digital video signal may be sent for processing under any of the subsystems or routed for retransmission via DS-3 codec for NTSC (TRX 103), DS-3 codec for high definition receive component (TRX 104*b*), fractional DS-1 codec (PBX 002). DS-1 CODEC (PBX 003), network subsystem (NET 000), or satellite subsystem (SAT 000).

For example, a digital video signal enters the DS-3 codec for NTSC (TRX 103), but another site needs it in standard NTSC format. Once DS-3 codec for NTSC (TRX 103) receives the signal, the digital video signal may be sent to either presentation subsystem (PRE 000) or production subsystem (PRO 000) and converted to standard NTSC video. The signal is then resent to DS-3 codec for NTSC (TRX 103) and reformatted to DS-3 for transmission to the site. This equally applies to a site which is reachable only by satellite connection. In this case, the DS-3 codec for NTSC (TRX 103) would receive the signal and transfer it in decompressed format to satellite subsystem (SAT 000). At this point, the remote site could tune in to the appropriate satellite and receive the transmission.

There are multiple other similar applications such as off-line recording for later transmission, live multi-site teleconferences, on-line editing applications, etc. Off-line recording constitutes an example that does not use the signal for retransmission. Four sites could be linked together for live multi-site teleconferencing (with one NTBPS site's feed, high definition video, NTSC video, and off-line materials) using NTSC as the lowest common denominator for transmission purposes to the different sites. Presentation subsystem (PRE 000) could simultaneously display the different feeds in four windows on the screen. This would be managed by production subsystem (PRO 000) in coordination with both the presentation and the transmission subsystems. The user could also selectively decide what to display at the other sites.

The connection from the DS-3 codec for NTSC (TRX 103) to the audio and distribution amplifier for NTSC signals (TRX 201) is detailed above. Note that this connection forms the sending function within system interconnections (TRX 251). The connection from the wiring bus return feed (TRX 251*b*) to the DS-3 codec for NTSC (TRX 103), which will be covered later in this description, is the receive function of the DS-3 codec for NTSC (TRX 103) (from system interconnections (TRX 251) as described in FIG. 2).

NTSC wiring bus (TRX 251*a*) consists of all connections running from audio and distribution amplifier for NTSC signals (TRX 201) to the feeds of the different subsystems. As such, NTSC wiring bus (TRX 251*a*) serves as a medium from the audio and distribution amplifier for NTSC (TRX 201) signals to presentation subsystem (PRE 000), production subsystem (PRO 000), satellite subsystem (SAT 000), fractional DS-1 codec (PBX 002), DS-1 codec (PBX 003), network subsystem (NET 000), remote video, audio and data transmission equipment (TRX 300), and NTSC wiring bus return feed (TRX 251*b*).

Connections (18*k*, 18*l*, 18*m*) from NTSC wiring bus (TRX 251*a*) to presentation subsystem feed (PRE 100), production subsystem feed (PRO 100), and satellite subsystem feed (SAT 100) consist of the same cabling configuration. This cabling configuration consists of one 75 ohm BNC connector running on class 4 shielded coaxial cable at 22-gauge for video (RS170A), one 25-pin shielded serial cable for digital video (CCIR601), and four XLR-to-XLR connectors on 3-wire shielded cabling for audio.

Connections (18*n*, 18*o*) from NTSC wiring bus (TRX 251*a*) to fractional DS-1 codec's feed (PBX 102) and to DS-1 codec's feed (PBX 103) consist of the same cabling configuration. This cabling configuration consists of one 75 ohm BNC connector running on class 4 shielded coaxial cable at 22-gauge for video (RS 170A) and two XLR-to-XLR connectors on 3-wire shielded cabling for audio.

Connections (18*p*, 18*q*) from NTSC wiring bus (TRX 251*a*) to network subsystem feed (NET 100) and to video, audio and data distribution router for remote locations (TRX 252*a*) consist of the same cabling configuration. This cabling configuration consists of one 75 ohm BNC connector running on class 4 shielded coaxial cable at 22-gauge for video (RS170A) and four XLR-to-XLR connectors on three-wire shielded cabling for audio.

Connection (18*r*) from audio and distribution amplifier for NTSC signals (TRX 201) to NTSC wiring bus return feed (TRX 251*b*) refers to the cross-over connections from DS-3 codec for NTSC (TRX 103) via audio and distribution amplifier for NTSC signals (TRX 201) to NTSC wiring bus return feed (TRX 251*b*) and returning to DS-3 codec for NTSC (TRX 103). This cabling configuration consists of one 75 ohm BNC connector running on class 4 shielded coaxial cable at 22-gauge tier video (RS 170A), one 25-pin shielded serial cable for digital video (CCIR601), and four XLR-to-XLR connectors on 3-wire shielded cabling for audio.

Connections (18*k*, 18*l*, 18*m*, 18*n*, 18*o*, 18*p*, 18*q*) from presentation subsystem feed (PRE 100) to presentation subsystem (PRE 000), production subsystem feed (PRO 100) to production subsystem (PRO 000), satellite subsystem feed (SAT 100) to satellite system (SAT 000), fractional DS-1 codec feed (PBX 102) to fractional DS-1 codec (PBX 002), DS-1 codec feed (PBX 103) to DS-1 codec (003), network subsystem feed (NET 100) to network subsystem (NET 000), and video, audio and data distribution router for remote locations (TRX 252*a*) to remote video, audio and data transmission equipment (TRX 300) are respectively identical in composition to the connections specified from NTSC wiring bus (TRX 251*a*) to presentation subsystem feed (PRE 100), production subsystem feed (PRO 100), satellite subsystem feed (SAT 100), fractional DS-1 codec feed (PBX 102), DS-1 codec feed (PBX 103), network subsystem feed (NET 100), and video, audio and data distribution router for remote locations (TRX 252*a*).

Likewise, connections (18*k*, 18*l*, 18*m*, 18*n*, 18*o*, 18*p*, 18*q*) from presentation subsystem (PRE 000) to presentation subsystem feed (PRE 100), production subsystem (PRO 000) to production subsystem feed (PRO 100), satellite subsystem (SAT 000) to satellite subsystem feed (SAT 100), fractional DS-1 codec (PBX 002) to fractional DS-1 codec feed (PBX 102), DS-1 codec (PBX 003) to DS-1 codec feed (PBX 103), network subsystem (NET 000) to network subsystem feed (NET 100) and remote video, audio and data transmission equipment (TRX 300) to NTSC wiring bus return feed (TRX 252b) are respectively identical in composition as the connections specified from NTSC wiring bus (TRX 251a) to presentation subsystem feed (PRE 100), production subsystem feed (PRO 100), satellite subsystem feed (SAT 100), fractional DS-1 codec feed (PBX 102), DS-1 codec feed (PBX 103), and network subsystem feed (NET 100).

Finally, connections (18k, 18l, 18m, 18n, 18o, 18p, 18q) from presentation subsystem feed (PRE 100), production subsystem feed (PRO 100), satellite subsystem feed (SAT 100), fractional DS-1 codec feed (PBX 102), DS-1 codec feed (PBX 103), network subsystem feed (NET 100), and NTSC wiring bus return feed (TRX 251b) are respectively identical in composition to the connections specified from NTSC wiring bus (TRX 251a) to presentation subsystem feed (PRE 100), production subsystem feed (PRO 100), satellite subsystem feed (SAT 100), fractional DS-1 codec feed (PBX 102), DS-1 codec feed (PBX 103), and network subsystem feed (NET 100). NTSC wiring bus return feed (TRX 251b) returns a signal back to the DS-3 codec for NTSC (TRX 103) in transmission subsystem (TRX 000). This connection is detailed in FIG. 2 as described within connection (18e) from system interconnections (TRX 251) to the DS-3 codec for NTSC (TRX 103).

Figure 2C:
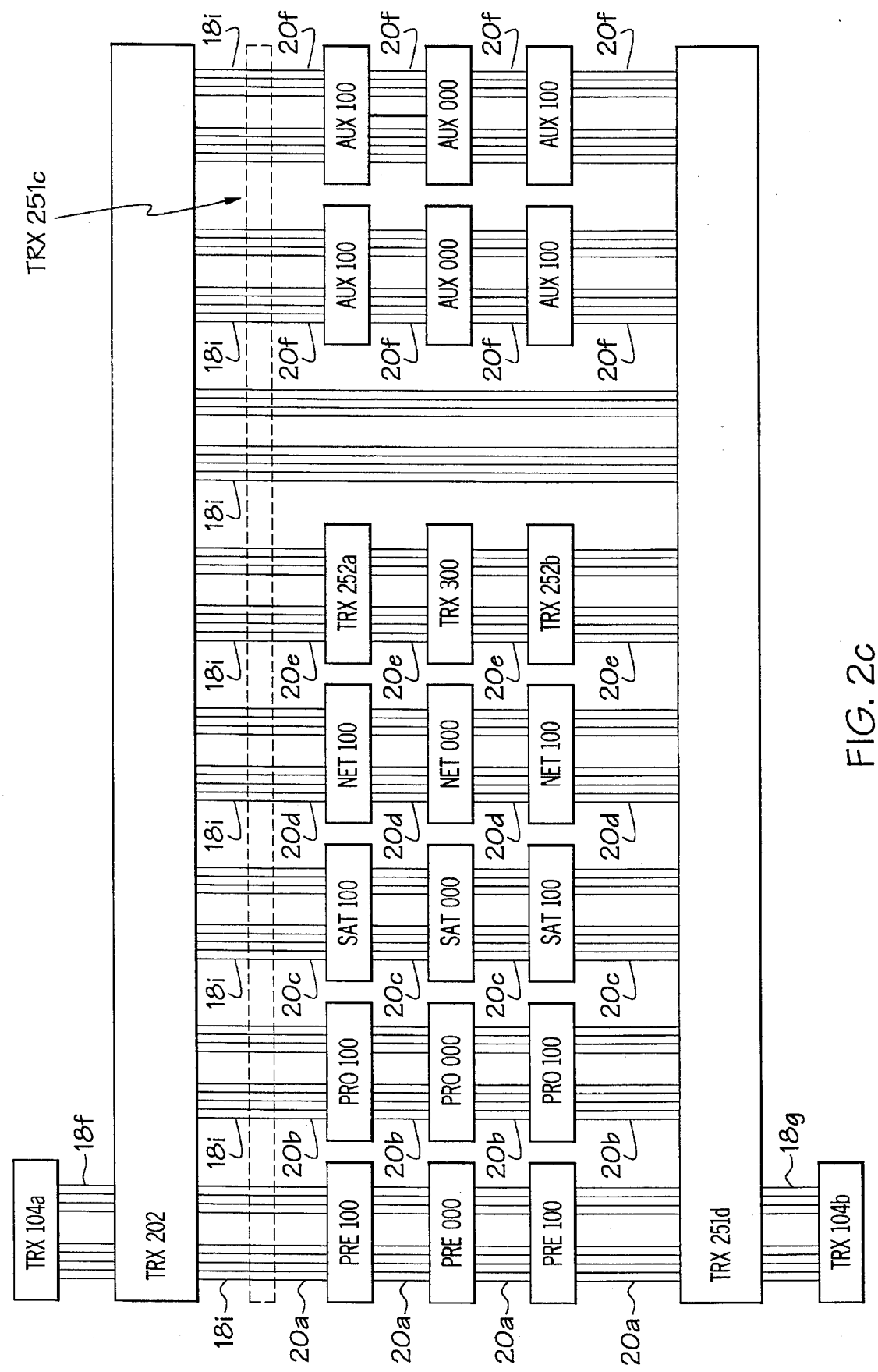
FIG. 2c shows in detail the high definition component video interconnections of the transmission subsystem of the present invention.

FIG. 2c illustrates the various interconnections for component video from and to high definition codec (TRX 104) within transmission subsystem (TRX 000). Distribution amplifier (TRX 202) provides feeds to the other subsystems, specifically presentation subsystem (PRE 000), production subsystem (PRO 000), satellite subsystem (SAT 000), network subsystem (NET 000), optical video interface devices (TRX 300) of transmission subsystem (TRX 000), and other auxiliary subsystems (AUX 000) which may be added to supplement system (10) as required. Component video signals from the other subsystems within system (10) return to transmission system (TRX 000) through component wiring bus return feed (TRX 251d). Due to the interconnections between devices, a signal originally received into presentation subsystem (PRE 000) could be returned through another subsystem such as production subsystem (PRO 000), satellite subsystem (SAT 000), or network subsystem (NET 000). In essence, an incoming signal, when it meets distribution amplifier (TRX 202), can be split into eight separate outputs each equal to the original signal (which accounts for the one-to-eight ratio within the distribution amplifier).

A signal received through high definition codec decompression unit (TRX 104a) can be directly returned for retransmission through high definition codec compression unit (TRX 104b). System (10) is designed such that a signal received from one location can be returned to that location, another location, or multiple locations inclusive or exclusive of the originating source. For example, a user at a remote site can send unedited, high definition material to system (10). When the signal reaches transmission subsystem (TRX 000), the signal is routed via switching matrix (TRX 003) to high definition codec decompression unit (TRX 104a) which processes the signal into SMPTE 240M format. Then, this same signal is routed to component distribution amplifier (TRX 202) where the signal can be routed to different subsystems. The signal can be viewed directly via presentation subsystem (PRE 000); the signal can be sent to production subsystem (PRO 000) for editing or for the addition of special effects or both; the signal can be sent to satellite subsystem (SAT 000) for rebroadcast via satellite; the signal can be sent to network subsystem (NET 000) for on-line viewing on network workstations or for mass storing high definition material; the signal can be sent to optical video interface devices (TRX 300) for retransmission and viewing at other remote locations (TRX 400); or, the signal can be returned to high definition codec compression unit (TRX 104a) for retransmission to other systems that are compatible with system (10). In addition, the signal can be routed to auxiliary components (AUX 000) which may include, but are not limited to the following: additional presentation components such as large-screen projectors, high definition monitors, etc., alternative transmission media such as high definition broadcast via traditional means, microwave relay, copper-based forms of system (10), or companion systems co-located with an existing system (10). Co-locate means that two or more systems (10) are located and interconnected at the same site.

Component wiring bus (TRX 251c) contains all component wiring leading from transmission subsystem (TRX 000) to all other subsystems and consists of all connections running from component video and audio distribution amplifier (TRX 202) to the feeds of the different subsystems. Basically, component wiring bus (TRX 251c) is a routing bus that serves as a medium from component video and audio distribution amplifier (TRX 202) to presentation subsystem (PRE 000), production subsystem (PRO 000), satellite subsystem (SAT 000), and network subsystem (NET 000), optical video interface devices (TRX 300), auxiliary components (AUX 000), and component wiring bus return feed (TRX 251d).

Connections (20a, 20b, 20c, 20d, 20e, 20f) from component wiring bus (TRX 251c) to presentation subsystem feed (PRE 100), production subsystem feed (PRO 100), satellite subsystem feed (SAT 100), network subsystem feed (NET 100), video, audio and data distribution router for remote locations (TRX 252a), and auxiliary component feed (AUX 100) consist of the same cabling configuration. This cabling configuration consists of five 75 ohm BNC connectors running on class 4 shielded coaxial cable at 22-gauge for component video, and four XLR-to-XLR connectors on 3-wire shielded cabling for audio.

Connections (20a, 20b, 20c, 20d, 20e, 20f) from presentation subsystem feeds (PRE 100) to presentation subsystem (PRE 000), from production subsystem feed (PRO 100) to production subsystem (PRO 000), from satellite subsystem feed (SAT 100) to satellite system (SAT 000), from network subsystem feed (NET 100) to network system (NET 000), from video, audio and data distribution router for remote locations (TRX 252a) to optical video interface devices (TRX 300), and from auxiliary component feed (AUX 100) to auxiliary component (AUX 000) are respectively identical in composition to the connections specified from component wiring bus (TRX 251a) to presentation subsystem from feed (PRE 100), production subsystem feed (PRO 100), satellite subsystem feed (SAT 100), network subsystem feed (NET 100), video, audio and data distribution router for remote locations (TRX 252a), and to auxiliary component feed (AUX 100).

Connections (20a, 20b, 20c, 20d, 20e, 20f) from presentation subsystem (PRE 000) to its feed (PRE 100), from production subsystem (PRO 000) to its feed (PRO 100), from satellite subsystem (SAT 000) to its feed (SAT 100), from network subsystem (NET 000) to its feed (NET 100), video, audio and data distribution router for signals returning from remote locations (TRX 252b) to optical video subsystem (TRX 300), and from auxiliary component (AUX 000) to its feed (AUX 100) are respectively identical in composition to the connections specified from component wiring bus (251c) to presentation subsystem feed (PRE 100), production subsystem feed (PRO 100), satellite subsystem feed (SAT 100), network subsystem feed (NET 100), video, audio and data distribution router for remote locations (TRX 252a), and to the auxiliary component feed (AUX 100).

Connections (20a, 20b, 20c, 20d, 20e, 20f) from presentation subsystem feed (PRE 100), production subsystem feed (PRO 100), satellite subsystem feed (SAT 100), network subsystem feed (NET 100), auxiliary subsystem feed (AUX 100), and video, audio and data distribution router for signals returning from remote locations (TRX 252b) to component wiring bus return feed (TRX 251d) are respectively identical in composition to connections specified from component wiring bus (TRX 251c) to presentation subsystem feed (PRE 100), production subsystem feed (PRO 100), satellite subsystem feed (SAT 100), network subsystem feed (NET 100), video, audio and data distribution router for remote locations (TRX 252a), and to auxiliary component feed (AUX 100). The one-to-eight component video and audio presentation switcher (TRX 202) returns a signal back to the high definition codec compression unit (TRX 104b) in the transmission system (TRX 000).

Figure 2D:
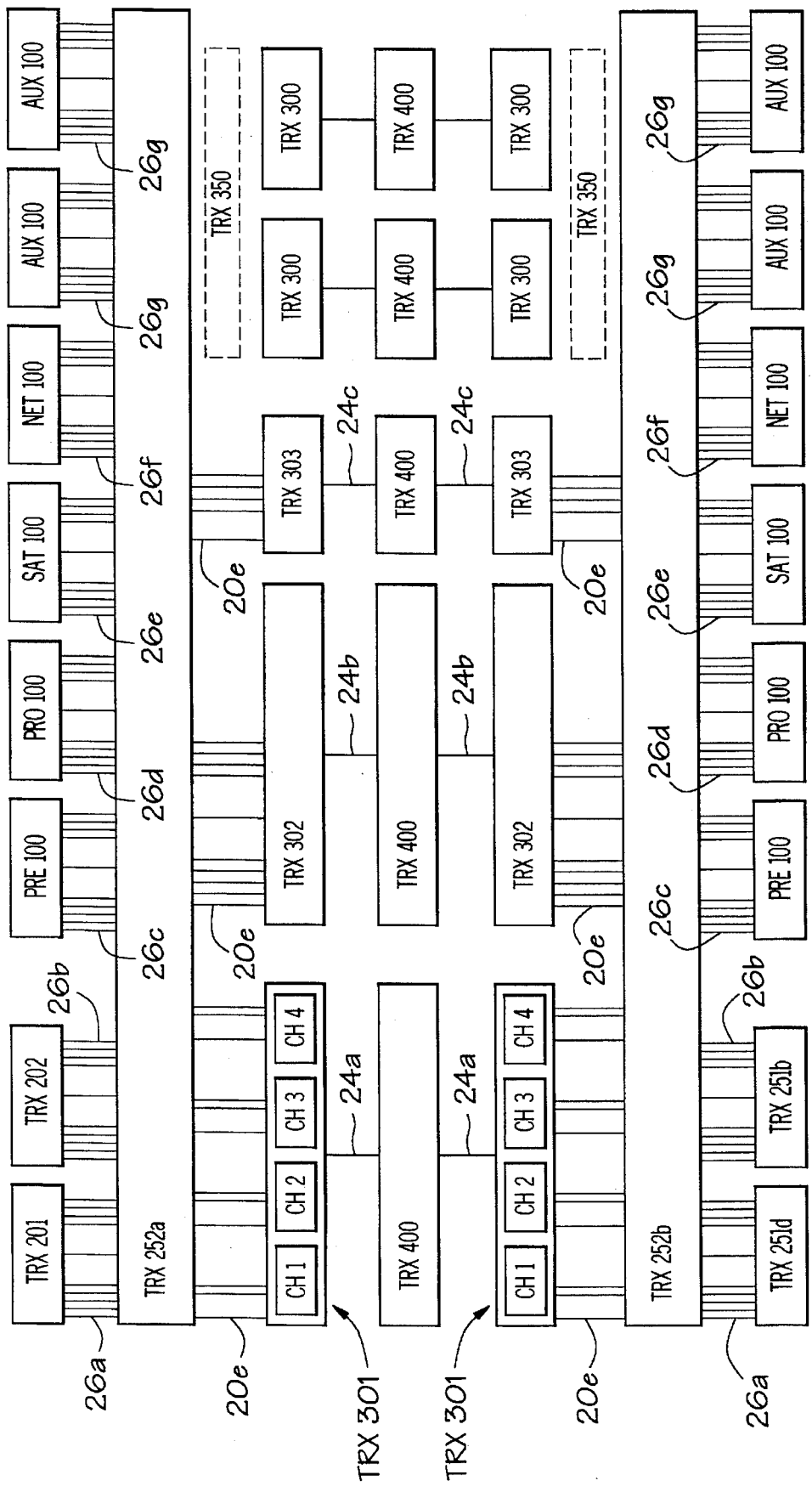
FIG. 2d shows in detail the interface between the optical video components and the rest of the transmission subsystem.

FIG. 2d is a detailed illustration of connections for optical video interface devices (TRX 300). OVIDs (TRX 300) consist of feeds from the other subsystems which compose system (10). In addition to OVIDS (TRX 300), two audio and data distribution switcher/routers (TRX 252a and TRX 252b) and an integrated cabling scheme are used. OVIDs (TRX 300) can receive composite video (NTSC), digital video (CCIR601), component video (SMPTE 240M and derivatives), and audio signals. OVIDs (TRX 300) can transmit a signal (in the input format) to remote locations (TRX 400) attached to system (10) by fiber optic link.

Signals sent from remote locations (TRX 400) to system (10) by fiber optic link can be processed or retransmitted or both by system (10). This operation is specifically performed through video, audio and data distribution router for signals returning from remote locations (TRX 252b), which routes back to NTSC wiring bus return feeds (TRX 251b) and component wiring bus return feeds (TRX 251d). Audio is shared between digital, composite, and component video feeds. Video, audio and data distribution switcher/routers (TRX 252a and TRX 252b) can simultaneously accept digital, composite, and component video signals, each with associated audio over eight lines. Since the switcher/routers have only four audio inputs, these components can only support one video signal per input line with Dolby surround sound. Quite significantly, each OVID (TRX300) provides a 1.2 megabyte data channel which may be utilized for connection to NET 000 for operational control of an application system for visually-based applications such as pay-for-view, video on demand, and video mail from remote locations to the system (10); and enables through NET 000 and/or TRX000 to further provide system to system (10) connection of same.

If multiple signals must be processed simultaneously on one line, the audio portions of these signals cannot be supported with Dolby surround sound. Therefore, when multiple signals must be processed simultaneously on one line, the audio portions are split out into stereo and mono aural channels. For two signals, the audio portions can be separated into two stereo channels connected to the four audio ports on the switcher/router. For three video signals, their associated audio can be separated into two mono aural channels and one stereo channel, connected to the four audio ports on the switcher/router.

The connection from audio and distribution amplifier for NTSC signals (TRX 201) to video, audio and data distribution router for remote locations (TRX 252a) represents the feed coming from transmission subsystem into OVIDs (TRX 300). Video, audio and data distribution router for remote locations (TRX 252a) performs a multi-channel eight-to-eight matrical routing operation, indicating that it can switch a series of one to 36 inputs to corresponding outputs or any combination of inputs to outputs. Thus, a user could enter eight inputs and output a total of 32 outputs (limited to a total of 36 output ports). Video, audio and data distribution router for remote locations (TRX 252a) particular application in this instance is to receive inputs from the different subsystems within system (10) and output these signals to optical video interface devices (TRX 300) for transmission to locations remote (TRX 400) from system (10). By its matrical switching capabilities, inputs to video, audio and data distribution router for remote locations (TRX 252a) can include a diverse set of audio and video inputs which then can be routed to all or selected OVIDs (TRX 300).

All connections for equipment attached to video, audio and data distribution router for remote locations (TRX 252a) as inputs or outputs are identical. This includes connections (22a, 22b, 22c, 22d, 22e, 22f, 22g) from video, audio and data distribution router for remote locations (TRX 252a) to audio and distribution amplifier for NTSC signals (TRX 201), audio and distribution amplifier for high definition signals (TRX 202), presentation subsystem feed (PRE 100), production subsystem feed (PRO 100), satellite subsystem feed (SAT 100), network subsystem feeds (NET 100), two auxiliary component feeds (AUX 100), optical video interface device for digital multi-channel transmission (TRX 301), optical video interface device for digital single-channel transmission (TRX 302), optical video interface device for analog transmission (TRX 303), and any other OVID-type device (such as devices that have multi-channel, multi-component, digital, and/or analog video and audio capability [copper-based] to fiber-based systems as well as light-guide devices such as laser transmission systems [which can be included within this subsystem]). Connections (22a, 22b, 22c, 22d, 22e, 22f, 22g) are component 75 ohm BNC connectors running on class 4 shielded coaxial cable at 22-gauge per manufacturer specifications.

OVIDs (TRX 300) are not considered to be a production-quality medium, they are primarily designed for local reception purposes and transmission via other subsystems within system (10). Other systems can view audio and video materials with high-presentation value, but do not require studio- or production-quality materials since remote locations (TRX 400) are not meant to be used for editing facilities. System (10) has been designed this way due to the audio portion of the materials, which require dual-strand audio cabling.

Multi-channel digital optical video interface device (TRX 301) is capable of combining a maximum of eight video inputs (the standard configuration is four video channels as shown in FIG. 2d) and four stereo inputs into a single optical signal. This is a copper-to-fiber conversion process wherein the eight video and four audio signals (copper-based) are converted via the multi-channel digital optical video interface device (TRX 301) to a single, fiber-based signal.

Single-channel digital optical video interface device (TRX 302) is capable of combining a maximum of one video channel (in either composite, component, or super video [Y/C]) and four stereo inputs into a single optical signal. This is a copper-to-fiber conversion process wherein one video and four audio signals (copper-based) are converted via single-channel digital optical video interface device (TRX 302) to a single, fiber-based signal.

Single-channel analog optical video interface device (TRX 303) is capable of combining a maximum of one video channel (RS 170A composite) and four stereo inputs into a single optical signal. This is a copper-to-fiber conversion process wherein one video and four audio signals (copper-based) are converted via single-channel analog optical video interface device (TRX 303) to a single, fiber-based signal.

Connections (24*a*, 24*b*, 24*c*) from optical video interface device for digital multi-channel transmission (TRX 301), optical video interface device for digital single-channel transmission (TRX 302), and optical video interface device for analog transmission (TRX 303) to remote site interface system (TRX 400) are via single-mode ST connectors. The ST connector cable is dual-strand, single-mode fiber. This configuration allows a maximum of one send and receive connection. The ST connectors provide sure and consistent fiber-to-port connection, and are recognized as an industry standard. The primary advantage of an ST connection is that it provides virtually unlimited bandwidth capacity. An alternate connector that can be used is a biconic single-mode connector. However, a limitation of this connector is that over time the optical signal will become subject to drift. Furthermore, the actual connector is difficult to align to the port on remote site interface system (TRX 400).

Remote site interface system (TRX 400) is the transport between optical video interface device for digital multi-channel transmission (TRX 301) at one site and its complement at another site. That is, remote site interface system (TRX 400) is a nonsystem site's equivalent to OVIDs (TRX 300). Remote site interface system (TRX 400) transports the single digital signal from one optical video interface device for digital multi-channel transmission unit (TRX 301) to another optical video interface device for digital multi-channel transmission unit (TRX 301) at a different site or to a site that does not have system (10), but has a compatible optical video interface device (TRX 300). In essence, remote site interface system (TRX 400) is the medium for receiving and transmitting signals for a site that is not compatible with system (10).

All connections for equipment attached to video, audio and data distribution router for signals returning from remote locations (TRX 252*b*) as inputs or outputs are identical. This includes connections from video, audio and data distribution router for signals returning from remote locations (TRX 252*b*) to component wiring bus return feed (TRX 251*d*), NTSC wiring bus return feed (TRX 251*b*), presentation subsystem feed (PRE 100), production subsystem feed (PRO 100), satellite subsystem feed (SAT 100), network subsystem feeds (NET 100), two auxiliary component feeds (AUX 100), optical video interface device for digital multi-channel transmission (TRX 301), optical video interface device for digital single-channel transmission (TRX 302), optical video interface device for analog transmission (TRX 303), and any other OVID-type device (such as devices that have multi-channel, multi-component, digital, and/or analog video and audio capability [copper-based] to fiber-based systems as well as light-guide devices such as laser transmission systems [which can be included within this subsystem]). These connections are via component 75 ohm BNC connectors running on class 4 shielded coaxial cable at 22-gauge per manufacturer specifications.

General reference for any cabling scheme (TRX 350) for or to the two video, audio and data distribution switcher/routers (TRX 252*a* and TRX 252*b*) and an optical video interface device (TRX 300) leaves room for future changes or expansions to the current cabling scheme. Any future cabling schemes will still serve as a copper-to-fiber process between OVIDs (TRX 300) and remote site interface system (TRX 400).

Video, audio and data distribution router for remote locations (TRX 252*a*) and video, audio and data distribution router for signals returning from remote locations (TRX 252*b*) are the exact same unit, but for purposes of explaining their operation they have been divided according to their send and receive capabilities.

Use of OVIDS (TRX 300) as depicted in FIG. 2*d*, provides a different means of transmitting video and audio material at a more economic rate based on existing technology. Users who do not need dedicated, fiber-based telephony can use the copper-based components as shown in this figure to effectively transport video and audio materials on a proprietary fiber scheme. Because transmission costs over DS-3 lines are more expensive than sending the exact same materials via OVIDs (TRX 300) primarily due to the higher cost of fiber optic DS-3 equipment versus optical video interface devices.

NETWORK SUBSYSTEM

Figure 3:
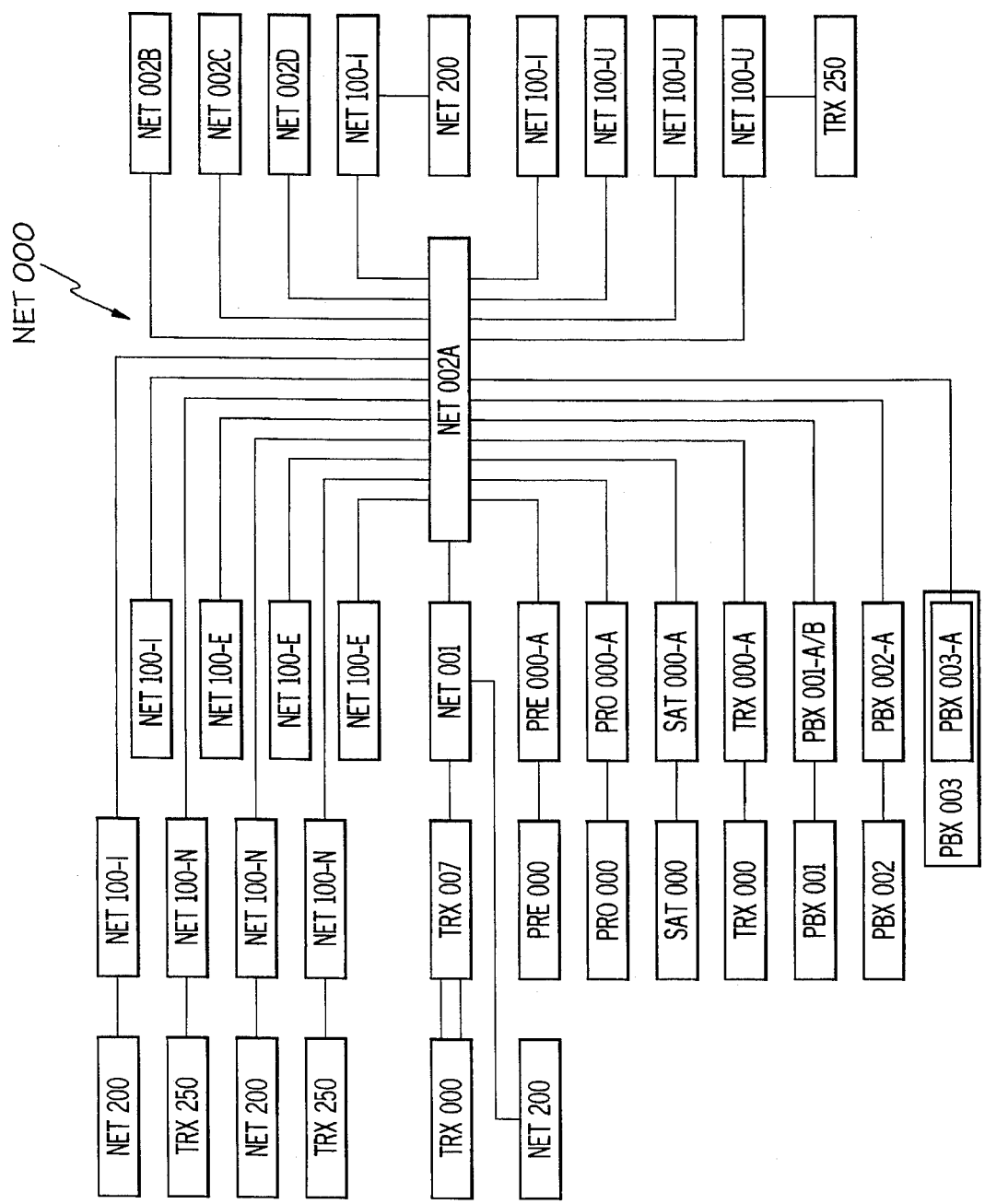
FIG. 3 is a schematic diagram illustrating the computer network subsystem of the present invention.

Now referring to FIG. 3, the driving force behind system (10) is the computer software that operates and controls network subsystem (NET 000) and transmission subsystem (TRX 000). The network operating software is an integrated management picture of multi-vendor for local and wide area networks. The software's architecture is based on Simplified Network Management Protocol (SNMP) which is capable of managing FDDI/Ethernet bridges, FDDI concentrators, and fiber optic Ethernet concentrators as well as any other SNMP-compatible network device. The graphical on-screen interface is based on Windows and presents a logical and consistent view of multiple network management functions.

Operational control for system (10) is directed through network subsystem (NET 000) which is designed to transfer digital data at high speeds. In addition, the network subsystem can function as a local area network (LAN), a metropolitan area network (MAN), a wide area network (WAN) and as a global access system. The network subsystem can function as all of these area networks simultaneously and process digital data from multiple locations worldwide. The network subsystem has the ability to be expanded as necessary, to be adapted and reconfigured based on user demand, and can provide a universal means for translating a number of signal formats.

Network subsystem (NET 000) comprises a backbone of fiber optic cabling which is attached to a plurality of user workstations (NET 100*x* or NET 100I, NET 100N, NET 100E, NET 100U). At each system (10) site, a LAN provides an internal pathway for transferring data, regardless of format, to each workstation (NET 100*x*) and subsystem. Because system (10) utilizes a fiber optic means of transmission, workstations (NET 100*x*) can be located as far away as two kilometers from system (10) site if multi-mode cabling is used. If single-mode cabling is used, workstations (NET 100*x*) can be located up to 20 kilometers away from system (10) site. Thus, each system (10) site's coverage can encompass a metropolitan location which, when connected, forms a MAN. Furthermore, each system (10) site is linked together via its transmission subsystem (TRX 000) which forms a WAN which enables multiple system (10) sites to pass data to one another. Globally, a system (10) site can communicate with a nonsystem site which utilizes FDDI protocols compatible with system (10). Effectively, the network subsystem within any system (10) can process digital data in any format from multiple locations within its own site, from multiple locations within a city, from remote system (10) site locations, or from any location with FDDI capability.

Network subsystem (NET 100) can be expanded or reduced according to its specific application. For example, a recommended maximum configuration for the network subsystem is to provide a simulated business environment that provides complete audio, video, computer and telephony capabilities for accessing all necessary resources to conduct local, domestic, and foreign operations simultaneously. The maximum configuration is capable of full desktop video teleconferencing, full access and control of the system from any remote location, complete multimedia capabilities, and user access to peripheral as well as virtual devices. The maximum network subsystem configuration enables users to have complete control of the broadcast and presentation system at their site and all other broadcast and presentation system (10) locations.

A maximum network subsystem configuration includes peripheral devices such as printers, plotters, facsimile machines, animatics machines, and genigraphic systems. In addition, a user at one site can access a peripheral or virtual device attached to a workstation at a local or remote location. For example, a user in Chicago can access system (10) in New York to use a peripheral device such as a facsimile machine and the virtual device that is necessary to operate the fax such as software. In a minimum network subsystem configuration, a user can access a peripheral or virtual device only at the on-site location and cannot access a peripheral or virtual device at a remote location. User capabilities are limited primarily to on-site operations only for minimum configurations, because the necessary computer hardware and software is absent.

A network subsystem minimum configuration has limited user access and control, limited desktop video conferencing capabilities, limited multimedia capabilities, and the absence of a simulated business environment. Effectively, the minimal configuration addresses only the concerns of system control; that is, it accounts for only the computer workstations necessary to control the transmission, presentation, production, satellite, public exchange, and network subsystems.

The network subsystem is highly adaptable because workstations are added or subtracted from the network easily. Similarly, the network subsystem can be reconfigured to form micronetworks within the primary network. For example, the workstations within a computer lab at a system site could function on their own micronetwork and have no other access to the additional capabilities of the system even though these workstations are part of the network subsystem. In this instance, these workstations would be limited to only the peripheral and virtual devices directly attached to their micronetwork. Thus, a network subsystem can be changed according to the needs of the user on the workstations attached to the network.

If a nonsystem site has the necessary equipment to transmit digital data (via analog telephone, DS-0, DS-1, DS-3, OC-1, or FDDI), a system can send and receive digital signals to and from the nonsystem site. The network subsystem can process digital data that is received from a nonsystem location by translating the data into a usable format for the system. Therefore, the network subsystem is a digital gateway capable of accepting any digital signal format and retaining the original signal format integrity until translated.

Although the workstations attached to the network subsystem primarily provide complete operational control of the subsystems forming the system, these workstations also can be utilized as individual workstations, as system controllers for each of the subsystems within the system, or as desktop video conferencing workstations.

Figure 3A:
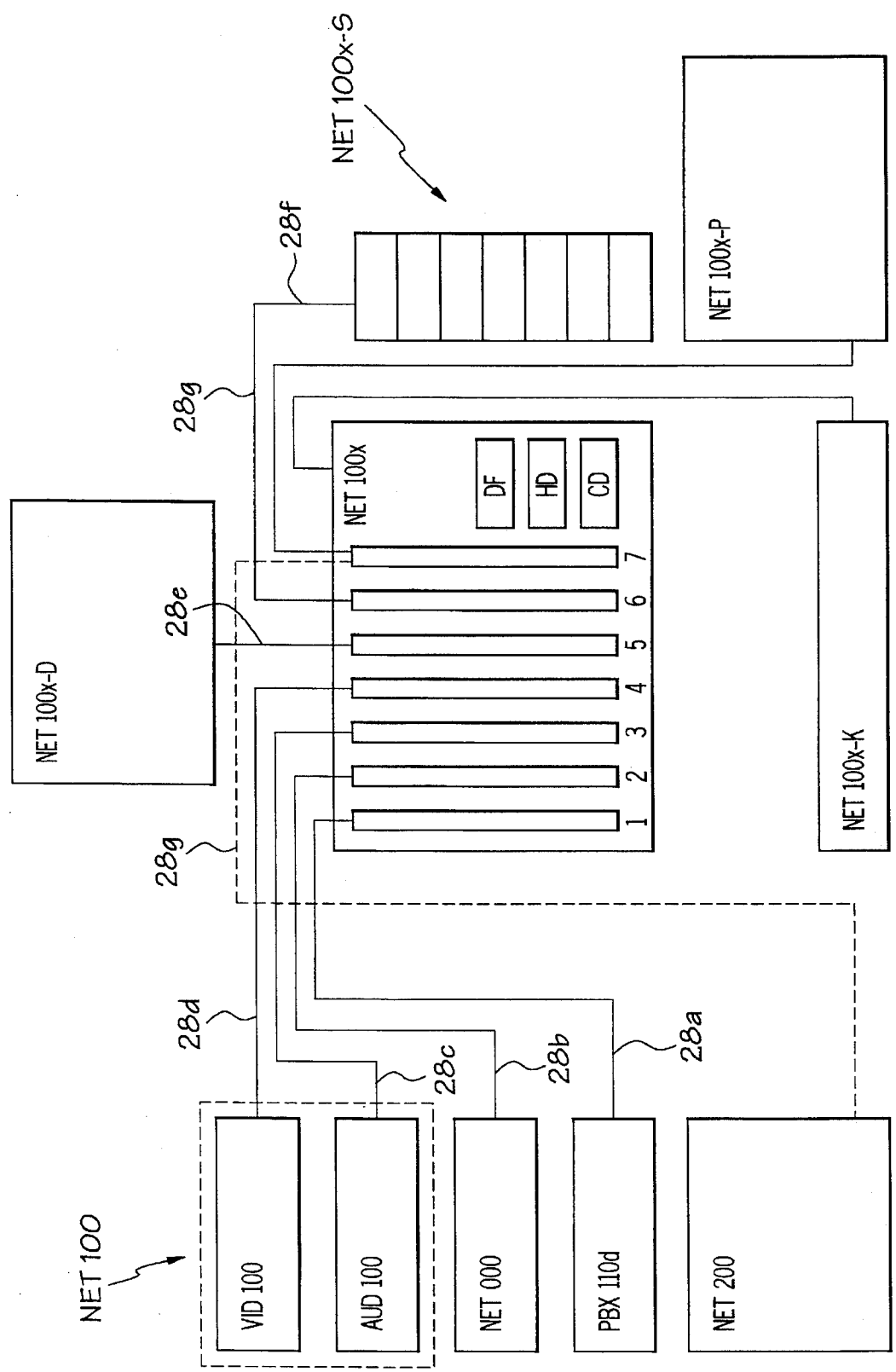
FIG. 3a shows in detail the workstation configuration of the network subsystem of the present invention.

FIG. 3a illustrates the maximum recommended configuration of network subsystem workstations (NET 100x) and outlines the common functional components within the different types of workstations used in network subsystem (NET 000). Each workstation (NET 100x) is cabled with two strands of multi-mode fiber optic cabling and terminated with multi-mode ST connectors. Typically, a workstation consists of a central processor unit, display, keyboard, pointing device, and an output device. These workstations are designed to fit easily on a desktop for individual use. These devices have user-friendly interfaces and can perform a variety of tasks and functions from desktop publishing, computer-based graphics, database management, accounting, text processing, programming, teleconferencing, and other functions that can be designed or added into the particular device.

Network workstations (NET 100x) comprise a base unit housing the central processor unit, memory, and storage devices. Additionally, a computer display monitor, keyboard, pointing device, and input/output controllers are added to provide complete functionality for each workstation. As indicated above, many devices have additional equipage already built into their architecture. Specifically, these added components can include peripheral cards installed in the base unit or peripheral devices connected externally to the base unit.

The common components for the four types of workstations include a base unit with memory, a central processor unit, and storage devices. Other common components are workstation display monitor (NET 100x-D), workstation diskette drives (NET 100x-DF), workstation hard drive(s) (NET 100x-HD), workstation optical drive(s) (NET 100x-CD) workstation keyboard (NET 100x-K), workstation serial devices such as serial mouse, digitizer pad, image scanners, and terminal-to-terminal connections (NET 100x-P), workstation SCSI or SCSI-II devices such as external storage and backup mechanisms (NET 100x-S), workstation personal codec for DS-0 (NET 100x-1), workstation FDDI network card (NET 100x-2), workstation sound input and output card (NET 100x-3), workstation NTSC video input and output card (NET 100x-4), workstation video controller (NET 100x-5), workstation small computer systems interface-II (SCSI-II) controller (NET 100x-6), and workstation input, output, and disk controller (NET 100x-7).

Workstation personal codec for DS-0 (NET 100x-1) provides, through a DS-0 connection (28a), limited desktop video conferencing services through private exchange system's digital port (PBX 110d). A four-pair class 4 shielded twisted pair cable with RJ-45 connectors forms the connection.

Workstation FDDI network card (NET 100x-2) provides connection (28b) to network system (NET 000) via dual strand multi-mode fiber optic cable using ST multi-mode connectors. Within network subsystem (NET 000), workstation FDDI network card (NET 100x-2) routes directly to fiber optic concentrator (NET 002A).

Workstation sound input and output carol (NET 100x-3) connects (28c) to audio feeds (AUD 100). Workstation NTSC video input and output card (NET 100x-4) connects (28d) to video feeder (VID 100). These feeds form network subsystem's combined audio and video feed (NET 100). Workstation sound input and output card (NET 100x-3) and workstation NTSC video input and output card (NET 100x-4) connect to audio and video feeds (NET 100) either from the transmission subsystem connection to the network system's combined audio and video feeds via wiring bus (TRX 251), or through on-site audio and video devices such as a video tape recorder/player or camera and microphone. Connections (28c, 28d) are necessary for video teleconferencing or for multimedia applications and are formed via 75 ohm BNC connectors running on class 4 shielded coaxial cable at 22-gauge for video and two XLR-to-XLR connectors on 3-wire shielded cabling for audio.

Workstation video controller (NET 100x-5) provides the ability to display data on display monitor (NET 100x-D). Connection (28e) is the manufacturer's specifications for cabling.

Workstation or SCSI-II controller (NET 100x-6) provides access and control of SCSI-II devices (NET 100x-S). Connection (28f) is a specialized cable designed for the SCSI interface. The maximum number of SCSI-II devices allowed is seven. This limit is set by the SCSI-II protocols.

Workstation input, output, and disk controller (NET 100x-7) provides, through ribbon cables (28g), control of the different computer drives (NET 100x-DF, NET 100x-HD, and NET 100x-CD). There are additional input and output ports located on the workstation input, output, and disk controller peripheral card for parallel and serial type devices. The standard parallel port is a Centronics 15-pin interface commonly used for printers, plotters, animatics machines, and genigraphic systems (NET 200). Both an RS-232C's (15-pin sub-D) ports and an RS-422's (nine-pin sub-D) ports are available for serial connections to the following types of devices: mouse, digitizer pad, serial printer, image scanner, and terminal-to-terminal connections (NET 100x-P). Additional input and output peripheral cards can be installed as required to increase the number of serial and parallel ports available on a workstation. For example, in the presentation subsystem, the presentation subsystem's controller (PRE 000-A) requires four available serial ports. In an average workstation configuration, only two serial ports would be available. By the addition of another input/output peripheral card, more serial ports are available. Additional ports are required for workstations having multiple printers or other output devices. By adding another input/output peripheral card, the necessary port would be available. Network controller (NET 001) requires two hard drives, two optical drives, and a minimum of two diskette drives. The addition of another disk controller peripheral card would meet the required capacity. Workstation keyboard (NET 100x-K) is attached to workstation (NET 100x) at connection (28h).

Referring again to FIG. 3, all connections to fiber optic concentrator (NET 002A) are via dual strand multi-mode fiber optic cable using ST multi-mode connectors. Because all connections to fiber optic concentrator (NET 002A) are the same, they are shown on FIG. 3, but they are not numbered. Likewise, all other connections between components within the network system are via either serial or parallel interfaces. The standard network topology is dual, ring star. This configuration consists of dual strands of fiber optic cable running from each workstation (NET 100x) to fiber optic concentrator (NET 002A). Standard ring networks rely on cable running from one workstation (NET 100x) to another until the "ring" is completed. In this traditional ring configuration, it is difficult to add or subtract workstations from the ring, especially workstations that are located remotely from network subsystem's central location.

On the other hand, the dual, ring star network configuration utilizes optical concentrator (NET 002A) as a central point which itself forms the "ring." Workstations (NET 100x) can be added and subtracted easily from this network configuration since the cabling connects them directly to fiber optic concentrator (NET 002A). Fiber optic concentrator (NET 002A) is a passive hub type of concentrator such that the concentrator only repeats signals received in the format received. Signal format integrity is important because it is the basis for enabling the different subsystems within system (10) to pass data between one another. The passive hub optical concentrator does not change the original signal in any way. In addition to containing ports for workstations (NET 100x), fiber optic concentrator (NET 002A) also is connected to a bridge (NET 002B), a router (NET 002C), and a brouter (NET 002D). Bridge (NET 002B), router (NET 002C), and brouter (NET 002D) are optical devices that can function independently for connecting remote locations and micronetworks to system (10). An important difference between passive hub fiber optic concentrator (NET 002A) and bridge (NET 002B), router (NET 002C), and brouter (NET 002D) is signal format integrity. While passive hub optical concentrator (NET 002A) does not alter the signal's original format, bridge (NET 002B), router (NET 002C), and brouter (NET 002D) can change the format of the signal, which affects how the signal is processed by other subsystems within system (10).

Bridge (NET 002B) provides connections to remote locations. Bridge (NET 002B) is used to receive and process digital signals by network subsystem (NET 000). Bridge (NET 002B) provides compatibility between system (10) and a nonsystem site by translating signals for the nonsystem site's network protocol to FDDI protocols of system (10).

Router (NET 002C) is used to direct digital signals into network subsystem (NET 000) as instructed by the remote site's network or micronetwork. Without router (NET 002C), a signal would be unconditionally passed to each port on fiber optic concentrator (NET 002A) which forms a traffic jam on network subsystem (NET 000). Router (NET 002C) creates micronetworks by attaching to workstations (NET 100x), instead of having workstations (NET 100x) connected to fiber optic concentrator (NET 002A). Router's (NET 002C) micronetwork then serves as a conduit for the traffic that had been jammed on network subsystem (NET 000). Since the micronetwork attached to router (NET 002C) can only access the main network on request, traffic on the main network system is therefore reduced and better managed.

Brouter (NET 002D) is a combination of abridger and a router. It translates data from a nonsystem network protocol to the FDDI protocols. Additionally, the brouter acts as a concentrator for the nonsystem network and only information designated to system (10) network is transmitted. Thus, the brouter conserves signal bandwidth like a router, but also performs the translation services of abridger. Workstations (NET 100x) also may be connected to bridge (NET 002B) and brouter (NET 002D).

The spectrum of computing environments within system (10) provides a complete range of digital data formats. This allows system (10) to easily meet the needs of multiple computing environments. Each workstation (NET 100x) in network subsystem (NET 000) is cabled with two strands of multi-mode fiber optic cabling and terminated with multi-mode ST connectors. Suitable types of computer workstations (NET 100x) include: a personal computer or PC compatible workstation (NET 100-I) which conforms to industry standard architecture (ISA) and uses a 16-bit data bus; extended industry standard architecture (EISA) workstation (NET 100-E) which uses a 32-bit data bus; Apple Computer Corporation's NuBUS architecture workstation (NET 100-N) in the Apple Macintosh series which uses a 32-bit data bus; UNIX workstation (NET 100-U) architecture which uses either a 32-bit or 64-bit data bus.

Though the components within each workstation type are physically different, they function identically. This commonality is reflected in FIG. 3. Specifically, references to ISA workstation (NET 100-I), EISA workstation (NET 100-E), NuBUS workstation (NET 100-N), and UNIX workstation (NET 100-U) are generically referenced to as NET 100x.

Workstation output devices (NET 200) include any output devices that are attached to network subsystem (NET 000) by a workstation (NET 100x). Workstation output devices (NET 200) may include primers, plotters, facsimile machines, animatics machines, and genigraphic systems. Generally, these devices connect to a workstation via parallel or serial interfaces.

Network subsystem controller (NET 001) is a computer workstation which provides systems administration, security, allowed access, configuration protocol, and transmission subsystem access (in digital form). Network subsystem controller (NET 001) serves as the overall management of network subsystem (NET 000) which includes adding and removing workstations (NET 100x); output device routing (designated network printer as well as special output device addressing); systems diagnosing; adding, maintaining, and deleting users and their passwords; and establishing levels of access and systems control. Network subsystem controller (NET 001) requires EISA bus with a minimum of 32 MB of RAM, two 1.2 gigabyte hard drives, two optical drives, one SVGA video controller with 4 MB of Video RAM (VRAM), one VGA controller with 512 KB of VRAM, a mouse or digitizer support, 3.5" and 5.25" floppy drives, one 17" SVGA 0.28 pitch monitor, one 14" 0.39 pitch monitor, SCSI controller and drives (as necessary), audio and video enabling equipment (such as a video tape recorder/player or camera and microphone), and a 80486 DX-33 processor or greater. This workstation also requires the installation of the appropriate FDDI network card.

Various systems' controllers (SYS 000-A) allow personal computer-based control of each subsystem. Subsystem controllers include: presentation subsystem controller (PRE 000-A); production subsystem controller (PRO 000-A); satellite subsystem controller (SAT 000-A); transmission subsystem controller (TRX 000-A); private exchange subsystem switch controller (PBX 001-A/B); private exchange subsystem controller (PBX 002-A); and private exchange subsystem controller (PBX 003-A).

Optical multiplexer/demultiplexer (TRX 007) is connected to FDDI network subsystem controller (NET 001) and separates and assembles four fibers from transmission subsystem (TRX 000) at OC-1 or DS-3 levels to two fibers each with send and receive capabilities as required by the FDDI protocol. Optical multiplexer/demultiplexer (TRX 007) converts from FDDI to DS-3/OC-1 and vice versa and functions as a communications channel allowing network subsystem (NET 000) to pass data at the DS-3/OC-1 level.

PRIVATE EXCHANGE SUBSYSTEM

Figure 4:
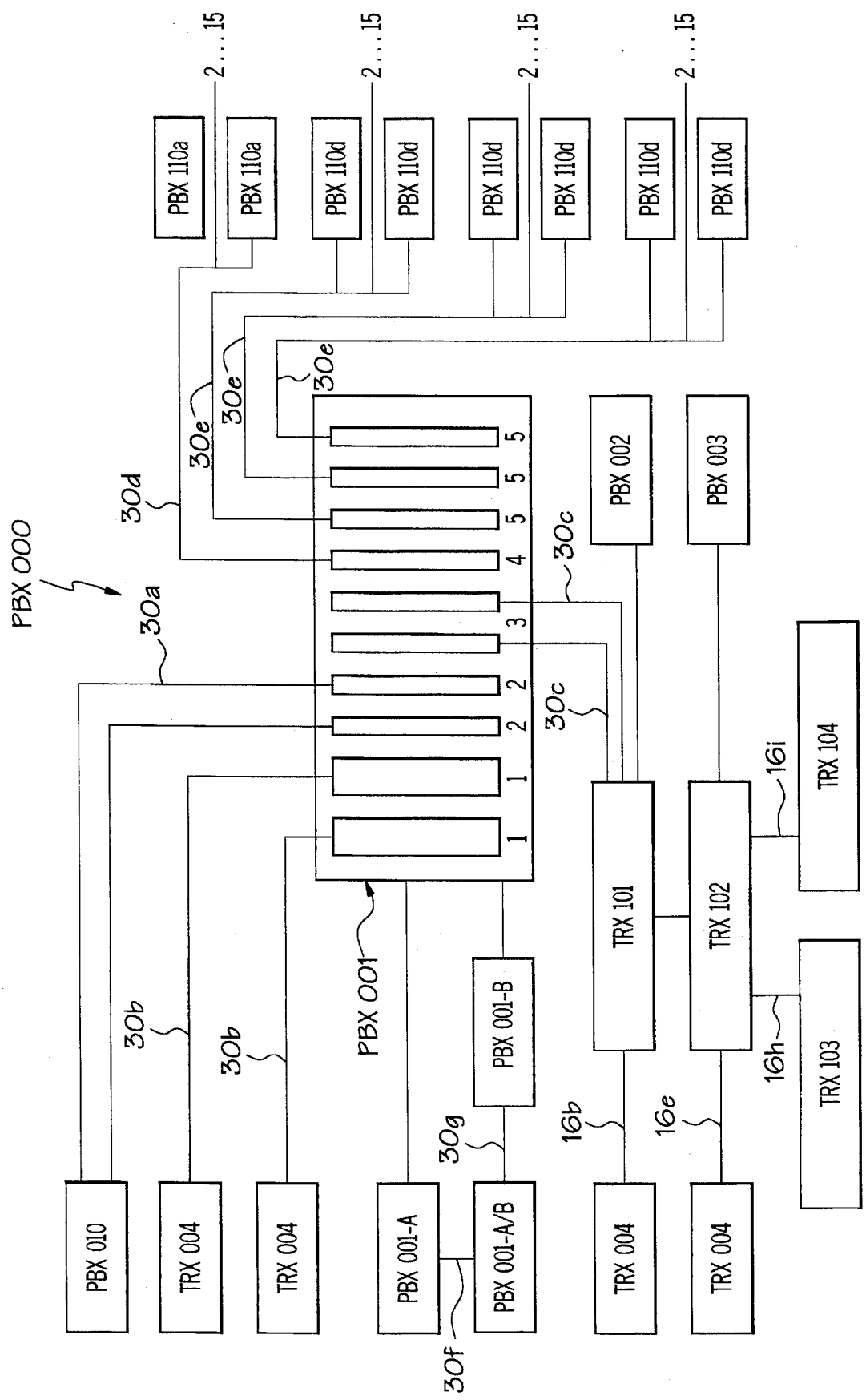
FIG. 4 is a schematic diagram of the private branch exchange subsystem of the present invention.

Referring to FIG. 4, private exchange subsystem (PBX 000) functions as a stand-alone digital telephone system within system (10). A stand-alone digital telephone service allows system (10) users to have instant voice access to other locations within system (10) site. External telephone access to remote system (10) sites as well as non-system sites is accomplished by private exchange subsystem's (PBX 000) connections to the regional Bell operating company (RBOC) interexchange carriers (for example, AT&T, MCI, Sprint, etc.), and the internal connection to the transmission subsystem's channel bank (TRX 101). This access is almost the same as using a regular telephone. The difference is that the private subsystem internally operates in the digital realm whereas standard telephony is generally an analog-based form of telephony.

Internally, the components within the private exchange subsystem create an alternate pathway for data information at the DS-0 level. This means that if the network subsystem should fail, alternative access would be provided by the private exchange subsystem. While the public exchange system could not support the full network capability, it would support marginal command and control operations of system (10). Whereas the network queues user access to a component of system (10), the private exchange subsystem would access other computer workstations and system controllers on a first-come-first-serve basis. An analogy for this difference would be the distinction between a standard telephone and a commercial telephone with extensions. The commercial telephone with extensions is similar to the network subsystem; that is, calls can be routed from the different extensions. If one extension is busy, another extension can automatically be activated to accept an incoming call. A standard telephone is more similar to the private exchange subsystem's capacity as a supplement to the network system. On a standard telephone that accepts only one call at a time, all other incoming calls receive a busy signal until the telephone is no longer connected to the first incoming call it received. The private exchange subsystem, like a standard telephone, only can route a component's access to one user at a time. If more than one user needs to access a particular component, they must wait to access the component until the first user to request access is finished using the component. Thus, while the private exchange subsystem can take the place of the primary network subsystem (NET 000), it cannot perform network or resource management activities beyond the scope required to define its own extensions.

Externally, the components within the private exchange subsystem create global telephony access via the local exchange carrier (RBOC) and the interexchange carriers. This access can be either digital or analog, and is supported by the configuration of the private exchange subsystem's switch or base unit (PBX 001) and its associated peripheral modules.

Private exchange subsystem (PBX 000) comprises a base unit (PBX 001) which houses ISDN modules (PBX 001-1), analog line modules (PBX 001-2), digital line modules (PBX 001-3), analog port modules (PBX 001-4), and digital port modules (PBX 001-5). Base unit (PBX 001) is a modular design allowing easy expansion and upgrading through the replacement of peripheral modules and the addition of base unit modules. FIG. 4 illustrates a single base unit; however, a system (10) site can configure private exchange subsystem (PBX 000) according to the requirements of a particular system (10) site such as the number of users. For example, a large facility could require five base units with 20 analog line modules, four digital line modules, four ISDN modules, and the balance of available module ports filled with analog and digital port modules.

RBOC system (PBX 010) provides analog telephone service which enables users at a system (10) site to communicate with the local exchange carrier. Connection (30*a*) to base unit (PBX 001) is by a 25-pair cable conforming to AT&T specification for A25 Comcode 1009XXXXX standard for class 4 shielded cabling. This standard includes the specification for connectors. One analog line card is required for every group of eight analog lines. This standard governs the number of analog line modules (PBX 001-2) which must be installed in base unit(s) (PBX 001). For example, for a system (10) site served by 35 analog phone lines, five analog line modules must be installed, which would leave the private exchange subsystem with the capacity to add five more analog lines from the local exchange carrier.

The optical to electrical DS-1 interface (TRX 004) enables a signal coming into the transmission subsystem from either PSDN (TRX 001) or ISDN (TRX 002) to be converted from an optical signal to a copper-based signal in order to be processed under recognized telephony standards (FIG. 2*a*). The optical to electrical DS-1 interface (TRX 004) is connected (30*b*) to ISDN modules (PBX 001-1) via 25-pair cable conforming to AT&T specification for A25 Comcode 1009XXXXX standard for class 4 shielded cabling. A minimum of two separate connections (30*b*, 30*b*) are required to support multi-site access at DS-1 levels. Multiple connections (30*b*) from optical to electrical DS-1 interface (TRX 004) to ISDN modules (PBX 001-1) can be created based on system (10) site's user requirements.

DS-1 to DS-0 copper-based channel bank (TRX 101) supports two DS-1 line to 48 DS-0 line conversions. One DS-1 is connected from optical to electrical DS-1 interface (TRX 004) while a second DS-1 is connected from the DS-1 Switcher/Router (TRX 102). DS-1 to DS-0 copper-based channel bank (TRX 101) is connected (30*c*) to digital line modules (PBX 001-3) via 25-pair cable conforming to AT&T specification for A25 Comcode 1009XXXXX standard for class 4 shielded cabling. FIG. 4 illustrates the use of two digital lines modules (PBX 001-3); however, each digital line module can support a maximum of 16 digital lines from DS-1 to DS-0 copper-based channel bank (TRX 101). Therefore, the two digital line modules can provide up to 32 digital (DS-0) telephone lines available for private exchange subsystem (PBX 000).

As an example of this functionality, a single DS-1 line connection provides a direct link of 24 DS-0 telephone lines between two locations. The traditional means of connecting two locations in this manner is via dedicated lines. The private exchange subsystem of system (10) treats the DS-0 lines within the DS-1 as virtual extensions, indicating that these extensions can be changed much more easily than dedicated lines. In system (10), a telephone with the extension 7800 located in a New York office can be moved to Chicago seamlessly. That is, extension 7800 will continue to connect to the correct phone regardless of the location of the phone, whereas a dedicated line would require the installation of a new dedicated DS-1 connection. This virtual extension would only exist as long as there as a DS-1 line connecting system (10) to the remote site. Addressing for the extension is programmed through the software within private exchange subsystem's switch (PBX 001).

Also, this virtual extension could be utilized for high-level video conferencing at the DS-3 level. The DS-3 signal has two DS-1 channels embedded within its structure which are designated for voice and data transmissions by the respective codec (TRX 103, TRX 104). One DS-1 routed through the DS-1 Switcher/Router (TRX 102) would be demultiplexed at the DS-1 to DS-0 copper-based channel bank (TRX 101) and provide 24 voice channels (DS-0 lines) through the private exchange subsystem. These 24 voice channels would become virtual extensions to the originating site of the video conference. Thus, a video conference that is initiated from Chicago to Washington and New York, the signal could be routed to New York without having a direct DS-1 connection between Chicago and New York. Instead of using a dedicated line, the signal would pass on the DS-1 line between Chicago and Washington and automatically would be routed over the DS-1 connecting Washington to New York by switching matrix (TRX 003) located at system (10) in Washington.

Analog ports (PBX 110*a*) for the analog lines routed through analog port module(s) (PBX 001-4) are the direct connections to the analog telephones within a system (10) site. Connection (30*d*) between analog ports (PBX 110*a*) and the analog port module(s) is four-pair, plenum-rated, class 4 shielded twisted pair cabling with wall-mounted RJ-45 terminators. Each analog port module (PBX 001-4) has the capability to support 16 analog ports (PBX 110*a*). Two ports (PBX 110*a*) are illustrated in this figure with a connecting line of "2 . . . 15" representing the balance of the analog port module's 16 total analog ports.

Digital ports (PBX 110*d*) for the digital lines routed through digital port module(s) (PBX 001-5) are direct connections to the digital telephones within a system (10) site. Connection (30*e*) between digital ports (PBX 110*d*) and digital port module(s) (PBX 001-5) is four-pair, plenum-rated, class 4 shielded twisted pair cabling with wall-mounted RJ-45 terminators. Each digital port module (PBX 001-5) is illustrated with a connecting line of "2 . . . 15" representing the balance of the digital port module's 16 total digital ports. Three digital ports (PBX 110*d*) are illustrated in FIG. 4 which represent 48 digital phone ports at system (10).

Private exchange subsystem's switch (PBX 001) makes analog and digital voice channels virtually indistinguishable. This standard does not apply for other analog and digital traffic. Specifically, devices such as modems and facsimile machines require the use of analog ports, whereas digital signaling devices require digital ports. For example, these digital signaling devices include individual workstation codecs, digital-to-digital data transfers, and command and control functions as directed by system controllers.

Private exchange subsystem controller (PBX 001-A/B) is a workstation which uses an ISA bus with a minimum of 2 MB of RAM, a 40 MB hard drive, one floppy drive, and an 80286 processor or greater. The preferred workstation configuration for private exchange subsystem controller (PBX 001-A/B) is an ISA bus with 4 MB of RAM, an 80 MB hard drive, one floppy drive, a VGA display monitor, 512 KB of VRAM, and an 80386 DX-33 processor or greater. This workstation additionally requires that an FDDI network card is installed. Private exchange subsystem controller (PBX 001-A/B) is serially connected (30*f*) to a second workstation which is a call-accounting processor for the private exchange subsystem (PBX 001-A). Call-accounting processor for private exchange (PBX 001-A) subsystem is a dedicated computer workstation and transfers information to the network subsystem via its serial connection (30*f*) with private exchange subsystem controller (PBX 001-A/B). Call-accounting processor' workstation (PBX 001-A) operates call-accounting software and uses an ISA bus with a minimum of 2 MB of RAM, a 40 MB hard drive, one floppy drive, a VGA display monitor, and an 80286 processor or greater. A second serial connection (30*g*) runs from private exchange subsystem controller (PBX 001-A/B) to a serial terminal (PBX 001-B) connected directly to the central processing unit of private branch subsystem's switch (PBX 001). Serial terminal (PBX 001-B) provides access for programming and modification to the operation of private exchange subsystem's switch (PBX 001). Connection (30g) between serial terminal (PBX 001-B) and private exchange subsystem controller (PBX 001-A/B) allows network access to the terminal functions provided by serial terminal (PBX 001-B) to private exchange subsystem's switch (PBX 001).

Figure 4A:
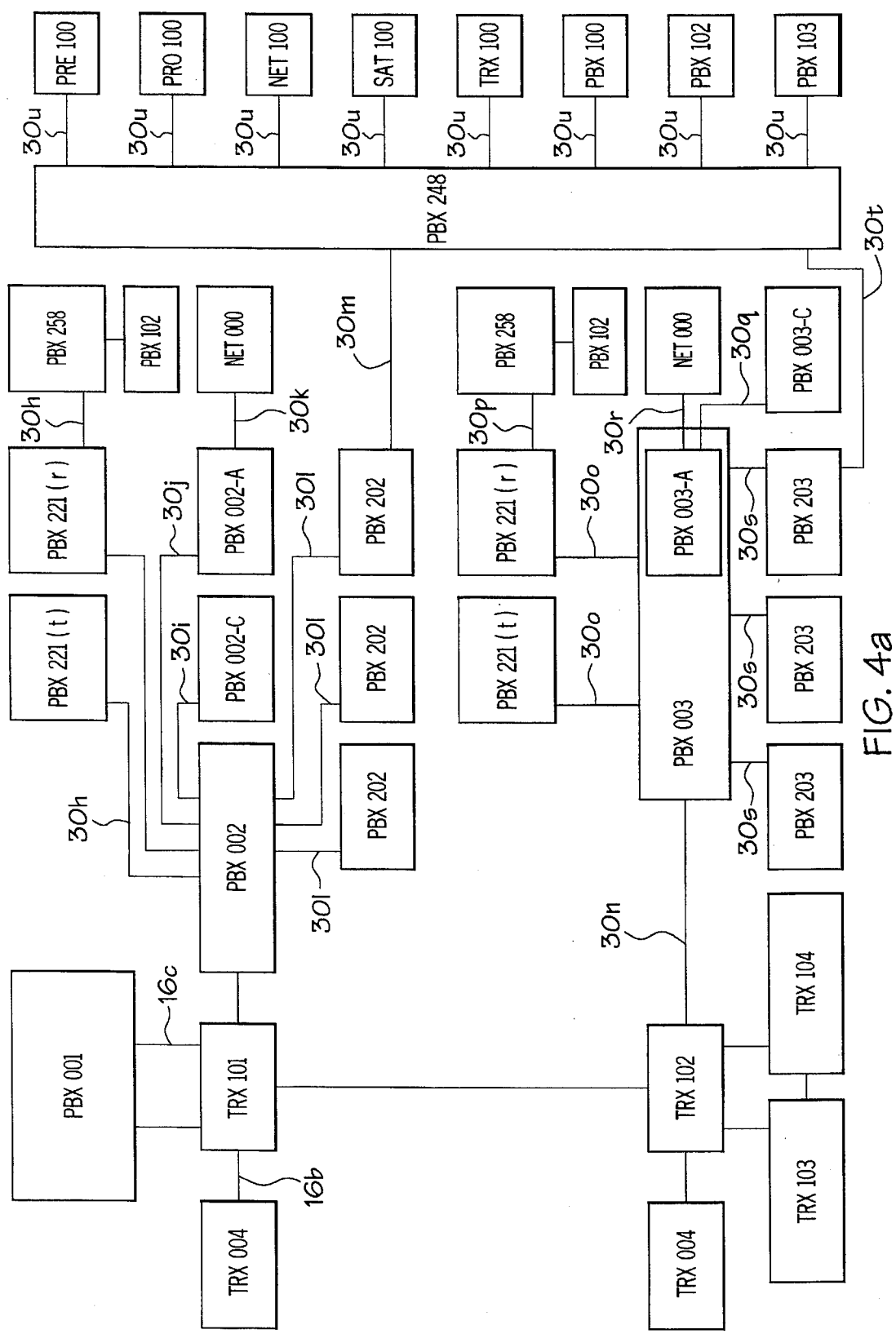
FIG. 4a is a schematic diagram of the fractional DS-1 and DS-1 video teleconferencing components of the private exchange subsystem of the present invention.

FIG. 4a details connections and components for fractional DS-1 and DS-1 video teleconferencing and these components' connections to the other subsystems within system 10. Fractional DS-1 is defined as either two, six, or 12 DS-0 lines multiplexed to form a signal with the bandwidth of 128 KB per second, 384 KB per second, or 768 KB per second respectively. In contrast, DS-1 is defined as signal bandwidth supporting 768 KB per second (12 DS-0 lines), but preferably operates at 1.5 MB per second (24 DS-0 lines).

This portion of private exchange subsystem (PBX 000) provides DS-1 slow-scan video teleconferencing. Slow-scan video teleconferencing is between 15–30 frames per second for video data. In slow-scanning, frames are automatically removed and the number or colors used is reduced to between 256 and approximately 32,000. By comparison, high-level video teleconferencing at the DS-3 level is 50–60 frames per second with 16.7 million colors. This reduction in colors and frame rate reduces the required bandwidth to transfer audio and video data. Thus, fractional DS-1 and DS-1 video teleconferencing are economic alternatives to higher-level video teleconferencing (DS-3).

Signals at the DS-1 level and below are routed to the private exchange subsystem and must be processed by components that directly affect a DS-1 line's usage within system (10) site. This is the distinction between transmission subsystem (TRX 000) and private exchange subsystem (PBX 000).

Two key components that provide slow-scan video teleconferencing are fractional DS-1 codec (PBX 002) and DS-1 codec (PBX 003). Fractional DS-1 codec can utilize two, six, or 12 (maximum) DS-0 lines for transmitting the slow-scan video teleconferencing signals. DS-1 codec can utilize 12 or 24 (recommended) DS-0 lines for transmitting slow-scan video teleconferencing signals.

Fractional DS-1 codec (PBX 002) is connected (16c in FIG. 2a) to transmission subsystem (TRX 000) via a DS-1 interface (25-pair cable conforming to AT&T specification for A25 Comcode 1009XXXXX standard for class 4 shielded cabling) at channel bank (TRX 101). Connection (16c) provides access to the appropriate number of DS-0 lines (two, six, or 12).

Two display monitors (PBX 221) are connected to fractional DS-1 codec (PBX 002). Monitor (PBX 221[t]) displays the video signal being transmitted to the remote location. Second monitor (PBX 221[r]) displays the video signal being received from the remote location. Connected to this receiving monitor is a one-to-eight audio and video distribution amplifier (PBX 258). Distribution amplifier (PBX 258) acts as a repeater to other systems (10); that is, an incoming signal can be split into eight separate outputs each equivalent to the original signal. Connections (30h) from fractional DS-1 codec (PBX 002) to transmitting monitor (PBX 221[t]) and from receiving monitor (PBX 221[r]) to audio and video distribution amplifier (PBX 258) are one 75 ohm BNC connectors running on class 4 shielded coaxial cable at 22-gauge for composite video and two RCA-to-RCA connectors for stereo audio.

A control module (PBX 002-C) is connected to fractional DS-1 codec (PBX 002) for providing operational management of the fractional DS-1 codec. Control module (PBX 002-C) can request services from the transmission subsystem and control on-site and remote audio and video equipment. The control module's connection (30i) to fractional DS-1 codec is per manufacturer specifications which for system (10) is an RJ-45 connector.

Private exchange subsystem's fractional DS-1 codec system controller (PBX 002-A) is connected (30j) to fractional DS-1 codec (PBX 002) and is responsible for providing computing support necessary for video conferencing at the fractional DS-1 level and as an alternative means of operational management. Connection (30j) from fractional DS-1 system controller (PBX 002-A) to fractional DS-1 codec (PBX 002) is a 15-pin serial connection. Fractional DS-1 codec system controller (PBX 002-A) requires either an ISA or EISA bus with a minimum of 4 MB of RAM, an 80 MB hard drive, and an 80386 SX-33 processor or greater. The recommended system controller configuration is a VESA local video bus with 8 MB of RAM, a 120 MB hard drive, an SVGA 0.28 pitch monitor, 2 MB of video RAM, an 80486 DX-33 processor or greater, a mouse or digitizer support, and audio and video enabling equipment (such as a video tape recorder/player or camera and microphone). Regardless of the controller's configuration, this workstation requires the installation of the appropriate FDDI network card. Fractional DS-1 codec system controller (PBX 001-A) is connected (30k) to network subsystem (NET 000) via dual strand multi-mode fiber optic cable using ST multi-mode connectors. The connection between the fractional DS-1 codec system controller and the network system gives this workstation full network support.

Three audio and video input devices (PBX 202) are connected (30l) to fractional DS-1 codec (PBX 002). For a video teleconference, input devices (PBX 202) include cameras, microphones, video tape players/recorders, and other similar equipment. Input devices (PBX 202) are connected (30l) to fractional DS-1 codec (PBX 002) via one 75 ohm BNC connector running on class 4 shielded coaxial cable at 22-gauge for composite video and two RCA-to-RCA connectors for stereo audio. One input device (PBX 002) is connected (30m) to presentation switcher (PBX 248). Connection (30m) provides selection of audio and video feeds from the other subsystems within system (10). Thus, the capabilities of the other subsystems can be used for a video teleconference. For example, a computer animation developed in production subsystem (PRO 000) could be routed to presentation switcher (PBX 248) and input device (PBX 202). Then, the animation signal could be sent to the fractional DS-1 codec (PBX 002) where it could then be transmitted to the complementary remote site for the video teleconference.

DS-1 codec (PBX 003) is connected (30n) to transmission subsystem (TRX 000) by a DS-1 interface such as a 25-pair cable conforming to AT&T specification for A25 Comcode 1009XXXXX standard for class 4 shielded cabling at DS-1 switcher/router (TRX 102). Connection (30n) provides access to 24 DS-0 lines.

Display monitors (PBX 221[t], PBX 221[r]) are connected (30o) to DS-1 codec (PBX 003). Monitor (PBX 221[t]) displays the video signal being transmitted to the remote location. Monitor (PBX 221[r]) displays the video signal being received from the remote location. Connected (30p) to this receiving monitor is a one-to-eight audio and video distribution amplifier (PBX 258). Distribution amplifier (30p) acts as a repeater to other systems (10). Distribution amplifier (PBX 258) can split an incoming signal into eight separate outputs, each equivalent to the original signal. Connections (30o, 30p) from DS-1 codec (PBX 003) to the transmitting monitor and from the receiving monitor to the audio and video distribution amplifier are one 75 ohm BNC connectors running on class 4 shielded coaxial cable at 22-gauge for composite video and two RCA-to-RCA connectors for stereo audio.

A control module (PBX 003-C) is connected (30q) to DS-1 codec (PBX 003) and provides operational management of DS-1 codec (PBX 003). Control module (PBX 003-C) can request services from the transmission subsystem and control local and remote audio and video equipment. The control module's connection (30q) to the DS-1 codec is per manufacturer specifications which for this embodiment uses a 15-pin serial connector. Control module (PBX 003-C) is a digitizer pad connected to system controller (PBX 003-A) located within the DS-1 codec (PBX 003).

Private exchange subsystem's DS-1 codec system controller (PBX 003-A) is physically contained within DS-1 codec (PBX 003). DS-1 codec system controller (PBX 003-A) a computer workstation, is responsible for providing computing support necessary for video conferencing at the DS-1 level and as an alternative means of operational management. DS-1 codec system controller (PBX 003-A) requires either an ISA or EISA bus with a minimum of 4 MB of RAM, an 80 MB hard drive, and an 80386 SX-33 processor or greater. The recommended system controller configuration is a VESA local video bus with 8 MB of RAM, a 120 MB hard drive, an SVGA 0.28 pitch monitor, 2 MB of video RAM, an 80486 DX-33 processor or greater, a mouse or digitizer support, and audio and video enabling equipment (such as a video tape recorder/player or camera and microphone). Regardless of the controller's configuration, this workstation requires the installation of the appropriate FDDI network card. This DS-1 codec system controller (PBX 003-A) is connected (30r) to network subsystem (NET 000) via dual strand multi-mode fiber optic cable using ST multi-mode connectors. Connection (30r) gives this workstation full network support.

Three audio and video input devices (PBX 203) are connected (30s) to DS-1 codec (PBX 003). For a video teleconference, input devices (PBX 203) could include cameras, microphones, video tape players/recorders, and other similar equipment. Audio and video input devices (PBX 203) are connected (30s) to fractional DS-1 codec (PBX 003) via one 75 ohm BNC connector running on class 4 shielded coaxial cable at 22-gauge for composite video and two RCA to RCA connectors for stereo audio. One input device (PBX 203) is connected (30t) to presentation switcher (PBX 248). Connection (30t) provides selection of audio and video feeds from the other subsystems within system (10). This indicates that the capabilities of the other subsystems within system (10) can be used for a video teleconference. For example, a live feed from presentation subsystem (PRE 000) could be routed to presentation switcher (PBX 248) and input device (PBX 203). Then, the presentation feed could be sent to DS-1 codec (PBX 003) where it could then be transmitted to the complementary remote site for the video teleconference.

Private exchange subsystem's presentation switcher (PBX 248) routes feeds from presentation subsystem (PRE 100), production subsystem (PRO 100), network subsystem (NET 100), satellite subsystem (SAT 100), transmission subsystem (TRX 100), a desktop video conferencing unit (PBX 101), a fractional DS-1 video conferencing unit (PBX 002), and a DS-1 video conferencing unit (PBX 003). Whatever feed is selected for input through presentation switcher (PBX 248) is automatically routed simultaneously to both fractional DS-1 codec (PBX 002) and DS-1 codec (PBX 003). All the input and output feeds to private exchange subsystem's presentation switcher (PBX 248) are connected (30u) via one 75 ohm BNC connector running on class 4 shielded coaxial cable at 22-gauge for composite video and two RCA-to-RCA connectors for stereo audio. This includes connections between the private branch exchange system's presentation switcher and feeds from the presentation system (PRE 100), production system (PRO 100), network system (NET 100), satellite system (SAT 100), transmission system (TRX 100), a desktop video conferencing unit (PBX 101), the fractional DS-1 codec's audio video devices (PBX 202), and the DS-1 codec's audio and video devices (PBX 203).

Figure 4B:
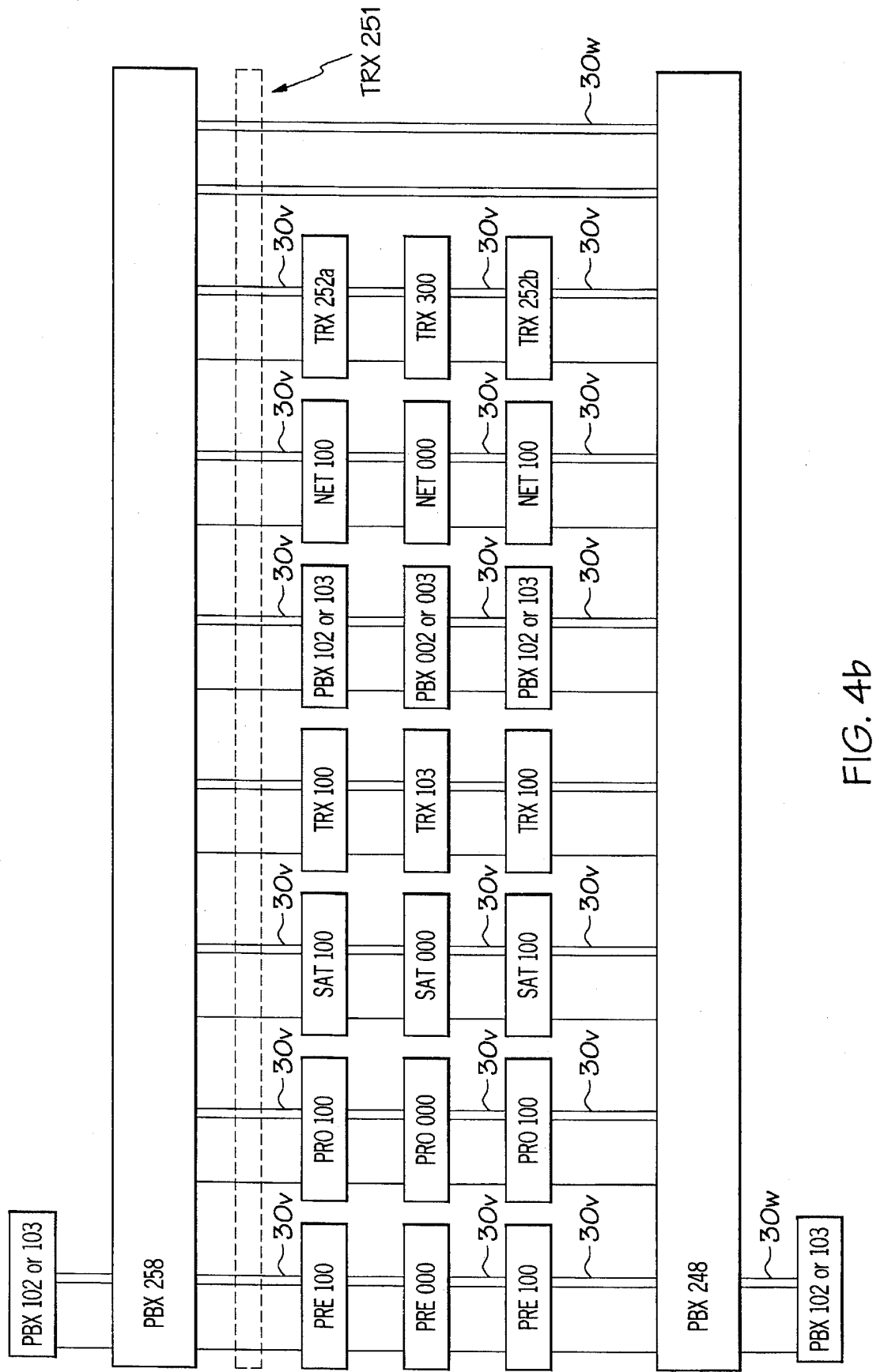
FIG. 4b is a schematic diagram which illustrates the interconnections of the video components of the private exchange subsystem of the present invention.
Figure 5:
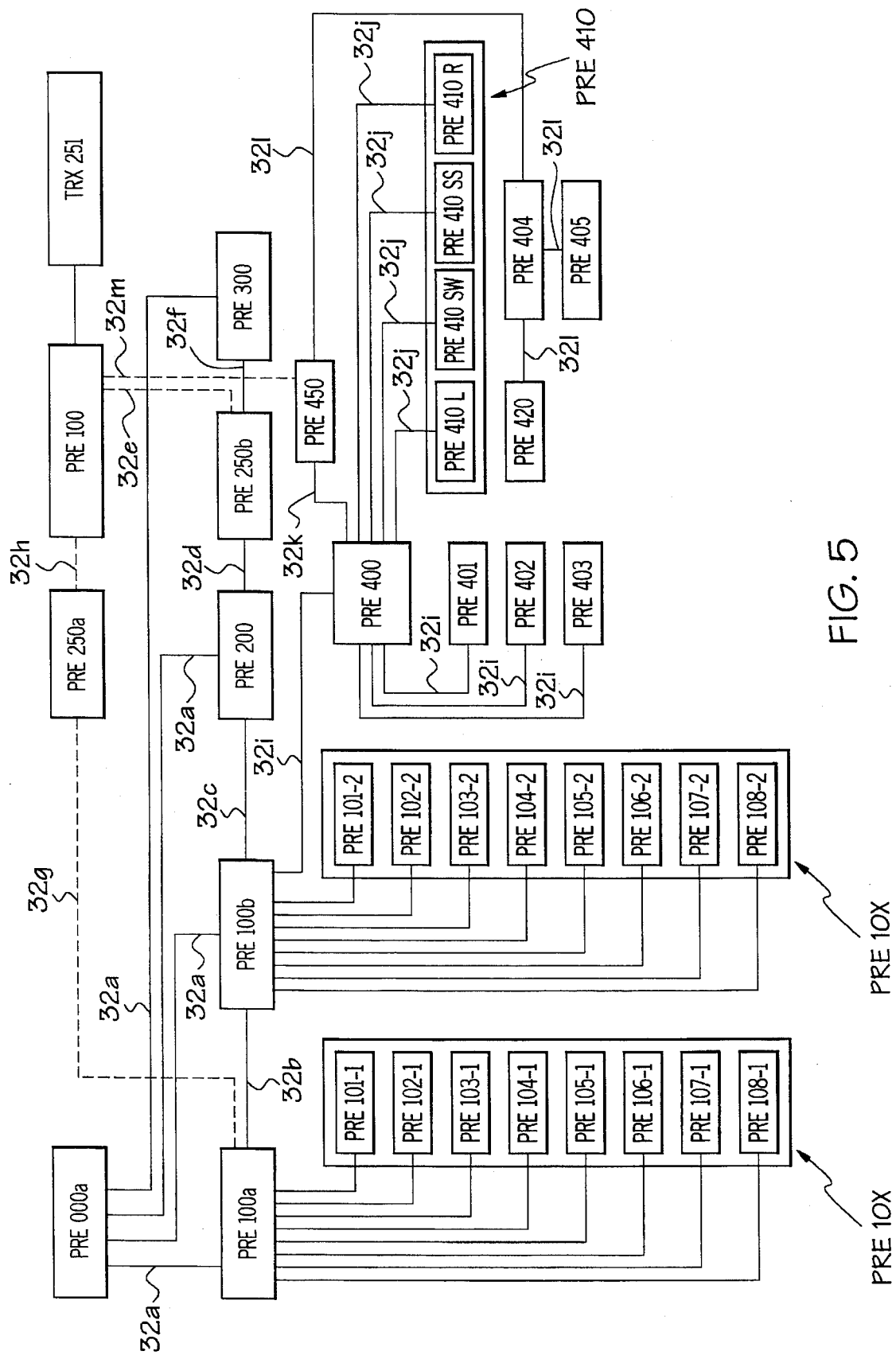
FIG. 5 is a schematic diagram of the presentation subsystem of the present invention.

Referring to FIG. 4b, an NTSC-based video signal may be sent for processing under any of the subsystems or routed for retransmission via DS-3 codec for NTSC (TRX 103), DS-3 codec for high definition receive component (TRX 104b), fractional DS-1 codec (PBX 002), DS-1 codec (PBX 003), network subsystem (NET 000), or satellite subsystem (SAT 000). An audio and distribution amplifier (PBX 248) for NTSC signals is connected to codecs (PBX 102, PBX 103). Audio and video presentation switcher (PBX 248) selects the return signal for use by fractional DS-1 codec (PBX 002) or DS-1 codec (PBX 003). Effectively, these connections provide interoperability between multiple environments.

For example, a video teleconferencing signal enters fractional DS-1 codec (PBX 002), but another site needs it in a standard NTSC format. Once fractional DS-1 codec (PBX 002) receives the signal, the fractional DS-1 video signal may be sent to either the presentation or production subsystem in standard NTSC video format. The signal is then sent to a DS-3 codec for NTSC (TRX 103) and reformatted to DS-3 for transmission to the remote site. This would equally apply to a site only reachable by satellite connection. In this case, fractional DS-1 (PBX 002) or DS-1 Codecs (PBX 003) would receive the signal and transfer it in decompressed format to the satellite subsystem. At this point, the remote site could tune in to the appropriate satellite and receive the transmission.

There are multiple other similar applications such as off-line recording for later transmission, live multi-site teleconferences, on-line editing applications, etc. Off-line recording constitutes an example that does not use the signal for retransmission. Four sites could be linked together for live multi-site teleconferencing (with one system (10) site's feed, high definition video, NTSC video, and off-line materials) using NTSC as the lowest common denominator for transmission purposes to the different sites. The presentation subsystem could simultaneously display the different feeds in four windows on the screen. This would be managed by the production subsystem in coordination with both the presentation and transmission subsystems.

Wiring bus (TRX 251) consists of all connections running from audio and distribution amplifier for NTSC signals (PBX 258) to the different subsystems' feed including presentation subsystem (PRE 000), production subsystem (PRO 000), satellite subsystem (SAT 000), fractional DS-1 codec (PBX 002) or DS-1 codec (PBX 003), network subsystem (NET 000), remote video and audio transmission equipment (TRX 300), and return wiring feeds.

Connections (30v) from audio and distribution amplifier for NTSC signals (PBX 258) to network subsystem feed (NET 100), to fractional DS-1 codec's feed (PBX 102) or to DS-1 codec's feeds (PBX 103), presentation subsystem feed (PRE 100), production subsystem feed (PRO 100), video and audio distribution router for remote locations (TRX 252a), and satellite subsystem feed (SAT 100) consist of the same cabling configuration. This cabling configuration consists of one 75 ohm BNC connector running on class 4 shielded coaxial cable at 22-gauge for video (RS170A), and two dual strand audio cables using screw and pin connectors.

Connections (30w) from audio and distribution amplifier for NTSC signals (PBX 258) to the wiring's return feed at audio and video switcher (PBX 248) refers to the cross-over connections to fractional DS-1 codec's feed (PBX 102) or to DS-1 codec's feed (PBX 103). This cabling configuration consists of one 75 ohm BNC connector running on class 4 shielded coaxial cable at 22-gauge for video (RS170A) and two dual strand audio cables using screw and pin connectors.

Connections from presentation subsystem feed (PRE 100) to presentation subsystem (PRE 000), production subsystem feed (PRO 100) to production subsystem (PRO 000), satellite subsystem feed (SAT 100) to satellite subsystem (SAT 000), fractional DS-1 codec feed (PBX 102) to fractional DS-1 codec (PBX 002), DS-1 codec feed (PBX 103) to DS-1 codec (003), network subsystem feed (NET 100) to network subsystem (NET 000), and video and audio distribution router for remote locations (TRX 252a) to remote video and audio transmission equipment (TRX 300) are respectively identical in composition to the connections specified from the audio and distribution amplifier for NTSC signals (TRX 201) to presentation subsystem feed (PRE 100), production subsystem feed (PRO 100), satellite subsystem feed (SAT 100), fractional DS-1 codec feed (PBX 102), DS-1 codec feed (PBX 103), network subsystem feed (NET 100), and video and audio distribution router for remote locations (TRX 252a).

Likewise, connections from presentation subsystem (PRE 000) to presentation subsystem feed (PRE 100), production subsystem (PRO 000) to production subsystem feed (PRO 100), satellite subsystem (SAT 000) to satellite subsystem feed (SAT 100), fractional DS-1 (PBX 002) or DS-1 codec (PBX 003) to fractional DS-1 (PBX 102) or DS-1 codec feed (PBX 103), network subsystem (NET 000) to network subsystem feed (NET 100) and remote video, audio and data transmission equipment (TRX 300) to video and audio distribution router for signals returning from remote locations (TRX 252b) are respectively identical in composition as the connections specified from the audio and distribution amplifier for NTSC signals (PBX 258) to presentation subsystem feed (PRE 100), production subsystem feed (PRO 100), satellite subsystem feed (SAT 100), fractional DS-1 codec feed (PBX 102), DS-1 codec feed (PBX 103), network subsystem feed (NET 100), and video and audio distribution router for remote locations (TRX 252a).

Connections from presentation subsystem feed (PRE 100), production subsystem feed (PRO 100), satellite subsystem feed (SAT 100), fractional DS-1 codec feed (PBX 102) or DS-1 codec feed (PBX 103), network subsystem feed (NET 100), and video and audio router for signals returning from remote locations (252b) to audio and video presentation switcher (PBX 248) are respectively identical in composition to the connections specified from audio and distribution amplifier for NTSC signals (PBX 258) to presentation subsystem feed (PRE 100), production subsystem feed (PRO 100), satellite subsystem feed (SAT 100), fractional DS-1 codec feed (PBX 102) or the DS-1 codec feed (PBX 103), network subsystem feed (NET 100), and video and audio distribution router for remote locations (TRX 252a). The returning signals are routed back through audio and video presentation switcher (PBX 248). The connections from the audio and video presentation switcher are detailed in FIG. 4a.

PRESENTATION SUBSYSTEM

Presentation subsystem (PRE 000) provides a complete multimedia environment for system (10) including a wide range of audio and video devices for computer and video projection, 35 MM slide projection, video laser disc playback, video recording (in NTSC, serial/digital, and high definition), live camera operations (for the presentation center and remote sites), and a THX (ILM registered trademark) surround-sound stereo system with compact disc, cassette tape, reel-to-reel tape, computerized sound (MIDI devices), and microphones for the public address system. These components form a multimedia environment in which audio and video data is combined in computer-controlled productions involving voice, sound, video, and computer imagery. Effectively, the presentation subsystem represents the product created by the convergence of the other subsystems comprising the broadcast and presentation system.

Operating software presentation subsystem (PRE 000) provides control of the subsystem's two presentation switchers (PRE 100a and PRE 100b), an up/down scan converter (PRE 200), and a high-definition data projector (PRE 300). The software is a user-friendly, menu-driven Windows interface.

The software allows users to select which switcher (PRE 100a, PRE 100b) to be utilized by presentation subsystem (PRE 000) and to designate device (PRE 10X) attached to presentation switchers (PRE 100a or PRE 100b) for use. Thus, the user can select the video device to be used in a multimedia presentation. The audio device is designated automatically by the selected video device.

A user may designate-operating parameters for scan converter (PRE 200). For those items pre-designated on switchers (PRE 100a, PRE 100b), scan converter (PRE 200) will be automatically optimized by parameters stored in presentation system controller (PRE 000-A). In the case of devices (PRE 10X) attached to presentation switchers (PRE 100a, PRE 100b), but not pre-designated in system controller (PRE 000-A), the system controller will provide, through its own interface software, a menu-driven selection process based on device type and a given device's operating parameters. Information gained from this menu-driven option will be used to optimize up/down scan converter (PRE 200) accordingly.

Software in presentation system controller (PRE 000-A) automatically selects optimal projector settings for high-definition data projector (PRE 300) based on which device (PRE 10X) is selected and the configuration of scan converter (PRE 200). The user also may adjust the projector settings to meet his individual needs through the control system software. Thus, software control of the switchers, up/down scan converter, and high-definition data projector empowers users to develop and utilize the level of sophistication required for a given multi-media application.

Presentation subsystem controller (PRE 000-A) is connected (32a) to NTSC presentation switcher (PRE 100a), component video presentation switcher (PRE 100b), up/down scan converter (PRE 200), and high-definition data projector (PRE 300) via an RS-232 serial connection. Connection (32a) provides the control functions described above. The presentation subsystem controller requires either an ISA or EISA bus with a minimum of 4 MB of RAM, an 80 MB hard drive, and an 80386 SX-33 processor or greater. The recommended system controller configuration is a VESA local video bus with 8 MB of RAM, a 120 MB hard drive, an SVGA 0.28 pitch monitor, 2 MB of video RAM, an 80486 DX-33 processor or greater, a mouse or digitizer support, and audio and video enabling equipment (such as a video tape recorder/player or camera and microphone). Regardless of the controller's configuration, this workstation requires the installation of the appropriate FDDI network card.

NTSC presentation switcher (PRE 100a) is connected (32b) to component video presentation switcher (PRE 100b) via a CCQ (camera control) cable. Connection (32b) provides transfer of video signals between the switchers.

Component video presentation switcher (PRE 100b) is connected (32c) to scan converter (PRE 200) via a CCQ cable. Connection (32c) provides transfer of video signals (both NTSC and component) from presentation switchers (PRE 100a, PRE 100b) to scan converter (PRE 200).

Scan converter (PRE 200) samples an incoming video signal and processes that video signal in accordance with the parameters proscribed by presentation subsystem controller (PRE 000-A). Again, in the absence of parameters provided by the system controller, the up/down scan converter will automatically interpret and reformat a video signal based on the last output format designated on the up/down scan converter.

Scan converter (PRE 200) also is connected (32d) to component video distribution amplifier (PRE 250b) via five 75 ohm BNC connectors running on class 4 shielded coaxial cable at 22-gauge. Connection (32d) provides component video for distribution to high-definition data projector (PRE 300). This connection also provides component video for distribution to the component distribution feeds (PRE 100) to other subsystems.

Component video distribution amplifier (PRE 250b) is connected (32e) to system interconnections (TRX 251) via eight sets of five 75 ohm BNC connectors running on class 4 shielded coaxial cable at 22-gauge. These connectors form component video presentation subsystem feed (PRE 100) that mediates between component video distribution amplifier (PRE 250b) and system interconnections (TRX 251). The eight sets represent the component video presentation feeds to presentation subsystem (PRE 000), production subsystem (PRO 000), network subsystem (NET 000), satellite subsystem (SAT 000), fractional DS-1 codec (PBX 002), DS-1 codec (PBX 003), and one auxiliary video feed (AUX 100). These connections provide the distribution channels to the other subsystems within system (10). Additionally, component video distribution amplifier (250b) is connected (32f) to high-definition data projector (PRE 300) via five 75 ohm BNC connectors running on class 4 shielded coaxial cable at 22-gauge. Connection (32f) provides the capability of video and data projection for the presentation subsystem as part of a multimedia production.

NTSC presentation switcher (PRE 100a) is connected (32g) to NTSC distribution amplifier (PRE 250a) via eight sets of one 75 ohm BNC connector running on class 4 shielded coaxial cable at 22-gauge. This connection provides NTSC video for distribution to system interconnections (TRX 251) as presentation subsystem system feed (PRE 100). The total number of cables composing the presentation feed equals six, five for component video and one for NTSC video.

NTSC distribution amplifier (PRE 250a) is connected (32h) to system interconnections (TRX 251) as NTSC video presentation subsystem feed (PRE 100) via eight sets of one 75 ohm BNC connectors running on class 4 shielded coaxial cable at 22-gauge. These connectors form NTSC video presentation subsystem feed (PRE 100) that mediates between NTSC distribution amplifier (PRE 250a) and system interconnections (TRX 251). The eight sets represent the NTSC video presentation feeds to presentation subsystem (PRE 000), production subsystem (PRO 000), network subsystem (NET 000), satellite subsystem (SAT 000), fractional DS-1 codec (PBX 002), DS-1 codec (PBX 003), and two auxiliary video feeds (AUX 100). These connections provide the distribution channels to the other subsystems within system (10). These distribution channels provide the ability to transfer NTSC video from the presentation subsystem to any other subsystem within system (10).

Eight NTSC video devices are connected to presentation switcher (PRE 100a). A remote feed (PRE 108-1), an NTSC feed from transmission subsystem (PRE 107-1), an NTSC video feed from production subsystem (PRE 106-1), local NTSC video cameras and NTSC video playback devices (PRE 101-1, PRE 102-1, PRE 103-1, PRE 104-1, and PRE 105-1). This provides a variety of source inputs for the presentation subsystem. Devices can be specified based on a particular NTBPS site's requirements. These devices are connected to the presentation switcher per the manufacturer's specifications for the audio or video device (most commonly used are either Y-C to Y-C [super video] connections or 75 ohm BNC connectors running on class 4 shielded coaxial cable at 22-gauge). In addition to the video feeds, there are two audio feeds for each video feed, providing stereo audio capability to the presentation system. Each audio feed consists of a dual-strand cable terminating in an RCA connector at the presentation switcher. Audio feeds are matched respectively to their originating video source. Due to the variety of audio outputs on these components, the video sources' specific audio connectors from the device are not described here.

Eight component video devices are connected to presentation switcher (PRE 100b). A remote feed (PRE 108-2), a component video feed from transmission subsystem (PRE 107-2), a component video feed from production subsystem (PRE 106-2), component video feed from a NuBUS computer workstation as MAC II or Super MAC (PRE 105-2), a component video feed from a ISA or EISA bus computer workstation as VGA or SVGA (PRE 104-2), and a diversity of local component video playback devices and cameras (PRE 101-2, PRE 102-2, and PRE 103-2). This provides a variety of source inputs for the presentation subsystem. Devices can be specified based on a particular system (10) site's requirements. These devices are connected by either three, four, or five 75 ohm BNC connectors running on class 4 shielded coaxial cable at 22-gauge (depending on manufacturer specifications). In addition to the video feeds, there are two audio feeds for each video feed, providing stereo audio capability to the presentation subsystem. Each audio feed consists of a dual-strand cable terminating in an RCA connector at the presentation switcher. Audio feeds are matched respectively to their originating video source. Due to the variety of audio outputs on these components, the video sources' specific audio connectors from the device are not described here.

The core of the audio components in the presentation subsystem is a high-end amplifier/tuner with digital Dolby and THX surround sound (PRE 400). Amplifier/tuner (PRE 400) receives audio inputs for video from NTSC presentation switcher (PRE 100a) and component video presentation switcher (PRE 100b). Additionally, it receives inputs from a compact disc player (PRE 401), a dual-cassette tape player/recorder (PRE 402), and a reel-to-reel tape player/recorder (PRE 403). Connections (32i) to these components are formed by two dual-strand audio cables. The connectors for these cables are per manufacturer specifications.

Output from amplifier/tuner (PRE 400) is routed to a variety of speakers: one each for right and left audio channels (PRE 410 R and PRE 410 L respectively), distributed speakers for surround sound and center channel audio (PRE 410 SS), and a powered subwoofer for low-level/active bass audio channel (PRE 410 SW). These outputs are connected (32j) to the amplifier/tuner via dual-strand audio cabling. The connectors for these cables are per manufacturer specifications. There is an additional stereo audio channel on amplifier/tuner (PRE 400) which can output the audio portion of a video feed to an audio distribution amplifier (PRE 450). Audio distribution amplifier's (PRE 450) connection (32k) to amplifier/tuner (PRE 400) is via dual-strand audio cabling. Again, the connectors for these cables are per manufacturer specifications.

There is a public address subsystem which supplements the main audio system (PRE 400). The public address system comprises an audio amplifier (PRE 404) and wired/wireless microphone units (PRE 405). Audio amplifier (PRE 404) receives its input from wireless and wired microphone units (PRE 405). These audio signals are outputted to distributed speakers (PRE 420) within the presentation subsystem and to audio distribution amplifier (PRE 450). Connections (321) between audio amplifier (PRE 404), speakers (PRE 420), wired microphone units (PRE 405) and audio distribution amplifier (PRE 450) are via dual-strand audio cabling. The connectors for these cables are per manufacturer specifications. Wireless microphone units (PRE 405) transmit their audio signals to a base unit which is connected by dual-strand audio cable to audio amplifier (PRE 404). In essence, the public address subsystem provides a feedback-free audio source for the presentation subsystem.

Audio distribution amplifier (PRE 450) provides audio for distribution to system interconnections (TRX 251) as presentation subsystem/bed (PRE 100). Audio distribution amplifier (PRE 450) receives the audio signal for distribution from its connection (32k) with amplifier/tuner (PRE 400) and the public address subsystem's audio amplifier (PRE 404).

Audio distribution amplifier (PRE 450) is connected (32m) to system interconnections (TRX 251) as the presentation system feed (PRE 100) via eight sets of two dual-strand audio cables. These connectors form the audio portion of presentation subsystem feed (PRE 100) that mediates between the audio distribution amplifier (PRE 450) and system interconnections (TRX 251). The eight sets represent the audio presentation feeds to presentation subsystem (PRE 000), production subsystem (PRO 000), network subsystem (NET 000), satellite subsystem (SAT 000), fractional DS-1 codec (PBX 002), DS-1 codec. (PBX 003), and two auxiliary audio feeds (AUX 100). These connections provide the audio distribution channels to the other subsystems within system (10). In addition, these connections provide the ability to transfer stereo audio from the presentation subsystem to any other subsystem within system (10).

PRODUCTION SUBSYSTEM

Figure 6:
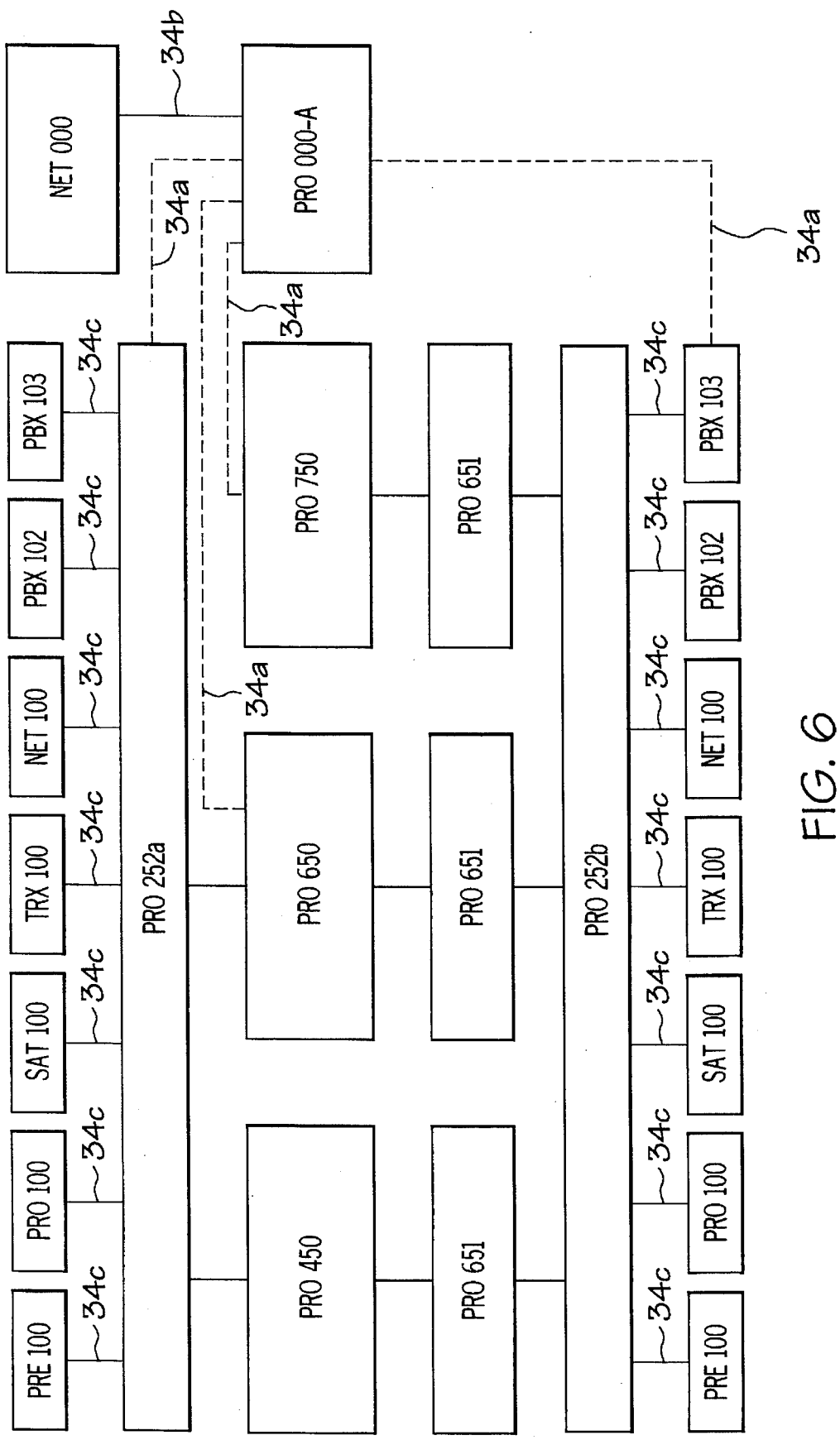
FIG. 6 is a schematic diagram illustrating the production subsystem of the present invention.
Figure 6A:
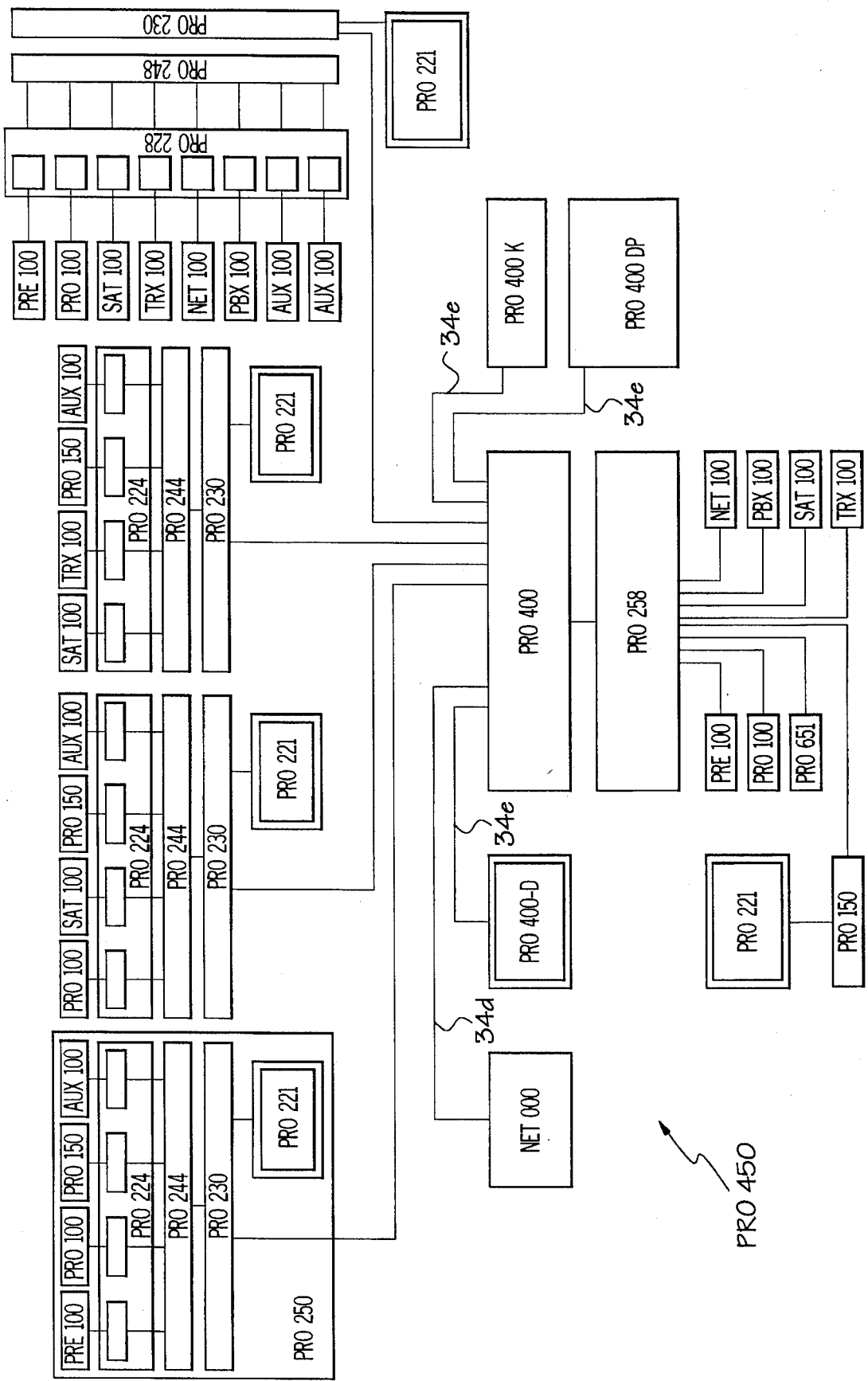
FIG. 6a shows in detail the NTSC production suite of the production subsystem of the present invention.

Referring now to FIG. 6, production subsystem (PRO 000) facilitates switching and routing of video and audio signals to and from a standard video production suite, a high definition video production suite, and a computer animation suite. In addition, production subsystem (PRO 000) provides the ability for system (10) to share audio and video source materials with other broadcast and presentation systems (10). In essence, the production subsystem is a high-level production facility residing within the broadcast and presentation system. The production subsystem offers a full range of cameras, video switching equipment, special effects equipment, editing equipment, the necessary monitors, signal-control devices, computer animation equipment, and video recording and playback devices. On-line and off-line editing, and stand-alone production services also are provided by audio/video production subsystem (PRO 000).

Production subsystem (PRO 000) is composed of an NTSC production suite (PRO 450), a high definition video production suite (PRO 650), and a computer animation suite (PRO 750). The primary components of production subsystem are two switcher/routers (PRO 252a and PRO 252b), a system controller (PRO 000-A), and the required interconnecting distribution wiring. These components interface with each other through a user-friendly Windows software environment. One switcher/router (PRO 252a) has receive functions for the production subsystem, while the other switcher/router (PRO 252b) has transmission functions. The production subsystem's design is similar in operation to the optical video subsystem within the transmission subsystem. That is, an audio and video signal is received by switcher/router (PRO 252a) and, through the switcher/router's matrix, the audio and video signal is passed to the NTSC and high definition production suites. This matrix can be configured as desired by subsystem controller (PRO 000-A).

Production subsystem controller (PRO 000-A) is connected (34a) to switcher/routers (PRO 252a, PRO 252b), high definition production suite (PRO 650), and computer animation suite (PRO 750) by RS 232-C serial interface connections. In addition, production subsystem controller (PRO 000-A) is connected (34b) to network subsystem (NET 000) by dual strand multi-mode fiber optic cable using ST multi-mode connectors. Subsystem controller (PRO 000-A requires either an ISA or EISA bus with a minimum of 4 MB of RAM, an 80 MB hard drive, and an 80386 SX-33 processor or greater. The recommended system controller configuration is a VESA local video bus with 8 MB of RAM, a 120 MB hard drive, an SVGA 0.28 pitch monitor, 2 MB of video RAM, an 80486 DX-33 processor or greater, a mouse or digitizer support, and audio and video enabling equipment (such as a video tape recorder/player or camera and microphone). Regardless of the controller's configuration, this workstation requires the installation of the appropriate FDDI network card.

One switcher/router (PRO 252a) is responsible for receiving audio and video input feeds from the other subsystems within system (10). Switcher/router receives presentation subsystem feed (PRE 100), production subsystem feed (PRO 100), satellite subsystem feed (SAT 100), transmission subsystem feed (TRX 100), network subsystem feed (NET 100), fractional DS-1 codec feed (PBX 102), and DS-1 codec feed (PBX 103). Switcher/router (PRO 252a) processes these feeds to either NTSC production suite (PRO 450) or high definition video production suite (PRO 650) based on the parameters set in switcher/router (PRO 252a) by subsystem controller (PRO 000-A).

Switcher/router (PRO 252b) is responsible for transmitting output signals from NTSC production suite (PRO 450), high definition video production suite (PRO 650), or computer animation suite (PRO 750). These outputs can be routed to the other subsystems within system (10). Switcher/ router transmits output signals to presentation subsystem feed (PRE 100), production subsystem feed (PRO 100), satellite subsystem feed (SAT 100), transmission subsystem feed (TRX 100), network subsystem feed (NET 100), fractional DS-1 codec feed (PBX 102), and DS-1 codec feed (PBX 103).

Connections (34c) between switcher/routers (PRO 252a, PRO 252b) and their feeds are via one 75 ohm BNC connector running on class 4 shielded coaxial cable at 22-gauge (for NTSC video), five 75 ohm BNC connectors running on class 4 shielded coaxial cable at 22-gauge (for component video), and four dual-strand audio cables. Not all audio cabling may be utilized at a given time which means that not all systems (10) utilize four-channel audio.

NTSC production suite (PRO 450) is an integrated video workstation environment for NTSC (RS-170A broadcast standard for color television) and Y/C (super video) video formats. Video workstation (PRO 400) accepts up to four standard NTSC or Y/C inputs in any combination. To allow a greater range of source inputs, each input channel on video workstation (PRO 400) is connected to a switching bay (PRO 250). There are four corresponding switching bays for the input channels. Switching bays one through three allow up to four video sources. The fourth switching bay allows a maximum of eight NTSC video sources. Video workstation (PRO 400) allows for computer graphics, special effects editing, and character generation, in addition to its role as a video controller, editor, and mixer.

Each switching bay (PRO 250) within NTSC production suite (PRO 450) allows for audio and video input feeds from the subsystems within system (10), a video tape playback unit (PRO 150), and an auxiliary audio and video feed (AUX 100) from a device such as a camera. The first three bays have four input sources. Two of the input sources are designated from other systems (10). The fourth bay allows a maximum of eight input sources. These sources are designated from presentation subsystem (PRE 100), satellite subsystem (SAT 100), transmission subsystem (TRX 100), public exchange subsystem (PBX 100), and two auxiliary inputs (AUX 100).

This four switching bay arrangement accommodates the widest range of possible input sources. This configuration could be suited for live video productions. Note that audio and video feeds from other subsystems within the system appear on several of the switching bays. This a deliberate arrangement to allow the greatest input selection possible. All connections within each switching bay are via one 75 ohm BNC connector running on class 4 shielded coaxial cable at 22-gauge and two dual-strand audio cables. Note that in the NTSC production suite, Y/C cabling connectors can be used in place of 75 ohm BNC cabling.

A switching bay consists of the following components: audio and video inputs (either source material or from device), preview monitors (PRO 224, PRO 228), a multi-source audio and video presentation switcher (PRO 244, PRO 248), a time-base corrector/frame synchronizer (PRO 230), and a line monitor (PRO 221). Preview monitors (PRO 224, PRO 228) display the image inputted from the source feed from the other subsystems. Multi-source audio and video presentation switcher (PRO 244, PRO 248) provides a means for selecting from among the input feeds. Time-base corrector/frame synchronizer (PRO 230) is utilized to correct instabilities and synchronization problems which develop in the transmission process. Additionally, time-base corrector/frame synchronizer (PRO 230) is connected to video production workstation (PRO 400). Each bay (PRO 250) accounts for one input feed on video production workstation (PRO 400). The line monitor allows viewing of the time-based corrected and synchronized image. The connections between the components within the switching bay are one 75 ohm BNC connector running on class 4 shielded coaxial cable at 22-gauge and two dual-strand audio cables. Together, these components provide production-quality audio and video source material for the video production workstation.

The heart of NTSC production suite (PRO 450) is a video production workstation (PRO 400). Workstation (PRO 400) combines the capability to perform audio mixing/editing, video mixing/editing, video special effects, character generation, and computer graphics/animations. Video production workstation (PRO 400) is connected (34d) to network subsystem (NET 000) via dual-strand multi-mode fiber optic cabling with ST connectors. Connection (34d) provides remote operation of the NTSC production suite and allows the NTSC production suite to access network resources. A monitor (PRO 400-D), a keyboard (PRO 400-K), and a digitizer pad (PRO 400-DP) are connected to video production workstation (PRO 400) by appropriate cabling per manufacturer specifications. These components respectively provide display, input, and control functions for the video production workstation. Video production workstation (PRO 400) outputs the processed signal out of one set of audio and video outputs to an audio and video distribution amplifier (PRO 258) which splits the signal into eight separate outputs each equivalent to the original signal. These eight feeds are distributed to production subsystem (PRO 100), presentation subsystem (PRE 100), transmission subsystem (TRX 100), satellite subsystem (SAT 100), private exchange subsystem (PBX 100), network subsystem (NET 100), an up/down scan converter (PRO 651), and a line output for a video recording device (PRO 150).

Up/down scan converter (PRO 651) samples an incoming video signal and processes that video signal automatically to the desired output format. Video recording device (PRO 150) is used to capture the processed video for off-line use such that the video source material provided by the video production workstation can be recorded in real-time (live) and played back at a later date. Video recording device (PRO 150) is connected to a line monitor (PRO 221). This line monitor displays the signal that has been processed by video production workstation (PRO 400). In essence, this monitor provides the first view of the completed audio and video production.

High definition video production suite (PRO 650) provides the capability to manage a real-time (live) high definition broadcast event. High definition suite (PRO 650) also provides all of the components necessary to produce a full-scale high definition presentation for distribution.

Figure 6B:
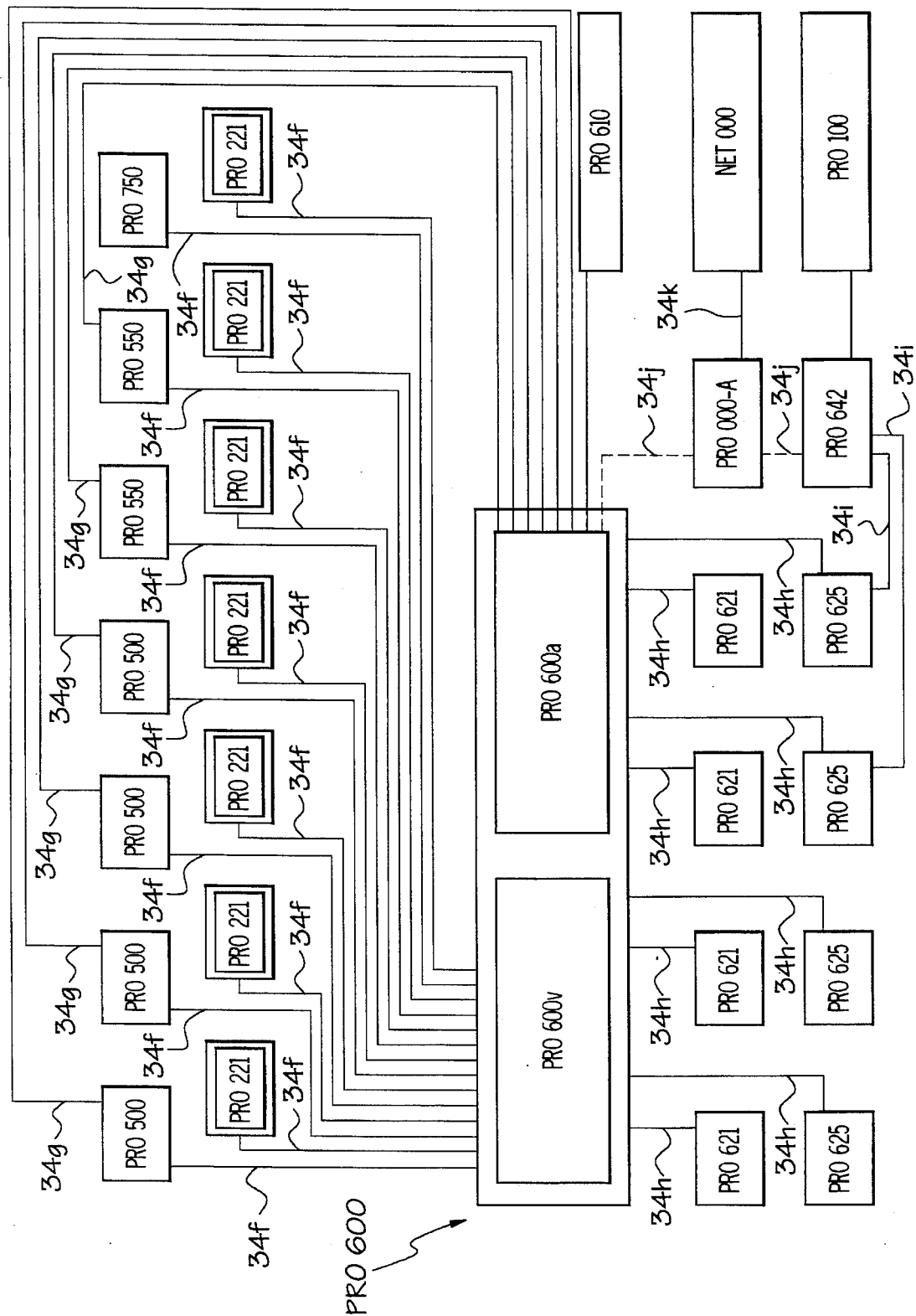
FIG. 6b shows in detail the high definition video production components of the production subsystem of the present invention.
Figure 6C:
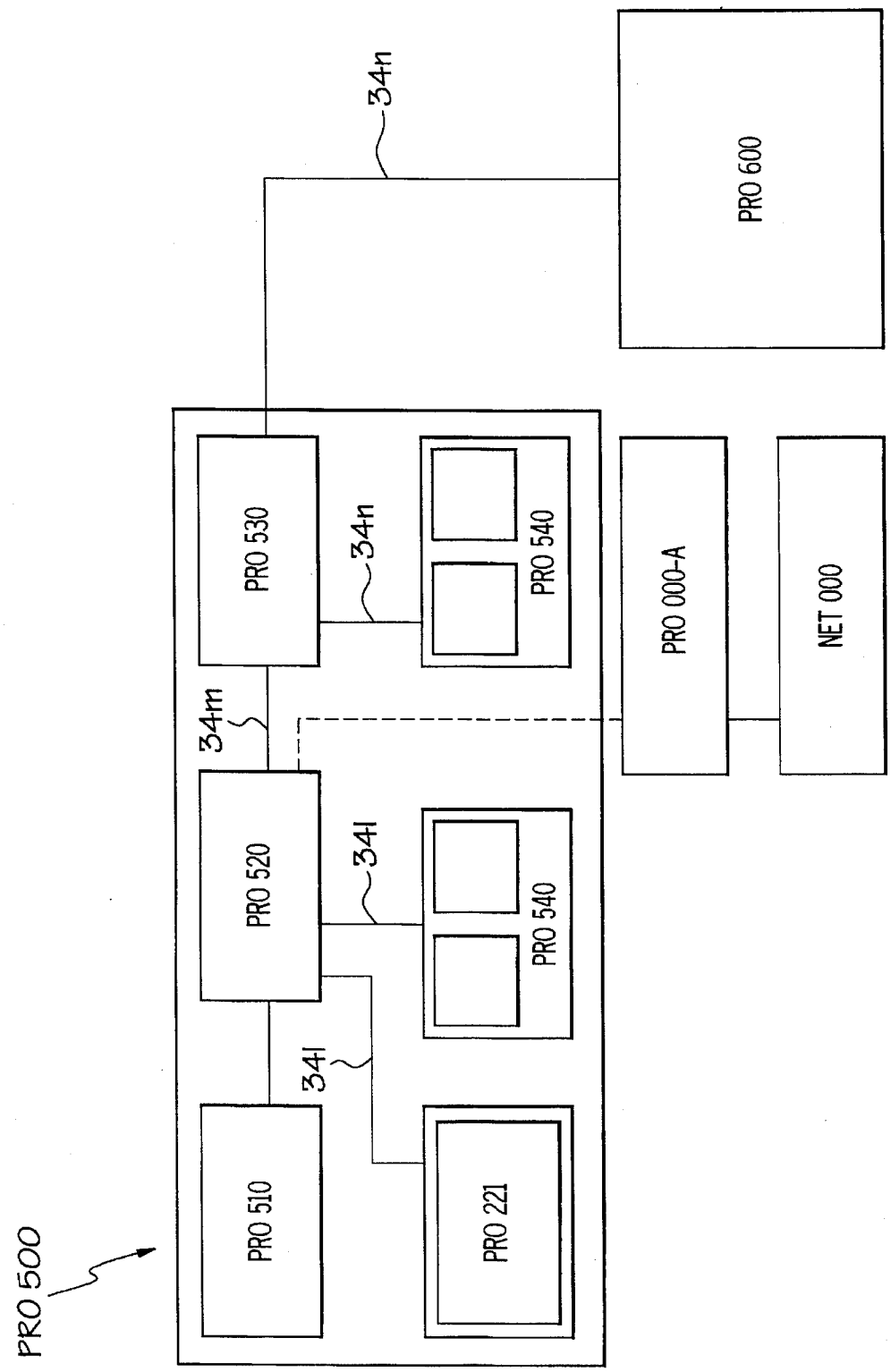
FIG. 6c shows in detail the components of the camera operations module of the production subsystem of the present invention.
Figure 6D:
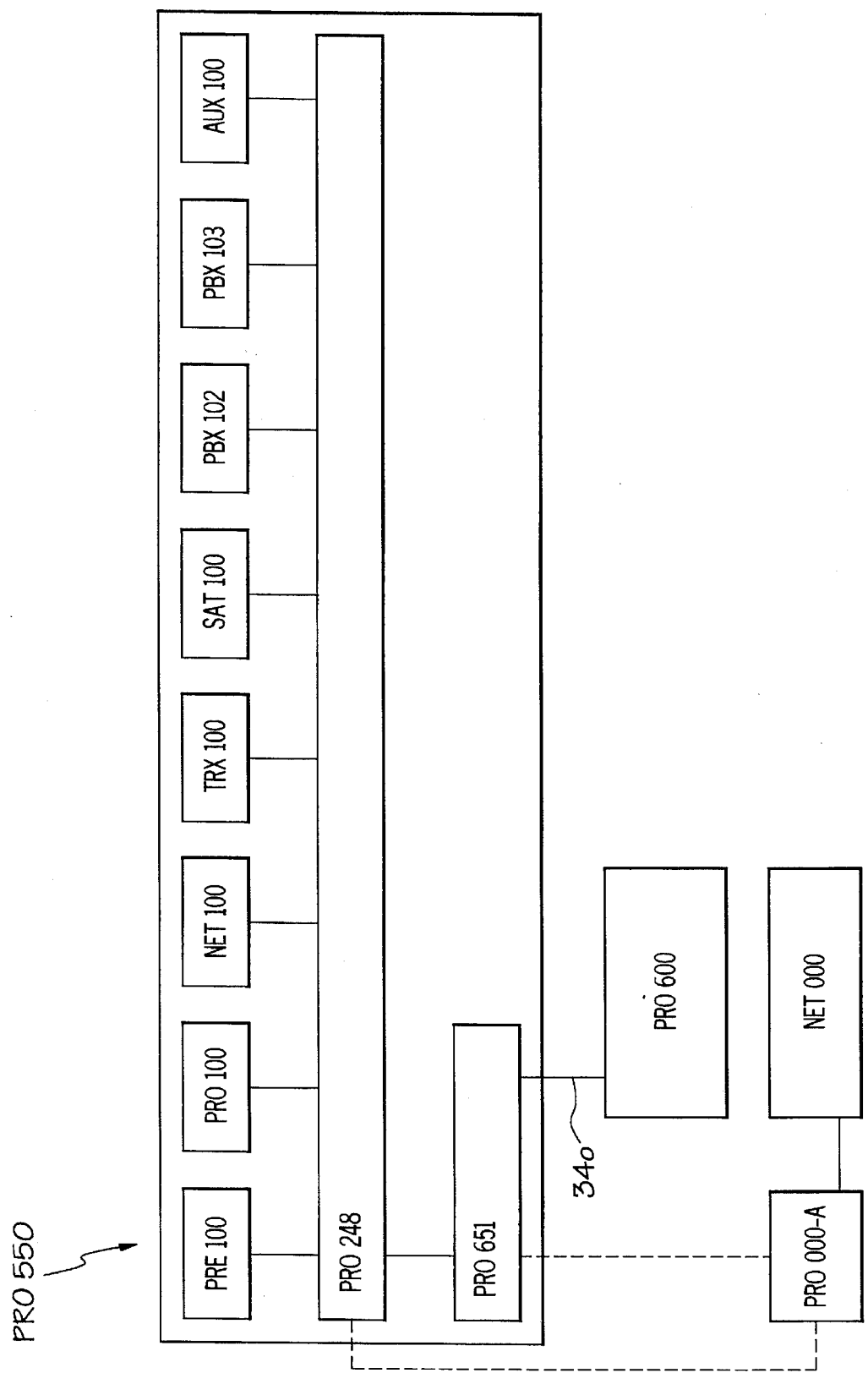
FIG. 6d shows in detail the auxiliary audio and video components of the production subsystem of the present invention.
Figure 6E:
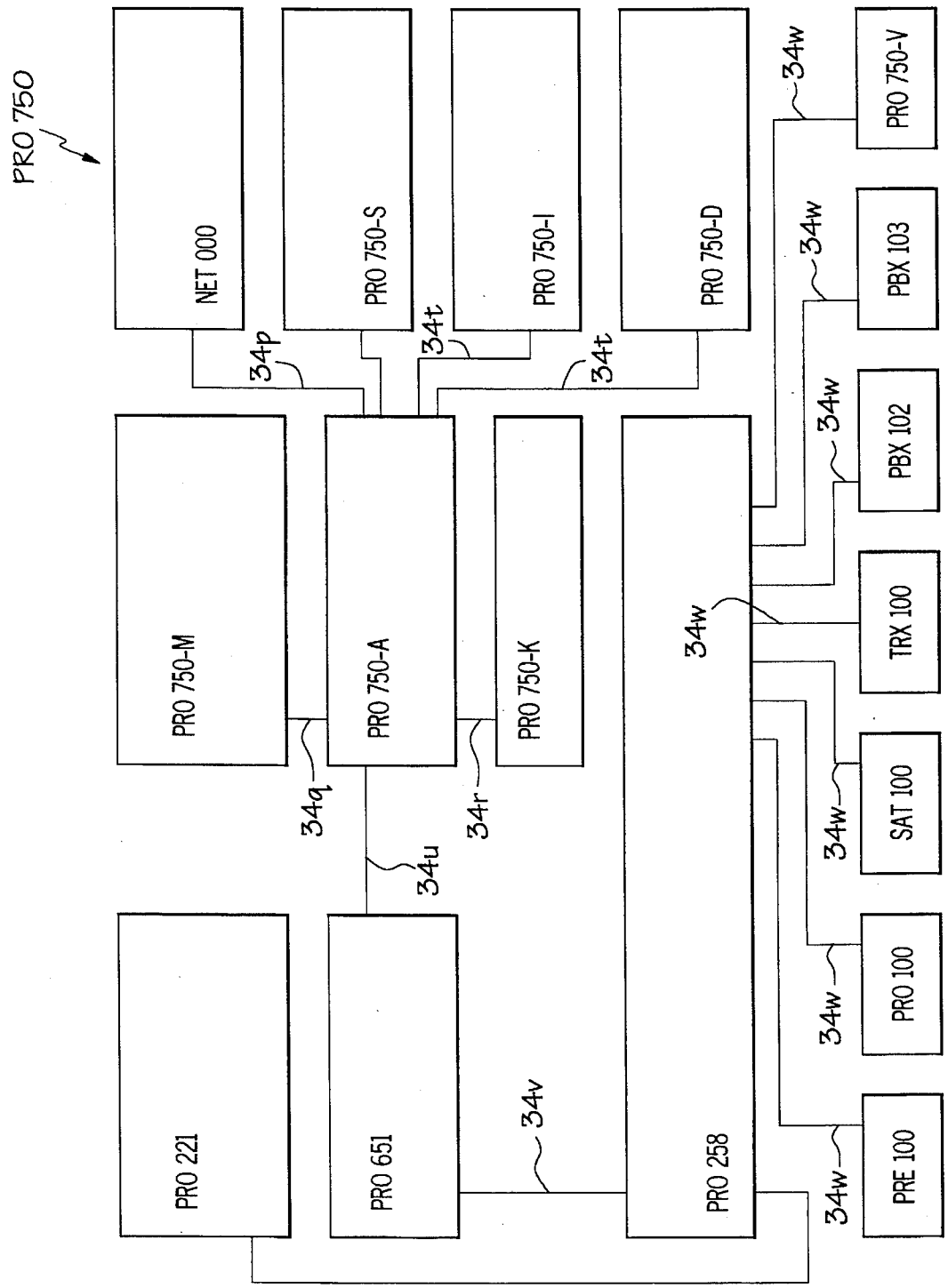
FIG. 6e illustrates the computer graphics and animation components of the production subsystem of the present invention.
Figure 7:
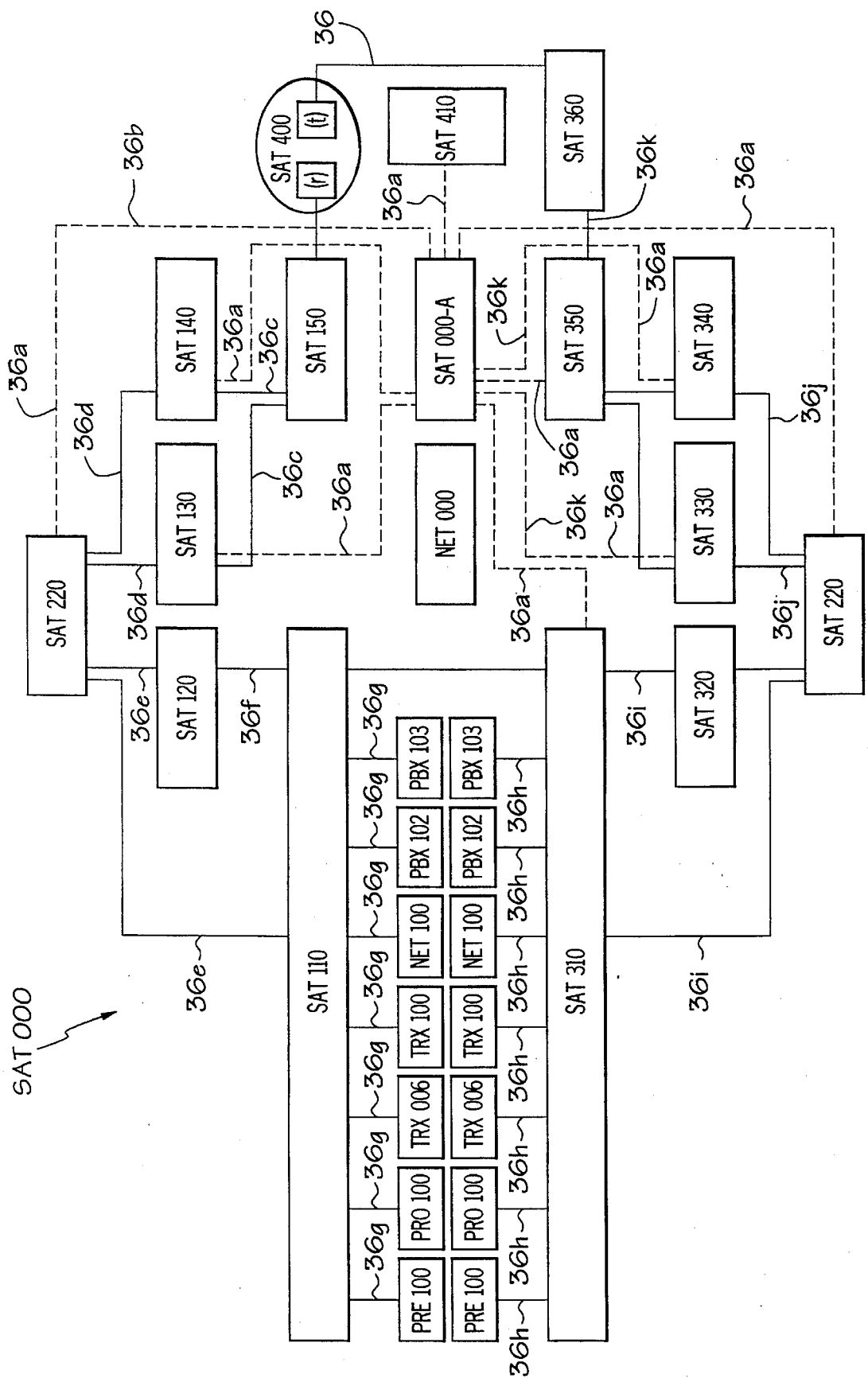
FIG. 7 is a schematic diagram illustrating the satellite subsystem of the present invention.

High definition video production suite (PRO 650) has a high definition production controller (PRO 600). Controller (PRO 600) comprises a high definition editing switcher (PRO 600v) and a high-quality, eight-channel audio mixing board (PRO 600a). Auxiliary equipment supplements high definition production controller (PRO 600) including a series of seven high definition preview monitors (PRO 221) and four camera operations modules (PRO 500). Each camera operations module (PRO 500) includes a video recorder which is described in detail below. In addition, two auxiliary audio and video service subsystem for high definition production (PRO 550) feeds are connected to controller (PRO 600). Auxiliary audio and video service subsystem for high definition production is described in detail in FIG. 6d. Computer animation suite (PRO 750) video feed also is attached to controller (PRO 600) and is described in detail in FIG. 6e.

All video connections (34f) from these components to high definition editing switcher (PRO 600v) are via four 75 ohm BNC connector running on class 4 shielded coaxial cable at 22-gauge. For each video input to high definition editing switcher (PRO 600v), there is an auxiliary component output to which preview monitors (PRO 221) are attached via four 75 ohm BNC connector running on class 4 shielded coaxial cable at 22-gauge.

For the audio input to high definition production controller (PRO 600), mono aural cables which are high-quality dual-strand audio cables, connect (34g) each camera operations module (PRO 500) and each auxiliary audio and video service subsystem for high definition production (PRO 550) to eight-channel audio mixing board (PRO 600a). The remaining two audio channels of the eight-channel audio mixing board (PRO 600a) are connected (34g) to a supplemental audio source (PRO 610). Each camera operations module (PRO 550) has a single dual-strand audio cable connected to a remote microphone unit which is not illustrated in FIG. 6b, but is included as part of the camera operations module.

Together, this arrangement of audio and video components permits full, high definition video and multi-channel audio management. That is, this configuration provides all the necessary elements to create high definition video production material.

High definition production controller (PRO 600) also provides four-channel high definition audio and video output that is supplemented by auxiliary outputs. Each output's connections (34h), both line and auxiliary, consists of four 75 ohm BNC connectors running on class 4 shielded coaxial cable at 22-gauge for video and two dual-strand audio cables. The auxiliary outputs are connected (34h) to a series of four high definition display monitors (PRO 621), each with corresponding input leads. The line outputs are connected to four high definition video recorders (PRO 625). High definition video recorders (PRO 625) have built-in time-based correcting capability for correcting any abnormalities within the signal so that "masters" (original source material) may be produced.

The first two line outputs are used as preview channels for the material in production. The remaining two line output channels show the actual transmission of the source material. This arrangement allows users to view the current source material while previewing the image to be cued. That is, users can view different source material simultaneously, which is ideal for "cutting" between images.

The auxiliary outputs on two of the high definition video recorders (PRO 625) are utilized to route the high definition video production (current source material) to a two-channel audio and video switcher (PRO 642). Connections (34i) are four 75 ohm BNC connector running on class 4 shielded coaxial cable at 22-gauge. Connection (34i) utilizes the auxiliary outputs on two of high definition video recorders (PRO 642) as a means of backup so that users can switch between source outputs without losing any material. In addition, this configuration allows users to stagger recording source material. One recorder starts operating while the other can be placed in standby mode (ready to record) so that an overlap of recorded materials is created.

High definition production controller (PRO 600) and two-channel audio and video switcher (PRO 642) can be controlled manually or remotely by production system controller (PRO 000-A). Furthermore, due to the system controller's (PRO 000-A) connection (34k) to network subsystem (NET 000), these functions also can be performed by workstations connected to the network subsystem. Connection (34k) dual-strand multi-mode fiber optic cabling with ST connectors.

High definition production controller (PRO 600) and two-channel audio and video switcher (PRO 642) are connected (34j) to production subsystem controller (34j) via an RS-232C serial connection. Two-channel audio and video switcher (PRO 642) has four 75 ohm BNC connectors running on class 4 shielded coaxial cable at 22-gauge and two dual-strand audio cables that form production subsystem feed (PRO 100) to other subsystems within the system.

Camera operations module (PRO 500) comprises a high definition camera (PRO 510), a camera controller unit (PRO 520), a video tape recorder with time-based coding (PRO 530), a preview monitor (PRO 221), and two vector scopes with waveform monitoring (PRO 540). These components provide operational control of high definition camera modules (PRO 500) discussed above.

Camera operations module (PRO 500) operates in the following manner: high definition camera (PRO 510) captures an image which is passed to camera controller unit (PRO 520) via a CCQ camera cable; the first of two auxiliary component video outputs on the camera controller unit (PRO 520) outputs a preview of the image on preview monitor (PRO 221); and the second auxiliary component video output on camera controller unit (PRO 520) is routed to a vector scope with waveform monitoring (PRO 540) capabilities. Connections (34l) from the two auxiliary component video outputs on camera controller unit (PRO 520) to preview monitor (PRO 221) and vector scope (PRO 540) are via four 75 ohm BNC connectors running on class 4 shielded coaxial cable at 22-gauge.

Camera controller unit (PRO 520) can be operated manually or automatically via a user-friendly Windows interface from system controller (PRO 000-A). In addition to the two auxiliary component video outputs, the camera controller unit has a line output. Camera controller unit (PRO 520) can remotely operate zoom, focus, shutter, and luminance on high definition camera (PRO 510). Likewise, these functions can be performed remotely from the production subsystem by subsystem controller's (PRO 000-A) interface with camera controller unit (PRO 520). Also, due to production subsystem controller's (PRO 000-A) interface with network subsystem (NET 000), these functions can be performed by workstations connected to the network subsystem.

Video tape recorder with time-based coding (PRO 530) is connected (34m) to the line output of the camera controller unit (PRO 520) via four 75 ohm BNC connectors running on class 4 shielded coaxial cable at 22-gauge. Video tape recorder (PRO 530) stores high definition images on high-quality magnetic media tape and has one auxiliary component video output and one line component video output. The auxiliary component video output is utilized for a second vector scope with waveform monitoring capabilities (PRO 540). The line component video output is routed to high definition editing switcher (PRO 600v). Connections (34n) from auxiliary component video output and the line component video output to the vector scope and high definition production suite video control module are via four 75 ohm BNC connectors running on class 4 shielded coaxial cable at 22-gauge.

Vector scopes (PRO 540) are utilized for trouble-shooting and visualizing the form of the video image signal. For example, the signal from high definition camera (PRO 510) can exhibit abnormalities in its signal signature. Camera controller unit (PRO 520) would be used to adjust the signal's interpretation. The abnormalities in the signal signature would reflect degradation in image preview monitor (PRO 221). After camera controller unit (PRO 520) has been used to normalize the signal signature, the image degradation on preview monitor (PRO 221) would be lessened and the signal signature on vector scope (PRO 540) would also normalize. For a signal from camera controller unit (PRO 520) to video tape recorder with time-based coding (PRO 530), vector scope (PRO 540) attached to video tape recorder (PRO 530) is used to monitor abnormalities and other problems in connection (34m) between camera controller unit (PRO 520) and video tape recorder (PRO 530). Thus, when vector scope (PRO 540) which is attached to camera control unit (PRO 520) registers a normal signal signature, but vector scope (PRO 540) which is attached to video tape recorder (PRO 530) registers an abnormal video signal signature, the user is quickly able to identify that a problem exists in connection (34m) between camera control unit (PRO 520) and video tape recorder (PRO 530). This vector scope configuration is designed to provide redundant diagnostic capability which is a means of testing the video signal signature between camera control unit (PRO 520) and video tape recorder (PRO 530).

In essence, the components within the camera operations module (PRO 500) combine to output a four-component video signal through the video tape recorder (PRO 530) to the high definition production controller (PRO 600) within the high definition production suite (PRO 650). The connection from the video tape recorder to the component video control unit is via four 75 ohm BNC connectors running on class 4 shielded coaxial cable at 22-gauge.

Auxiliary audio and video service subsystem for high definition production (PRO 550) provides a multi-access and multi-formatted switching arrangement for audio and video feeds for high definition production suite (PRO 650). In essence, this subsystem routes audio and video feeds that are in any format from the other subsystems into high definition production suite (PRO 650).

An incoming signal from a subsystem within system (10) directly routes to switcher/router (PRO 252a) in production subsystem (PRO 000). Switcher/router (PRO 252a) discriminates between an NTSC and a high definition component video signal. High definition component video signals are routed through auxiliary audio and video service subsystem for high definition production (PRO 550). Switcher/router (PRO 252a) is essential because a distribution amplifier would not be able to discriminate the difference between an NTSC video signal and a high definition between the types of video signals.

Auxiliary audio and video service subsystem for high definition production (PRO 550) comprises an audio and video presentation switcher (PRO 248), an up/down scan converter (PRO 651), and audio and video subsystem feeds which may be in either NTSC or multi-component format from presentation subsystem (PRE 100), production subsystem (PRO 100), network subsystem (NET 100), transmission subsystem (TRX 100), satellite subsystem (SAT 100), fractional DS-1 codec (PBX 102), and DS-1 codec (PBX 103). An auxiliary audio and video feed from an audio and video device (AUX 100) is reserved for the last slot on the audio and video presentation switcher (PRO 248). Auxiliary audio and video service subsystem for high definition production (PRO 550) allows selection of multi-source and multi-formatted audio and video materials. Regardless of the format of the signal that is inputted to presentation switcher (PRO 248), up/down scan converter (PRO 651) rearranges the signal format to a four-component video feed conforming to the SMPTE 240M analog standard for high definition video.

Presentation switcher (PRO 248) and up/down scan converter (PRO 651) can be operated manually or remotely via their serial connections to production subsystem controller (PRO 000-A). Subsystem controller (PRO 000-A) provides a user-friendly Windows environment for remotely actuating and controlling presentation switcher (PRO 248) and up/down scan converter (PRO 651). Remote actuation of presentation switcher (PRO 248) and up/down scan converter (PRO 651) is provided via system controller's (PRO 000-A) connection to network subsystem (NET 000) which provides remote access for any workstations connected to the network subsystem. System controller (PRO 000-A) is connected to network subsystem via dual-stand fiber optic cabling with ST connectors.

The signal from up/down scan converter (PRO 651) is fed as four-component video to high definition production controller (PRO 600). Connection (34o) provides a video input channel into high definition production suite control module (PRO 600) and is four 75 ohm BNC connectors running on class 4 shielded coaxial cable at 22-gauge.

Computer animation suite (PRO 750) provides high-level, high-resolution computer graphics and animation for production use. A graphics-engine computer workstation (PRO 750-A) is UNIX compatible and utilizes a reduced-instruction set commands (RISC) processor. UNIX compatibility enables graphics-engine workstation (PRO 750-A) to be easily configured as a network workstation (NET 100x). The RISC-based processor allows high-speed floating point operations which provide high-resolution, high-speed computer graphics which are necessary for animation productions and computer-based presentations. A computer animation is formed from a series of still computer images that are joined together to form the actual animation.

Graphics-engine computer workstation (PRO 750-A) is attached to the following peripheral devices: a very high-resolution data display monitor (PRO 750-M), an enhanced computer workstation keyboard (PRO 750-K), a mass-storage device (PRO 750-S), a high-resolution data image scanner (PRO 750-I), and a digitizer pad (PRO 750-D). Graphics-engine computer workstation (PRO 750-A) outputs computer graphics and animations via an up/down scan converter (PRO 651).

Graphics-engine computer workstation (PRO 750-A) is connected (34p) to network subsystem (NET 000) by dual-strand fiber optic cabling with ST connectors. Connection (34p) enables remote input and limited access control of graphics-engine computer workstation (PRO 750-A) by other computer workstations (NET 100x) attached to the network subsystem.

Connection (34q) from graphics-engine computer workstation (PRO 750-A) to high-resolution data monitor (PRO 750-M) is per manufacturer specifications and provides a data display output for the graphics-engine computer workstation. Connection (34r) from graphics-engine computer workstation (PRO 750-A) to the enhanced computer workstation keyboard (PRO 750-K) is per manufacturer specifications and allows keyboard command input to the graphics-engine computer workstation. Connection (34s) from graphics-engine computer workstation (PRO 750-A) to mass-storage device (PRO 750-S) is an SCSI interface. Animation productions require large amounts of computer hard disk space, and mass-storage device (PRO 750-S) provides graphics-engine computer workstation (PRO 750-A) with the requisite storage capability for complex animations.

Connections (34t) from graphics-engine computer workstation (PRO 750-A) to high-resolution data image scanner (PRO 750-I) and digitizer pad (PRO 750-D) are via serial interfaces. The connection to the high-resolution data image scanner provides the ability to input photographic and print imagery directly into a computer-based presentation or animation production. The graphics-engine computer workstation's connection to the digitizer pad provides a mouse-like control to supplement the command input functions of the keyboard.

Connection (34u) from graphics-engine computer workstation (PRO 750-A) to up/down scan converter (PRO 651) is a multi-component format set by the manufacturer of the video output card located in the graphics-engine computer workstation. In this particular embodiment, the video output is split into 75 ohm BNC connectors running on class 4 shielded coaxial cable at 22-gauge. The given number of actual connectors required for attachment to up/down scan converter (PRO 651) depends on manufacturer specifications.

Up/down scan converter (PRO 651) is optimized to translate graphics-engine computer workstation's (PRO 750-A) video output signal to either NTSC or high definition video. Regardless of its format, the signal passes to a distribution amplifier (PRO 258) as a four-component video signal. This multi-component process minimizes signal degradation. Connection (34v) from up/down scan converter (PRO 651) to distribution amplifier (PRO 258) is four 75 ohm BNC connectors running on class 4 shielded coaxial cable at 22-gauge.

One-to-eight distribution amplifier (PRO 258) is responsible for distributing the four-component video signal to preview monitor (PRO 221) as well as feeds to presentation subsystem (PRE 100), production subsystem (PRO 100), satellite subsystem (SAT 100), transmission subsystem (TRX 100), fractional DS-1 codec (PBX 102), DS-1 codec (PBX 103), and a computer animation suite video feed (PRO 750-V) into high definition production suite (PRO 650). One-to-eight distribution amplifier (PRO 258) can split the four-component video signal from up/down scan converter (PRO 651) into eight separate outputs, each output equal to the original signal. Connections (34w) from distribution amplifier (PRO 258) to its output feeds are via four 75 ohm BNC connectors running on class 4 shielded coaxial cable at 22-gauge.

SATELLITE SUBSYSTEM

Satellite subsystem (SAT 000) is designed to provide alternative transmission and reception means for the broadcast and presentation system. Specifically, the satellite subsystem is capable of receiving signals sent in C-Band, Ku-Band and microwave from satellite transponders. For transmission purposes, the satellite subsystem is equipped with a Ku-Band waveguide transmitter, but cannot transmit C-Band frequencies. The satellite subsystem can alternately receive and transmit signals in analog and digital form. Additional equipment is utilized for encrypting and decrypting purposes to provide a higher-level of security during transmission.

Satellite subsystem controller (SAT 000-A) is a computer workstation which provides operational control of the satellite subsystem. Subsystem controller (SAT 000-A) operates in the Windows environment and has a user-friendly interface. Subsystem controller (SAT 000-A) accesses components in the both the receive and transmission sides of the satellite subsystem including: analog and digital receivers (SAT 130, SAT 140), two switcher/routers for transmission and reception (SAT 220), a remote-actuated antenna positioner (SAT 410), an audio and video presentation switcher (SAT 310), a radio frequency modulating switcher (SAT 350), and analog and digital transmitter units (SAT 330, SAT 340). The subsystem controller's access of these components provides full regulation of the satellite subsystem's operation and connections (36a) are RS-232C serial-type connections. Subsystem controller (SAT 000-A) requires either an ISA or EISA bus with a minimum of 4 MB of RAM, an 80 MB hard drive, and an 80386 SX-33 processor or greater. The recommended system controller configuration is a VESA local video bus with 8 MB of RAM, a 120 MB hard drive, an SVGA 0.28 pitch monitor, 2 MB of video RAM, an 80486 DX-33 processor or greater, a mouse or digitizer support, and audio and video enabling equipment (such as a video tape recorder/player or camera and microphone). Regardless of the controller's configuration, this workstation requires the installation of the appropriate FDDI network card.

Satellite subsystem can transmit and receive both sides of a two-way video teleconference. For example, a program produced within presentation subsystem (PRE 000) would be routed to satellite subsystem (SAT 000). Presentation switcher (SAT 310) would select that program's signal for input to the satellite subsystem. If desired, the signal could be encrypted prior to being encoded for transmission. Subsystem controller (SAT 000-A) would designate the frequency for transmission (in either analog or digital format), the satellite transponder to be used, and positioning of the antenna to the appropriate satellite. Once the signal is encoded for transmission, it is sent to a waveguide generator (SAT 360) which creates the actual signal that is going to the satellite. At the same time as the program signal is being transmitted, the satellite subsystem is capable of receiving a signal from the satellite to which it is transmitting, but on a different satellite transponder frequency. The signal being received is decoded and decrypted. For a video teleconference between a system (10) site in Chicago and a system (10) site in New York, the Chicago site could transmit a presentation to New York while receiving a different presentation from New York at the same time. System (10) cross-configuration allows for multiple programs, both on-site and remote, to occur simultaneously. Thus, multiple system (10) sites can produce independent presentations and transmit them by satellite to other system (10) sites and nonsystem sites that have satellite reception, while receiving presentations produced elsewhere at the same time. The number of presentation that the satellite subsystem may receive is limited to the number of satellite receivers available at that site.

Satellite receiving/transmitting antenna (SAT 400) has one receiver element (SAT 400[r]) and one transmitter element (SAT 400[t]). Satellite antenna (SAT 410) captures a signal through receiver element (SAT 400[r]). This signal is sent via connection (36b) which is one 75 ohm BNC connector running on class 4 shielded coaxial cable at 22-gauge, to a radio frequency distribution amplifier (SAT 150). Radio frequency distribution amplifier (SAT 150) constructs two duplicates of the original satellite signal. These duplicate signals are sent via connections (35c) to analog satellite receiver (SAT 130) and digital satellite receiver (SAT 140). Connections 36c are separate 75 ohm BNC connectors running on class 4 shielded coaxial cable at 22-gauge. Satellite receivers (SAT 130, SAT 140) decode the satellite signal. After decoding, the signal is in an NTSC format with balanced audio. Receivers (SAT 130, SAT 140) provide separate audio and video channels.

The decoded audio and video signal is sent to a switcher/router (SAT 220) via connection (36d) which is one 75 ohm BNC connector running on class 4 shielded coaxial cable at 22-gauge and two dual-strand audio cables having screw-type connectors. Depending on the configuration of switcher/router (SAT 220) as determined by subsystem controller (SAT 000-A), the audio and video signal will either be passed directly to audio and video distribution amplifier (SAT 110) or decrypted by audio and video decryption device (SAT 120) and then sent to audio and video distribution amplifier (SAT 110). From audio and video distribution amplifier (SAT 110), an audio and video feed (SAT 100) is available for access and distribution to the other subsystems including presentation (PRE 100), production (PRO 100), and transmission subsystems (TRX 100), along with the feeds to fractional DS-1 codec (PBX 102) and DS-1 codec (PBX 103). Connection (36e) from switcher/router (SAT 220) to either audio and video distribution amplifier (SAT 110) or audio and video decryption device (SAT 120) is one 75 ohm BNC connector running on class 4 shielded coaxial cable at 22-gauge and two dual-strand audio cables. Also, from audio and video decryption device (SAT 120) to audio and video distribution amplifier (SAT 110), connection (36f) is one 75 ohm BNC connector running on class 4 shielded coaxial cable at 22-gauge and two dual-strand audio cables.

Connection (36g) is the feed from audio and video distribution amplifier (SAT 110) to DS-3 muldem (TRX 006) is one 75 ohm BNC connector running on class 4 shielded coaxial cable at 22-gauge. Unlike the other system feeds from audio and video distribution amplifier (SAT 110) which utilize audio and video, DS-3 muldem (TRX 006) only utilizes a broad-band channel which is an analog-encrypted DS-3 signal.

For transmission, the satellite subsystem can select audio and video signals for processing from presentation subsystem (PRE 000), production subsystem (PRO 000), transmission subsystem (TRX 000), satellite subsystem (SAT 000), network subsystem (NET 000), DS-3 muldem (TRX 006), feed from a fractional DS-1 codec (PBX 102), or from the feed from a DS-1 codec (PBX 103). These audio and video feeds connect (36h) to audio and video presentation switcher (SAT 310) via one 75 ohm BNC connector running on class 4 shielded coaxial cable at 22-gauge and two dual-strand audio cables. Connections (36h) allow audio and video signals from other subsystems to be routed for satellite transmission.

From audio and video presentation switcher (SAT 310), the audio and video feeds are routed simultaneously to an audio and video encryption device (SAT 320) and a switcher/router (SAT 220). Connections (36i) from audio and video presentation switcher (SAT 310) to audio and video encryption device (SAT 320) and switcher/router (SAT 220) are one 75 ohm BNC connector running on class 4 shielded coaxial cable at 22-gauge and two dual-strand audio cables. Based on subsystem controller's (SAT 000-A) settings, switcher/router (SAT 220) selects either the encrypted audio and video feed or the direct audio and video feed from audio and video presentation switcher (SAT 310). Again, based on subsystem controller's (SAT 000-A) settings, this audio and video signal is routed to one of two satellite transmitters (SAT 330, SAT 340). Connection (36j) is one 75 ohm BNC connector running on class 4 shielded coaxial cable at 22-gauge and two dual-strand audio cables. Audio and video signals which require analog transmission utilize analog transmitter (SAT 330). Audio and video signals which require digital transmission utilize digital transmitter (SAT 340). Both transmitters are remotely controlled by subsystem controller (SAT 000-A) through connection (36a) which is a RS-232C serial connection.

Subsystem controller (SAT 000-A) positions antenna (SAT 400) by controlling remote-actuated satellite antenna positioner (SAT 410). The antenna position is selected from a database of known satellite locations. Subsystem controller (SAT 000-A) also sets transmission frequencies based on known transponder information. Concurrently, the selected satellite transmitter formats the audio and video signal for satellite transmission. This formatted signal is sent to a waveguide generator (SAT 360) via connection (36k) which is one 75 ohm BNC connector running on class 4 shielded coaxial cable at 22-gauge. Waveguide generator (SAT 360) amplifies the signal and sends the amplified signal to transmitter element (SAT 400[$t$]) on satellite antenna (SAT 400). Connection (36l) from waveguide generator (SAT 360) to transmitter element (SAT 400) is via a waveguide conduit per manufacturer specifications. This completes the required process for transmitting an audio and video signal via satellite.

Similarly, a microwave subsystem with similar capacities can replace or be used in conjunction with the satellite subsystem. In its broadest form, the microwave subsystem would be very similar in design and implementation. The differences being that microwave is generally used as a point to point service, whereas satellites are point to multi-point service.

PORTABLE UNIT

Figure 8:
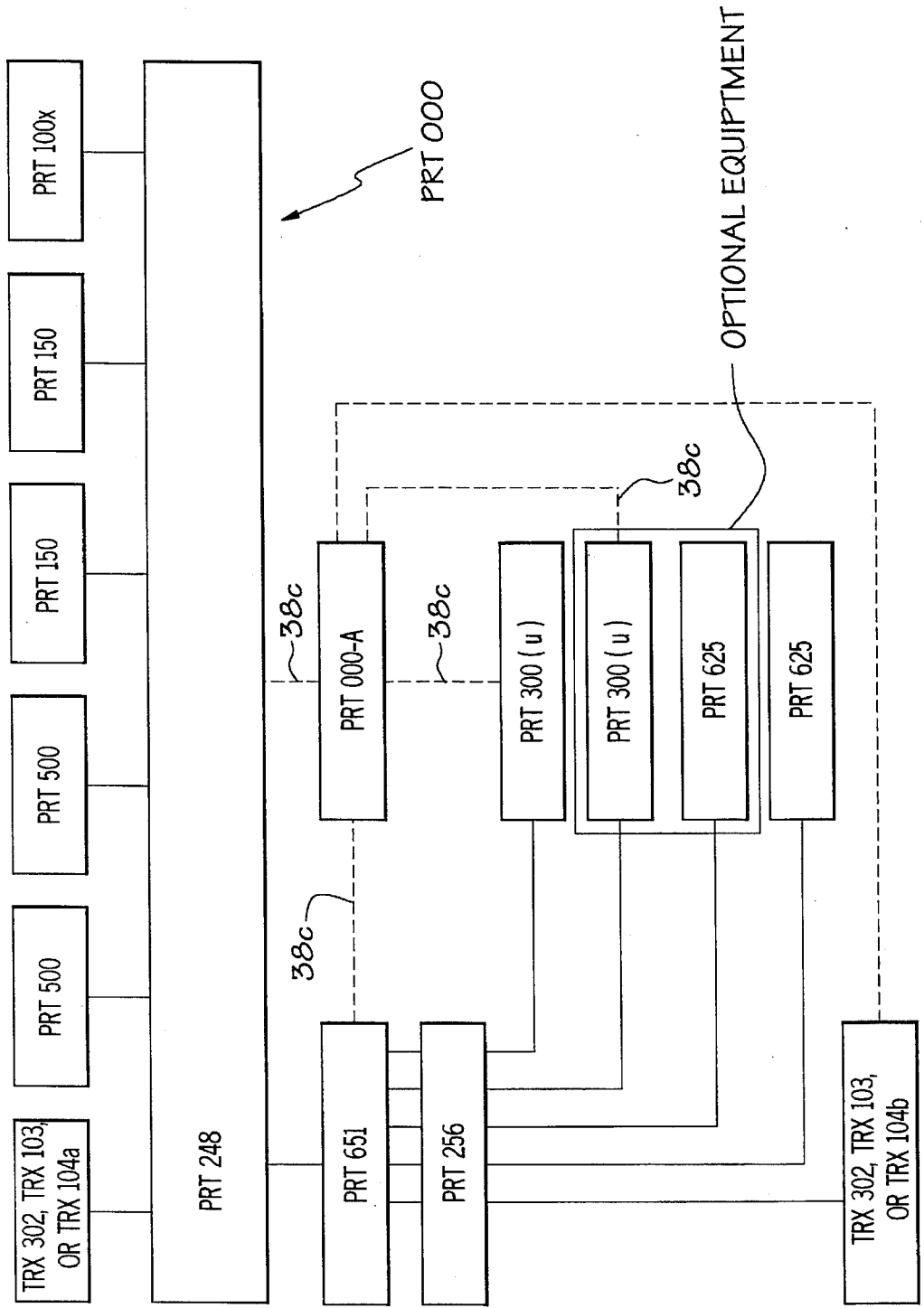
FIG. 8 is a schematic diagram illustrating the portable unit embodiment of the present invention.

Referring to FIG. 8, portable unit (PRT 000) is a scaled-down version of broadcast and presentation system which combines the functionality of the presentation, production, and transmission subsystems within a modular framework. Portable unit (PRT 000) is designed for easy assembly and disassembly. Its primary use is at locations remote to a system site where high-quality presentations are required. Portable unit (PRT 000) is flexibly engineered to serve either as a remote system site, a stand-alone unit, or as a system liaison with nonsystem sites which have compatible reception, audio, and video systems.

While portable unit (PRT 000) does not have the full functionality of a system site, it provides many of the standard functions at a reduced level of sophistication. Portable unit (PRT 000) lacks the following capabilities of the full system: routing on demand, sending video signals via the publicly switched digital network (PSDN), full system editing, and the range of available audio and video source inputs. For instance, whereas the full system routes video signals on demand, the portable unit requires dedicated services, where contact with the portable unit is initiated by either a full system or similar service on the PSDN. Likewise, whereas the full system has full editing control, the portable unit has limited switching and special effects capabilities which are designated by the specific equipment installed for video processing. Thus, portable units can be configured to their specific application. The final difference between the full system and the portable unit is that within the full system, all audio and video services are available from one full system to other full systems, while the portable unit has a maximum number of six audio and video source inputs.

The core of portable unit (PRT) is an up/down scan converter (PRT 651) which translates virtually any incoming video format signal to any required video format output. Up/down scan converter (PRT 651) is connected (38a) to a multi-function audio and video switcher (PRT 248) via CCQ cable. Multi-function audio and video switcher (PRT 248) has six audio and video input feeds connected to it. These feeds include: either optical video interface device feeds (TRX 302) or a DS-3 codec for NTSC (TRX 103) or a DS-3 high definition video codec (TRX 104a), camera operations modules (PRT 500), video playback units (PRT 150), and a computer workstation for computer-based presentations (PRT 100x).

Because of portable unit's (PRT 000) flexible configuration, the input feeds can be changed to more appropriately suit the remote application. For example, the portable unit can receive multiple, live camera feeds (up to six) with no need for video playback, computer graphics, or remote video feed. Thus, six camera modules (PRT 500) could be attached as video inputs to multi-function audio and video switcher (PRT 248) and thereby replacing all of the other feeds. FIG. 8 illustrates the optimal configuration of feeds going to multi-function audio and video switcher (PRT 248).

Multi-function audio and video switcher (PRT 248) has the flexibility to accept different input modules. For example, an NTSC feed requires only a single 75 ohm BNC connector running on class 4 shielded coaxial cable at 22-gauge and two dual-strand audio cables. On the other hand, a computer workstation for computer-based presentations requires three, four, or five BNC connectors running on class 4 shielded coaxial cable at 22-gauge and two dual-strand audio cables. Thus, the multi-function audio and video switcher can have any combination of multi-component or composite input feeds to a total of six feeds. All the audio and video input feeds to multi-function audio and video switcher (PRT 248) are connected via either multi-component or composite 75 ohm BNC connectors running on class 4 shielded coaxial cable at 22-gauge and two dual-strand audio cables as appropriate to the input device based on manufacturer specifications.

Optical video interface device feeds (TRX 302) provides a composite or multi-component video and audio input to multi-function audio and video switcher (PRT 248). DS-3 codec for NTSC (TRX 103) provides a studio-quality NTSC composite video and stereo audio feed. DS-3 high definition video codec (TRX 104a) provides a multi-component high definition video and stereo audio feed. Camera operations modules (PRT 500) provides a multi-component video and stereo audio feed. Camera operations modules (PRT 500) can be configured for NTSC or high definition multi-component video. Like camera operations modules (PRO 500) in FIG. 6c for high definition, camera operations modules (PRT 500) consist of a high definition camera, a camera controller unit, a video tape recorder with time-based coding, a preview monitor, or two vector scopes with waveform monitoring. For more detailed information on the interconnections within the camera operations modules, refer to FIG. 6c's description for its camera operations modules. Video playback units (PRT 150) provide either NTSC or high definition video and stereo audio input feeds. A computer workstation (PRT 100x) provides a multi-component video format for computer-based presentations.

Up/down scan converter (PRT 651) is connected (38b) to an audio and video distribution amplifier (PRT 256). Connection (38b) allows multi-source output to high definition video projector units (PRT 300 [u]), multi-component video recording devices (PRT 625), or to either optical video interface device feeds (TRX 302) or a DS-3 codec for NTSC (TRX 103) or a DS-3 high definition video codec (TRX 104a). Connection (38b) is four BNC connectors running on class 4 shielded coaxial cable at 22-gauge and two dual-strand audio cables. Likewise, the connections from the audio and video distribution amplifier to its outputs are via multi-component 75 ohm BNC connectors running on class 4 shielded coaxial cable at 22-gauge and two dual-strand audio cables as appropriate to the output device based on manufacturer specifications.

High definition video projector units (PRT 300 [u]) provide the large-screen video display capability for portable unit (PRT 000). Multi-component video recording devices (PRT 625) provide recording capability for a production in progress. In a standard configuration, only one high definition video projector unit and one multi-component video recording device are required. However, in instances where multi-screen displays are required, or when staggered recording of source material is required (overlapping of the recording for off-line editing), additional high definition video projector units and multi-component video recording devices can be incorporated directly into the portable unit's configuration.

Portable system controller (PRT 000-A) is provided for remote operation and control of portable unit (PRT 000). Portable system controller (PRT 000-A) is a computer workstation configured with either an ISA or EISA bus with a minimum of 4 MB of RAM, an 80 MB hard drive, and an 80386 SX-33 processor or greater. The recommended system controller configuration is a VESA local video bus with 8 MB of RAM, a 120 MB hard drive, an SVGA 0.28 pitch monitor, 2 MB of video RAM, an 80486 DX-33 processor or greater, a mouse or digitizer support, and audio and video enabling equipment (such as a video tape recorder/player or camera and microphone). Regardless of the controller's configuration, this workstation requires the installation of the appropriate FDDI network card.

Portable system controller (PRT 000-A) operates in a Windows environment and provides a user-friendly interface for controlling the portable unit's multi-function audio and video switcher (PRT 248), up/down scan converter (PRT 651), high definition video projector units (PRT 300[u]), and to either optical video interface device feeds (TRX 302) or a DS-3 codec for NTSC (TRX 103) or a DS-3 high definition video codec (TRX 104a). This software is derived from the applications developed for the presentation, transmission, and production subsystems.

Connections (38c) from system controller (PRT 000-A) to multi-function audio and video switcher (PRT 248), up/down scan converter (PRT 651), high definition video projector units (PRT 300[u]), and to either optical video interface device feeds (TRX 302) or DS-3 codec for NTSC (TRX 103) or a DS-3 high definition video codec (TRX 104a) are RS-232C serial connections.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of controlling a multi-node variable bandwidth digital network, comprising the steps of:

(a) accessing a first communication node in a multi-node communication network from a second communication node that is remote from the first communication node and requesting a communication service, the second communication node having a plurality of different subsystems and being selectively configurable with selected combinations of the subsystems, (b) requesting communication service between the first and second communication nodes by transmitting from the first communication node to a controller in the second communication node information indicative of equipment and operational requirements of the requested service;

(c) determining the required connection capacity between the first and second communication nodes for the requested service;

(d) determining the transmission capacity of the connection between the first and second communication nodes;

(e) modifying the connection transmission capacity by rerouting the connection between the first and second communication nodes through at least one additional communication node if the required connection capacity for the requested service differs from the transmission capacity; and (f) using the controller to configure the second communication node in response to the requested service by selecting one or more of the plurality of subsystems in the second node to meet the equipment and operational requirements of the requested service.

* * * * *